United States Patent
Gintsburg et al.

(10) Patent No.: US 12,223,663 B2
(45) Date of Patent: Feb. 11, 2025

(54) FRAME PROCESSING AND/OR CAPTURE INSTRUCTION SYSTEMS AND TECHNIQUES

(71) Applicant: QUALCOMM Incorporated, San Diego, CA (US)

(72) Inventors: Mark Gintsburg, Haifa (IL); Nir Strauss, Yokneam Moshava (IL); Ron Gaizman, Hof HaCarmel (IL); Eran Pinhasov, Zichron Yaakov (IL); Yuri Dolgin, Haifa (IL); Victor Pinto, Zichron Yaakov (IL)

(73) Assignee: QUALCOMM Incorporated, San Diego, CA (US)

( * ) Notice: Subject to any disclaimer, the term of this patent is extended or adjusted under 35 U.S.C. 154(b) by 574 days.

(21) Appl. No.: 17/240,837

(22) Filed: Apr. 26, 2021

(65) Prior Publication Data
US 2022/0138964 A1    May 5, 2022

Related U.S. Application Data

(60) Provisional application No. 63/108,221, filed on Oct. 30, 2020.

(51) Int. Cl.
*G06T 7/215* (2017.01)
*G06N 20/00* (2019.01)
(Continued)

(52) U.S. Cl.
CPC ............ *G06T 7/246* (2017.01); *G06N 20/00* (2019.01); *G06T 7/215* (2017.01); *H04N 5/144* (2013.01); *H04N 23/73* (2023.01)

(58) Field of Classification Search
CPC ..................... G06T 7/246; G06T 7/215; G06T 2207/10144; G06T 2207/20081;
(Continued)

(56) References Cited

U.S. PATENT DOCUMENTS

| | | | |
|---|---|---|---|
| 2007/0092244 A1* | 4/2007 | Pertsel | H04N 23/684 396/153 |
| 2008/0101786 A1 | 5/2008 | Pozniansky et al. | |

(Continued)

FOREIGN PATENT DOCUMENTS

| | | | | |
|---|---|---|---|---|
| EP | 2608529 A1 * | 6/2013 | | G06T 5/003 |
| KR | 20120046943 A * | 5/2012 | | |

OTHER PUBLICATIONS

Pece, Fabrizio, and Jan Kautz. "Bitmap movement detection: HDR for dynamic scenes." In 2010 Conference on Visual Media Production, pp. 1-8. IEEE, 2010. (Year: 2010).*

(Continued)

*Primary Examiner* — Carol Wang
(74) *Attorney, Agent, or Firm* — QUALCOMM Incorporated

(57) ABSTRACT

Techniques and systems are provided for processing one or more frames or images. For instance, a process for determining exposure for one or more frames includes obtaining a motion map for one or more frames. The process includes determining, based on the motion map, motion associated with the one or more frames of a scene. The motion corresponds to movement of one or more objects in the scene relative to a camera used to capture the one or more frames. The process includes determining, based on the determined motion, a number of frames and an exposure for capturing the number of frames. The process further includes sending a request to capture the number of frames using the determined exposure duration.

26 Claims, 28 Drawing Sheets

(51) Int. Cl.
   *G06T 7/246* (2017.01)
   *H04N 5/14* (2006.01)
   *H04N 23/73* (2023.01)
(58) Field of Classification Search
   CPC ........... G06T 2207/20084; G06T 2207/20208; G06T 2207/20221; G06N 20/00; G06N 7/01; G06N 3/048; G06N 3/084; G06N 3/0464; H04N 5/144; H04N 23/73; H04N 23/6811; H04N 23/6812; H04N 23/72; H04N 23/741; H04N 23/743; H04N 23/81; H04N 23/61; H04N 23/951; G06V 10/10; G06V 10/764; G06V 10/82
   See application file for complete search history.

(56) References Cited

U.S. PATENT DOCUMENTS

| | | | |
|---|---|---|---|
| 2009/0167909 A1* | 7/2009 | Imagawa | H04N 23/60 348/262 |
| 2009/0244301 A1 | 10/2009 | Border et al. | |
| 2019/0230273 A1* | 7/2019 | Min | H04N 23/741 |
| 2020/0244886 A1* | 7/2020 | Sasaki | H04N 23/45 |
| 2020/0265567 A1 | 8/2020 | Hu et al. | |
| 2022/0174238 A1* | 6/2022 | Li | H04N 5/772 |

OTHER PUBLICATIONS

Hasinoff, Samuel W., Dillon Sharlet, Ryan Geiss, Andrew Adams, Jonathan T. Barron, Florian Kainz, Jiawen Chen, and Marc Levoy. "Burst photography for high dynamic range and low-light imaging on mobile cameras." ACM Transactions on Graphics (ToG) 35, No. 6 (2016): 1-12. (Year: 2016).*

International Search Report and Written Opinion—PCT/US2021/053151—ISA/EPO—Jan. 14, 2022.

Liba O., et al., "Handheld Mobile Photography in Very Low Light", arxiv.org, Cornell University Library, 201 Olin Library Cornell University Ithaca, NY14853, Oct. 24, 2019 (Oct. 24, 2019), XP081520826, 22 Pages, DOI: 10.1145/3355089.3356508 paragraph [0001]-paragraph [0004] paragraph [0006] figures 1-11, 15-17.

* cited by examiner

FRAME PROCESSING AND/OR CAPTURE INSTRUCTION SYSTEMS AND TECHNIQUES

CROSS-REFERENCE TO RELATED APPLICATIONS

The present application claims the benefit of U.S. Provisional Application No. 63/108,221, filed Oct. 30, 2020, entitled "FRAME PROCESSING AND/OR CAPTURE INSTRUCTION SYSTEMS AND TECHNIQUES", which is hereby incorporated by reference in its entirety and for all purposes.

FIELD

This application is related to frame processing and/or capture instruction systems and techniques.

BACKGROUND

Cameras can be configured with a variety of image capture and image processing settings to alter the appearance of an image. Some camera settings are determined and applied before or during capture of the photograph, such as ISO, exposure time, aperture size, f/stop, shutter speed, focus, and gain. Other camera settings can configure post-processing of a photograph, such as alterations to contrast, brightness, saturation, sharpness, levels, curves, or colors. A host processor (HP) can be used to configure settings of an image sensor and/or settings of an image signal processor (ISP). The configuration of settings between the image sensor and the ISP should be synchronized to ensure images are properly processed.

SUMMARY

Systems and techniques are described herein for performing image or frame processing and/or capture instruction configurations. According to one illustrative example, a method of determining an exposure duration and a number of frames is provided. The method includes: obtaining a motion map for one or more frames; determining, based on the motion map, motion associated with the one or more frames of a scene, the motion corresponding to movement of one or more objects in the scene relative to a camera used to capture the one or more frames; determining, based on the determined motion, a number of frames and an exposure duration for capturing the number of frames; and sending a request to capture the number of frames using the determined exposure duration.

In another example, an apparatus for determining an exposure duration for a number of frames is provided that includes a memory configured to store at least one frame and one or more processors (e.g., implemented in circuitry) and coupled to the memory. The one or more processors are configured to and can: obtain a motion map for one or more frames; determine, based on the motion map, motion associated with the one or more frames of a scene, the motion corresponding to movement of one or more objects in the scene relative to a camera used to capture the one or more frames; determine, based on the determined motion, a number of frames and an exposure duration for capturing the number of frames; and send a request to capture the number of frames using the determined exposure duration.

In another example, a non-transitory computer-readable medium is provided that has stored thereon instructions that, when executed by one or more processors, cause the one or more processor to: obtain a motion map for one or more frames; determine, based on the motion map, motion associated with the one or more frames of a scene, the motion corresponding to movement of one or more objects in the scene relative to a camera used to capture the one or more frames; determine, based on the determined motion, a number of frames and an exposure duratoin for capturing the number of frames; and send a request to capture the number of frames using the determined exposure duration.

In another example, an apparatus for determining an exposure duration for a number of frames is provided. The apparatus includes: means for obtaining a motion map for one or more frames; means for determining, based on the motion map, motion associated with the one or more frames of a scene, the motion corresponding to movement of one or more objects in the scene relative to a camera used to capture the one or more frames; means for determining, based on the determined motion, a number of frames and an exposure duratoin for capturing the number of frames; and means for sending a request to capture the number of frames using the determined exposure duration.

In some aspects, the one or more frames are obtained before a capture command for capturing the number of frames is received.

In some aspects, the method, apparatuses, and computer-readable medium described above further comprise: performing temporal blending on the number of frames captured using the determined exposure duration to generate a temporally blended frame.

In some aspects, the method, apparatuses, and computer-readable medium described above further comprise: performing, using a machine learning based image signal processor, spatial processing on the temporally blended frame. In some aspects, the machine learning based image signal processor uses the motion map as input for performing the spatial processing on the temporally blended frame.

In some aspects, the determined exposure duration is based on a gain.

In some aspects, the motion map includes an image, each pixel of the image including a value indicating at least one of an amount of motion for each pixel and a confidence value associated with the amount of motion.

In some aspects, the method, apparatuses, and computer-readable medium described above further comprise: determining, based on one or more sensor measurements, global motion associated with the camera. In some cases, the number of frames and the exposure duration for capturing the number of frames are determined based on the determined motion and the global motion. For example, the one or more processors of the apparatus can be configured to determine the number of frames and the exposure duration for capturing the number of frames based on the determined motion and the global motion.

In some aspects, the method, apparatuses, and computer-readable medium described above further comprise: determining a final motion indication based on the determined motion and the global motion. In some cases, the number of frames and the exposure duration for capturing the number of frames are determined based on the final motion indication. For example, the one or more processors of the apparatus can be configured to determine the number of frames and the exposure duration for capturing the number of frames based on the final motion indication.

In some aspects, the final motion indication is based on a weighted combination of the determined motion and the global motion using a first weight for the determined motion and a second weight for the global motion. For example, to determine the final motion indication based on the determined motion and the global motion, the one or more processors can be configured to determine the weighted combination of the determined motion and the global motion using the first weight for the determined motion and the second weight for the global motion.

In some aspects, the method, apparatuses, and computer-readable medium described above further comprise: determining, based on the final motion indication, an amount of motion in the one or more frames is less than a motion threshold; and based on the amount of motion in the one or more frames being less than the motion threshold, decreasing a frame count for the number of frames and increasing an exposure duration amount for the determined exposure duration.

In some aspects, the method, apparatuses, and computer-readable medium described above further comprise: determining, based on the final motion indication, an amount of motion in the one or more frames is greater than a motion threshold; and based on the amount of motion in the one or more frames being greater than the motion threshold, increasing a frame count for the number of frames and decreasing an exposure duration amount for the determined exposure duration.

According to at least one other illustrative example, a method of performing temporal blending for one or more frames is provided. The method includes: obtaining a raw frame, the raw frame including a single color component for each pixel of the raw frame; dividing the raw frame into a first color component, a second color component, and a third color component; generating a plurality of frames at least in part by adding at least a first chrominance value to the first color component, at least a second chrominance value to the second color component, and at least a third chrominance value to the third color component; and performing temporal blending for the plurality of frames.

In another example, an apparatus for performing temporal blending for one or more frames is provided that includes a memory configured to store at least one image and one or more processors (e.g., implemented in circuitry) and coupled to the memory. The one or more processors are configured to and can: obtain a raw frame, the raw frame including a single color component for each pixel of the raw frame; divide the raw frame into a first color component, a second color component, and a third color component; generate a plurality of frames at least in part by adding at least a first chrominance value to the first color component, at least a second chrominance value to the second color component, and at least a third chrominance value to the third color component; and perform temporal blending for the plurality of frames.

In another example, a non-transitory computer-readable medium is provided that has stored thereon instructions that, when executed by one or more processors, cause the one or more processor to: obtain a raw frame, the raw frame including a single color component for each pixel of the raw frame; divide the raw frame into a first color component, a second color component, and a third color component; generate a plurality of frames at least in part by adding at least a first chrominance value to the first color component, at least a second chrominance value to the second color component, and at least a third chrominance value to the third color component; and perform temporal blending for the plurality of frames.

In another example, an apparatus for performing temporal blending for one or more frames is provided. The apparatus includes: means for obtaining a raw frame, the raw frame including a single color component for each pixel of the raw frame; means for dividing the raw frame into a first color component, a second color component, and a third color component; means for generating a plurality of frames at least in part by adding at least a first chrominance value to the first color component, at least a second chrominance value to the second color component, and at least a third chrominance value to the third color component; and means for performing temporal blending for the plurality of frames.

In some aspects, the raw frame includes a color filter array (CFA) pattern.

In some aspects, the first color component includes a red color component, the second color component includes a green color component, and the third color component includes a blue color component.

In some aspects, the first color component includes all red pixels of the raw frame, the second color component includes all green pixels of the raw frame, and the third color component includes all blue pixels of the raw frame.

In some aspects, generating the plurality of frames includes: generating a first frame at least in part by adding at least the first chrominance value to the first color component; generating a second frame at least in part by adding at least the second chrominance value to the second color component; and generating a third frame at least in part by adding at least the third chrominance value to the third color component.

In some aspects, generating the first frame includes adding a first chrominance value and a second chrominance value to the first color component. In some aspects, generating the second frame includes adding the first chrominance value and the second chrominance value to the second color component. In some aspects, generating the third frame includes adding the first chrominance value and the second chrominance value to the third color component.

In some aspects, the first chrominance value and the second chrominance value are a same value.

In some aspects, performing the temporal blending for the plurality of frames includes: temporally blending a first frame of the plurality of frames with one or more additional frames having the first color component; temporally blending a second frame of the plurality of frames with one or more additional frames having the second color component; and temporally blending a third frame of the plurality of frames with one or more additional frames having the third color component.

In some aspects, the apparatus is, is part of, and/or includes a camera, a mobile device (e.g., a mobile telephone or so-called "smart phone" or other mobile device), a wearable device, an extended reality device (e.g., a virtual reality (VR) device, an augmented reality (AR) device, or a mixed reality (MR) device), a personal computer, a laptop computer, a server computer, a vehicle or a computing device or component of a vehicle, or other device. In some aspects, the apparatus includes a camera or multiple cameras for capturing one or more images. In some aspects, the apparatus further includes a display for displaying one or more images, notifications, and/or other displayable data. In some aspects, the apparatuses described above can include one or more sensors (e.g., one or more inertial measurement units (IMUs), such as one or more gyrometers, one or more accelerometers, any combination thereof, and/or other sensor).

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present application are described in detail below with reference to the following figures.

DETAILED DESCRIPTION

Figure 1:
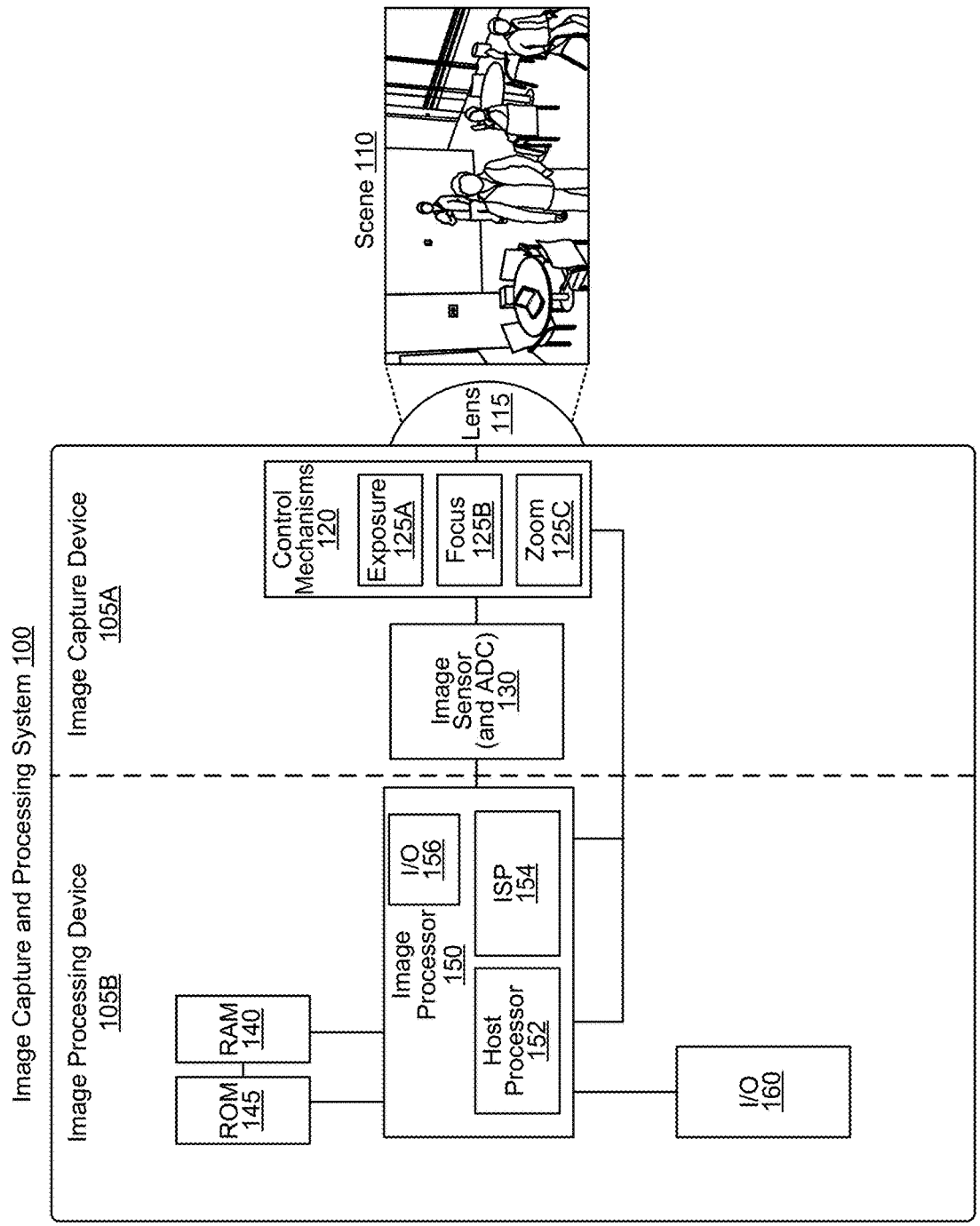
FIG. 1 is a block diagram illustrating an example architecture of a frame processing and/or capture instruction system, in accordance with some examples.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the application. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the application as set forth in the appended claims.

A camera is a device that receives light and captures image frames, such as still images or video frames, using an image sensor. The terms "image," "image frame," and "frame" are used interchangeably herein. A camera system can include processors (e.g., an image signal processor (ISP), etc.) that can receive one or more image frames and process the one or more image frames. For example, a raw image frame captured by a camera sensor can be processed by an ISP to generate a final image. Processing by the ISP can be performed by a plurality of filters or processing blocks being applied to the captured image frame, such as denoising or noise filtering, edge enhancement, color balancing, contrast, intensity adjustment (such as darkening or lightening), tone adjustment, among others. Image processing blocks or modules may include lens/sensor noise correction, Bayer filters, de-mosaicing, color conversion, correction or enhancement/suppression of image attributes, denoising filters, sharpening filters, among others.

In many camera systems, a host processor (HP) (also referred to as an application processor (AP) in some cases) is used to dynamically configure an image sensor with new parameter settings. The HP is also used to dynamically configure parameter settings of the ISP pipelines to match the settings of an input image sensor frame so that the image data is processed correctly.

Cameras can be configured with a variety of image capture and image processing settings. Application of different settings can result in frames or images with different appearances. Some camera settings are determined and applied before or during capture of the photograph, such as ISO, exposure time (also referred to as exposure duration), aperture size, f/stop, shutter speed, focus, and gain. Other camera settings can configure post-processing of a photograph, such as alterations to contrast, brightness, saturation, sharpness, levels, curves, or colors.

Challenges exist when attempting to capture frames or images in scenes with poor lighting, such as nighttime scenes, indoor scenes with poor or low lighting, among others. For example, poorly-lit scenes are usually dark with saturated bright areas (if any exist). Images of scenes with poor lighting are referred to herein as low-light images. Low-light images are typically dark, noisy, and void of color. For instance, low-light images typically have dark pixels with excessively bright areas for the bright areas of the scene. Further, the signal-to-noise ratio (SNR) in low-light images is very low. The noise in a low light image is a manifestation of random variation of brightness and/or color information that is caused by the low light condition. The result of the noise is that a low light image appears grainy. In some cases, the signals of low-light images have to be amplified due to the low SNR. For example, the signal amplification can introduce more noise and inaccurate white balance. In some cases, the exposure duration/time for a camera can be increased to help increase the amount of light that is exposed to the image sensor. However, an increased exposure duration can introduce motion blur artifacts, resulting in a blurry image, due to more light hitting the camera sensor during a shutter operation.

Systems, apparatuses, processes (also referred to as methods), and computer-readable media (collectively referred to herein as "systems and techniques") are described herein for providing improved image processing techniques. In some cases, the systems and techniques described herein can be used for providing improved low-light frames or images. However, the systems and techniques can also be applied to frames or images captured in other lighting conditions. For instance, as described in more detail below, the systems and techniques can be used to generate a well-exposed (e.g., properly exposed with low blur) and sharp (e.g., with high texture level retained with low noise) frame with accurate colors, high texture, and low noise. In some cases, the systems and techniques can control artifacts, preserve most or all of the dynamic range of captured frames, and/or provide good quality shot-to-shot and processing time. For instance, using the systems and techniques described herein, frames can be generated while maintaining a comparable frame quality with reduced processing time (as compared to other image capture systems). In some examples, the systems and techniques can generate an interactive preview (e.g., by progressively displaying frames as new frames are being buffered and/or processed).

In some aspects, the systems and techniques can leverage the use of existing hardware components, such as multi-frame noise reduction (MFNR) hardware components, multi-frame High Dynamic Range (MFHDR) hardware components, Massive Multi-Frame (MMF) hardware components, staggered HDR (sHDR) hardware components (which can be a subset of MFHDR), any combination thereof, and/or other hardware components. In some aspects, the systems and techniques can use a longer exposure time and higher gain for capturing dark frames. In some examples, the systems and techniques can use adaptive dynamic range control (ADRC) and/or multi-frame High Dynamic Range (MFHDR), sHDR, and/or MMF for highly saturated (or clipped or blown) highlights. ADRC can be used to achieve high dynamic range (HDR) out of a single image or frame. For example, ADRC can underexpose a frame to preserve highlights and can then apply a later gain to compensate shadows and mid tones. In some aspects, the systems and techniques can use MFxR, lower gain with longer exposure duration, and in some cases a machine learning system for frames with high noise and/or low texture. The term MFxR can refer to Multi-frame Noise Reduction (MFNR) and/or Multi-frame Super Resolution (MFSR). Also, as used herein, when discussing MFxR (e.g., MFNR, MFSR, etc.), the same or similar techniques can be performed using MMF in addition to or as an alternative to MFxR. In MFNR, MFSR, MMF, or other related technique, a final frame can be generated by blending two or more frames.

In some examples, for frames with motion blur, the systems and techniques can utilize a frame count and exposure duration (and/or gain) combination dynamic decision according to motion information associated with one or more preview frames (e.g., in-scene effective motion/movement, global motion of an image capture determined using sensor measurements, or a combination thereof). For instance, using the motion information associated with the one or more preview frames, the systems and techniques can determine a number of frames to capture (which may later be combined using MFNR, MMF, etc.) and an exposure duration by which to capture the number of frames. In some cases, the systems and techniques (e.g., a low-light engine) can obtain various decisions and statistics from a preview pipeline (e.g., which generates preview frames). The systems and techniques can output capturing instructions for an offline pipeline (e.g., which captures output frames). For instance, the systems and techniques can calculate an exposure duration (e.g., a longest single frame exposure duration) for optimal balance between motion blur and SNR. In some cases, the SNR variation in this case corresponds to the actual sensor gain to be applied, which is a product of the target exposure divided by exposure duration/time. In some cases, the systems and techniques can calculate the multi-frame frame count (the number of frames noted above) to satisfy a requested shot-to-shot time or duration. The shot-to-shot time can refer to the duration between two consecutive user-initiated frame captures (e.g., between activation of a shutter or capture option, such as selection of a shutter/capture button). The requested shot-to-shot duration can be the product of frame count multiplied by single frame exposure duration (in addition to pre-defined pipeline latencies).

In some aspects, to find accurate white balance, the systems and techniques can calculate auto-white balance (AWB) statistics from a longer-exposed frame (also referred to herein as a long exposure frame). A long exposure frame is captured using a longer exposure time than a standard exposure time used for capturing certain frames (e.g., in scenes that do not have low-light conditions, such as the example normal lighting conditions shown in FIG. 2). In some cases, the systems and techniques can calculate the AWB statistics from a longer-exposed aggregated frame (e.g., by combining multiple longer-exposed frames). In some examples, to address processing latency, the systems and techniques can process short exposure frames (e.g., captured using standard exposure times) while capturing longer-exposed frames (referred to herein as long exposure frames). In some examples, the systems and techniques can continue to process the short exposure frames in the background after capturing is finished. For instance, the systems and techniques can collect a queue of short exposure and/or long exposure frames, and can process the frames while collecting a subsequent set of short and/or long exposure frames. In some aspects, the systems and techniques can feed a preview engine with continuously "improving" longer-exposed frames while still capturing. The preview engine can output frames as a preview (e.g., before a shutter button or option is activated and/or while capture processing based on the shutter button or option is still being performed).

In some examples, such as to address quantization issues (e.g., chroma stains), the systems and techniques can use a post-image processing engine (post-IPE) that is after the MFHDR in the camera pipeline and/or can use a machine learning system. The term "chroma stains" is a visualized term for chroma quantization, and can also be referred to as "chroma banding" or "chroma contours." Chroma stains can occur with a frame that has insufficient color depth and that undergoes smoothing (e.g., noise reduction) and an additional process that enhances the colors. The result of chroma stains can include contours or steps on flat (near gray) areas. The post-IPE is an additional hardware image processing engine (IPE) instance that can be used to further smooth the generated contours. For instance, the post-IPE can be located at the end of the frame processing and/or capture instruction pipeline (e.g., when the frame has its final tones).

In some examples, the systems and techniques can activate or deactivate certain low-light processing based on illuminance (lux) metering. Using illuminance metering, the systems and techniques can be dynamically enabled based on lighting conditions. For example, the image signal processor (ISP), or other processor, of a frame processing and/or capture instruction system can measure the amount of light. Based on the amount of light (e.g., low light, normal light, ultra-low-light, etc., such as that shown in FIG. 2), the ISP can determine whether to activate one or more of the techniques described herein.

In some examples, long exposure frames have significantly higher light sensitivity than short exposure frames. Light sensitivity can also be referred to as "exposure", "image exposure", or "image sensitivity", and can be defined as follows: Light sensitivity=gain*exposure_time. Exposure time can also be referred to as exposure duration. Further, the term exposure refers to exposure duration or time. The exposure scale used to capture short and long exposure frames can vary. Short exposure and long exposure frames can span the entire available gain range in some cases. In some examples, a short exposure frame can be captured using an exposure of 33 milliseconds (ms) or 16.7 ms. In some cases, short exposure frames can be used as candidates to support standard preview (e.g., previewed in a display of a device, such as prior to a shutter button or option being activated and/or while capture processing based on the shutter button or option is still being performed). In some cases, the exposure time for a short exposure frame can be very short (e.g., 0.01 sec), such as to satisfy a flicker free condition, or even shorter if a direct, flicker-free, light source is detected. In some cases, to reach maximum light sensitivity for a particular frame rate (e.g., one that is defined by a user), the exposure time for a short exposure frame can be 1/frame_rate second. In some examples, the exposures of short exposure frames can vary in a range of [0.01, 0.08] seconds. Long exposure frames or images can be captured using any exposure above that which was used to capture a short exposure frame. For examples, the exposures of long exposure frames can vary in a range of [0.33, 1] seconds. In one illustrative example, for example using a tripod with no in-scene movement, the exposure duration for a long exposure frame can be approximately 1 second. In some cases, the exposure used for long exposure frames can reach larger durations (e.g., 3 seconds or other duration), but are not "shorter" than short exposure frames.

As used herein, the terms short, medium, safe, and long refer to relative characterizations between a first setting and a second setting, and do not necessarily correspond to defined ranges for a particular setting. That is to say, a long exposure (or long exposure duration or long exposure frame or image) refers simply to an exposure time that is longer than a second exposure (e.g., a short or mid exposure). In another example, a short exposure (or short exposure duration or short exposure frame) refers to an exposure time that is shorter than a second exposure (e.g., a long or mid exposure).

Various aspects of the application will be described with respect to the figures. FIG. 1 is a block diagram illustrating an architecture of a frame capture and processing system 100. The frame capture and processing system 100 includes various components that are used to capture and process frames of scenes (e.g., a frame of a scene 110). The frame capture and processing system 100 can capture standalone frames (or photographs) and/or can capture videos that include multiple frames (or video frames) in a particular sequence. A lens 115 of the system 100 faces a scene 110 and receives light from the scene 110. The lens 115 bends the light toward the image sensor 130. The light received by the lens 115 passes through an aperture controlled by one or more control mechanisms 120 and is received by an image sensor 130.

The one or more control mechanisms 120 may control exposure, focus, and/or zoom based on information from the image sensor 130 and/or based on information from the image processor 150. The one or more control mechanisms 120 may include multiple mechanisms and components; for instance, the control mechanisms 120 may include one or more exposure control mechanisms 125A, one or more focus control mechanisms 125B, and/or one or more zoom control mechanisms 125C. The one or more control mechanisms 120 may also include additional control mechanisms besides those that are illustrated, such as control mechanisms controlling analog gain, flash, HDR, depth of field, and/or other image capture properties.

The focus control mechanism 125B of the control mechanisms 120 can obtain a focus setting. In some examples, focus control mechanism 125B store the focus setting in a memory register. Based on the focus setting, the focus control mechanism 125B can adjust the position of the lens 115 relative to the position of the image sensor 130. For example, based on the focus setting, the focus control mechanism 125B can move the lens 115 closer to the image sensor 130 or farther from the image sensor 130 by actuating a motor or servo, thereby adjusting focus. In some cases, additional lenses may be included in the system 100, such as one or more microlenses over each photodiode of the image sensor 130, which each bend the light received from the lens 115 toward the corresponding photodiode before the light reaches the photodiode. The focus setting may be determined via contrast detection autofocus (CDAF), phase detection autofocus (PDAF), or some combination thereof. The focus setting may be determined using the control mechanism 120, the image sensor 130, and/or the image processor 150. The focus setting may be referred to as an image capture setting and/or an image processing setting.

The exposure control mechanism 125A of the control mechanisms 120 can obtain an exposure setting. In some cases, the exposure control mechanism 125A stores the exposure setting in a memory register. Based on this exposure setting, the exposure control mechanism 125A can control a size of the aperture (e.g., aperture size or f/stop), a duration of time for which the aperture is open (e.g., exposure time or shutter speed), a sensitivity of the image sensor 130 (e.g., ISO speed or film speed), analog gain applied by the image sensor 130, or any combination thereof. The exposure setting may be referred to as an image capture setting and/or an image processing setting.

The zoom control mechanism 125C of the control mechanisms 120 can obtain a zoom setting. In some examples, the zoom control mechanism 125C stores the zoom setting in a memory register. Based on the zoom setting, the zoom control mechanism 125C can control a focal length of an assembly of lens elements (lens assembly) that includes the lens 115 and one or more additional lenses. For example, the zoom control mechanism 125C can control the focal length of the lens assembly by actuating one or more motors or servos to move one or more of the lenses relative to one another. The zoom setting may be referred to as an image capture setting and/or an image processing setting. In some examples, the lens assembly may include a parfocal zoom lens or a varifocal zoom lens. In some examples, the lens assembly may include a focusing lens (which can be lens 115 in some cases) that receives the light from the scene 110 first, with the light then passing through an afocal zoom system between the focusing lens (e.g., lens 115) and the image sensor 130 before the light reaches the image sensor 130. The afocal zoom system may, in some cases, include two positive (e.g., converging, convex) lenses of equal or similar focal length (e.g., within a threshold difference) with a negative (e.g., diverging, concave) lens between them. In some cases, the zoom control mechanism 125C moves one or more of the lenses in the afocal zoom system, such as the negative lens and one or both of the positive lenses.

The image sensor 130 includes one or more arrays of photodiodes or other photosensitive elements. Each photodiode measures an amount of light that eventually corresponds to a particular pixel in the image or frame produced by the image sensor 130. In some cases, different photodiodes may be covered by different color filters, and may thus measure light matching the color of the filter covering the photodiode. For instance, Bayer color filters include red color filters, blue color filters, and green color filters, with each pixel of the frame generated based on red light data from at least one photodiode covered in a red color filter, blue light data from at least one photodiode covered in a blue color filter, and green light data from at least one photodiode covered in a green color filter. Other types of color filters may use yellow, magenta, and/or cyan (also referred to as "emerald") color filters instead of or in addition to red, blue, and/or green color filters. Some image sensors may lack color filters altogether, and may instead use different photodiodes throughout the pixel array (in some cases vertically stacked). The different photodiodes throughout the pixel array can have different spectral sensitivity curves, therefore responding to different wavelengths of light. Monochrome image sensors may also lack color filters and therefore lack color depth.

In some cases, the image sensor 130 may alternately or additionally include opaque and/or reflective masks that block light from reaching certain photodiodes, or portions of certain photodiodes, at certain times and/or from certain angles, which may be used for phase detection autofocus (PDAF). The image sensor 130 may also include an analog gain amplifier to amplify the analog signals output by the photodiodes and/or an analog to digital converter (ADC) to convert the analog signals output of the photodiodes (and/or amplified by the analog gain amplifier) into digital signals. In some cases, certain components or functions discussed with respect to one or more of the control mechanisms 120 may be included instead or additionally in the image sensor 130. The image sensor 130 may be a charge-coupled device (CCD) sensor, an electron-multiplying CCD (EMCCD) sensor, an active-pixel sensor (APS), a complimentary metal-oxide semiconductor (CMOS), an N-type metal-oxide semiconductor (NMOS), a hybrid CCD/CMOS sensor (e.g., sCMOS), or some other combination thereof.

The image processor 150 may include one or more processors, such as one or more image signal processors (ISPs) (including ISP 154), one or more host processors (including host processor 152), and/or one or more of any other type of processor 910 discussed with respect to the computing system 900. The host processor 152 can be a digital signal processor (DSP) and/or other type of processor. In some implementations, the image processor 150 is a single integrated circuit or chip (e.g., referred to as a system-on-chip or SoC) that includes the host processor 152 and the ISP 154. In some cases, the chip can also include one or more input/output ports (e.g., input/output (I/O) ports 156), central processing units (CPUs), graphics processing units (GPUs), broadband modems (e.g., 3G, 4G or LTE, 5G, etc.), memory, connectivity components (e.g., Bluetooth™, Global Positioning System (GPS), etc.), any combination thereof, and/or other components. The I/O ports 156 can include any suitable input/output ports or interface according to one or more protocol or specification, such as an Inter-Integrated Circuit 2 (I2C) interface, an Inter-Integrated Circuit 3 (I3C) interface, a Serial Peripheral Interface (SPI) interface, a serial General Purpose Input/Output (GPIO) interface, a Mobile Industry Processor Interface (MIPI) (such as a MIPI CSI-2 physical (PHY) layer port or interface, an Advanced High-performance Bus (AHB) bus, any combination thereof, and/or other input/output port. In one illustrative example, the host processor 152 can communicate with the image sensor 130 using an I2C port, and the ISP 154 can communicate with the image sensor 130 using an MIPI port.

The host processor 152 can configure the image sensor 130 with new parameter settings (e.g., via an external control interface such as I2C, I3C, SPI, GPIO, and/or other interface). In one illustrative example, the host processor 152 can update exposure settings used by the image sensor 130 based on internal processing results of an exposure control algorithm from past images or frames.

The host processor 152 can also dynamically configure the parameter settings of the internal pipelines or modules of the ISP 154. For instance, the host process 152 can configure the pipelines or modules of the ISP 154 to match the settings of one or more input frames from the image sensor 130 so that the image or frame data is correctly processed by the ISP 154. Processing (or pipeline) blocks or modules of the ISP 154 can include modules for lens (or sensor) noise correction, de-mosaicing, color space conversion, color correction, enhancement and/or suppression of frame attributes, denoising (e.g., using denoising filters), sharpening (e.g., using sharpening filters), among others. Based on the configured settings, the ISP 154 can perform one or more image processing tasks, such as noise correction, de-mosaicing, color space conversion, frame downsampling, pixel interpolation, automatic exposure (AE) control, automatic gain control (AGC), CDAF, PDAF, automatic white balance (AWB), merging of frames to form an HDR frame or image, image recognition, object recognition, feature recognition, receipt of inputs, managing outputs, managing memory, or any combination thereof.

The image processor 150 can store frames and/or processed frames in random access memory (RAM) 140/920, read-only memory (ROM) 145/925, a cache 912, a memory unit (e.g., system memory 915), another storage device 930, or some combination thereof.

Various input/output (I/O) devices 160 may be connected to the image processor 150. The I/O devices 160 can include a display screen, a keyboard, a keypad, a touchscreen, a trackpad, a touch-sensitive surface, a printer, any other output devices 935, any other input devices 945, or some combination thereof. The I/O 160 may include one or more ports, jacks, or other connectors that enable a wired connection between the system 100 and one or more peripheral devices, over which the system 100 may receive data from the one or more peripheral device and/or transmit data to the one or more peripheral devices. The I/O 160 may include one or more wireless transceivers that enable a wireless connection between the system 100 and one or more peripheral devices, over which the system 100 may receive data from the one or more peripheral device and/or transmit data to the one or more peripheral devices. The peripheral devices may include any of the previously-discussed types of I/O devices 160 and may themselves be considered I/O devices 160 once they are coupled to the ports, jacks, wireless transceivers, or other wired and/or wireless connectors.

In some cases, the frame capture and processing system 100 may be a single device. In some cases, the frame capture and processing system 100 may be two or more separate devices, including an image capture device 105A (e.g., a camera) and an image processing device 105B (e.g., a computing device coupled to the camera). In some implementations, the image capture device 105A and the image processing device 105B may be coupled together, for example via one or more wires, cables, or other electrical connectors, and/or wirelessly via one or more wireless transceivers. In some implementations, the image capture device 105A and the image processing device 105B may be disconnected from one another.

As shown in FIG. 1, a vertical dashed line divides the frame capture and processing system 100 of FIG. 1 into two portions that represent the image capture device 105A and the image processing device 105B, respectively. The image capture device 105A includes the lens 115, control mechanisms 120, and the image sensor 130. The image processing device 105B includes the image processor 150 (including the ISP 154 and the host processor 152), the RAM 140, the ROM 145, and the I/O 160. In some cases, certain components illustrated in the image capture device 105A, such as the ISP 154 and/or the host processor 152, may be included in the image capture device 105A.

The frame capture and processing system 100 can include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the frame capture and processing system 100 can include one or more wireless transceivers for wireless communications, such as cellular network communications, 802.11 Wi-Fi communications, wireless local area network (WLAN) communications, or some combination thereof. In some implementations, the image capture device 105A and the image processing device 105B can be different devices. For instance, the image capture device 105A can include a camera device and the image processing device 105B can include a computing device, such as a mobile handset, a desktop computer, or other computing device.

While the frame capture and processing system 100 is shown to include certain components, one of ordinary skill will appreciate that the frame capture and processing system 100 can include more components than those shown in FIG. 1. The components of the frame capture and processing system 100 can include software, hardware, or one or more combinations of software and hardware. For example, in some implementations, the components of the frame capture and processing system 100 can include and/or can be implemented using electronic circuits or other electronic hardware, which can include one or more programmable electronic circuits (e.g., microprocessors, GPUs, DSPs, CPUs, and/or other suitable electronic circuits), and/or can include and/or be implemented using computer software, firmware, or any combination thereof, to perform the various operations described herein. The software and/or firmware can include one or more instructions stored on a computer-readable storage medium and executable by one or more processors of the electronic device implementing the frame capture and processing system 100.

Figure 2:
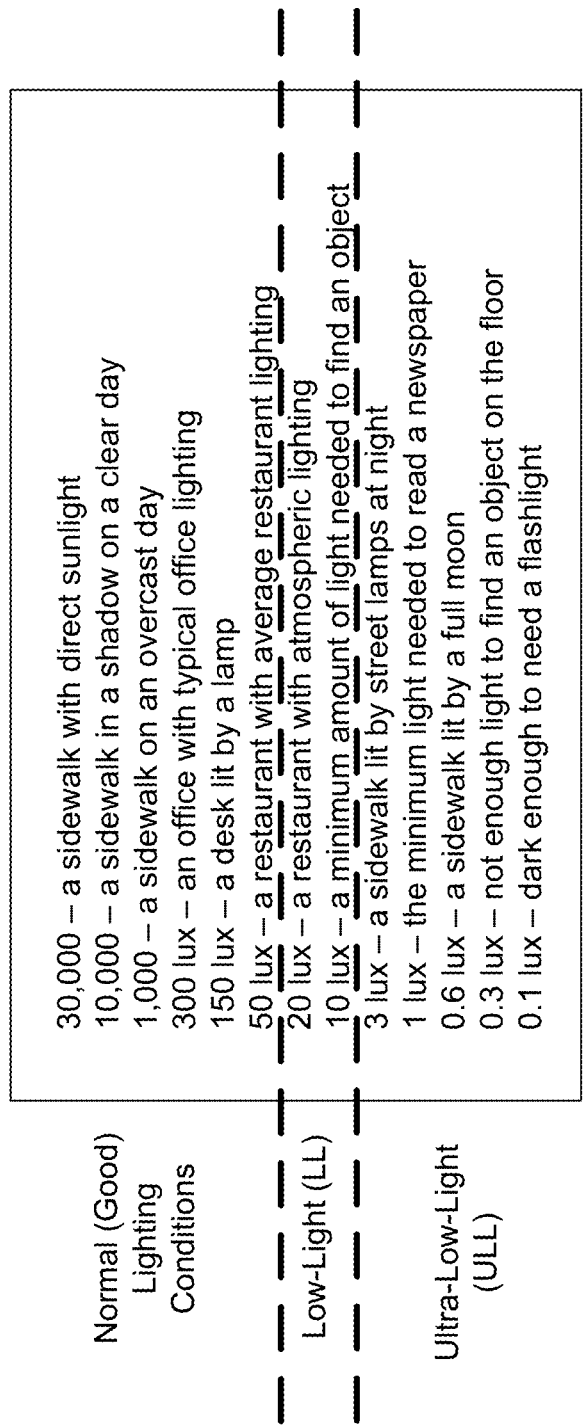
FIG. 2 is a diagram illustrating various lux values for different example scenarios.

FIG. 2 is a diagram illustrating various lux values for different example scenarios. While the example of FIG. 2 is shown using lux units, the lighting can be measured in other units, such as high ISO (representing the sensitivity of a sensor to light). In general lux conditions can correspond to low light, normal light, bright light, among others. The lux conditions illustrated in the diagram of FIG. 2 are relative terms used to distinguish lux values. For example, as used herein, a normal light range refers to a lux range that is relatively higher than a low-light range, and an ultra-low-light range refers to a lux range that is relatively lower than a range. In some cases, the example lux values can be re-assigned based on context. For example, the lux ranges can be reassigned by relative descriptors depending on the frame processing and/or capture instruction system capabilities (e.g., sensor pixel size and/or sensitivity, etc.) and/or use case (e.g., based on scene conditions, etc.).

Figure 3:
FIG. 3 is an image captured during an ultra-low-light condition.

Referring to FIG. 2, normal light conditions can correspond to lux values of 50, 150, 300, 1,000, 10,000, and 30,000. For instance, a lux value of 30,000 may occur in a scene including a sidewalk lit by direct sunlight, while a lux value of 1,000 may occur in a scene including a sidewalk on an overcast day. Low-light (LL) conditions can correspond to lux values of 10 and 20. Ultra-low-light (ULL) conditions can correspond to lux values of 0.1, 0.3, 0.6, 1, and 3. While example lux values are shown in FIG. 2 as corresponding to various lighting conditions, values other than those shown in FIG. 2 can correspond to the various lighting conditions. FIG. 3 is an image 300 (or frame) that is captured during an ultra-low-light condition (e.g., a lux value of 3). As shown, image 300 is dark, with the boat depicted with dark pixels and bright portions of the image 300 corresponding to the lights on the lamp posts.

Figure 4:
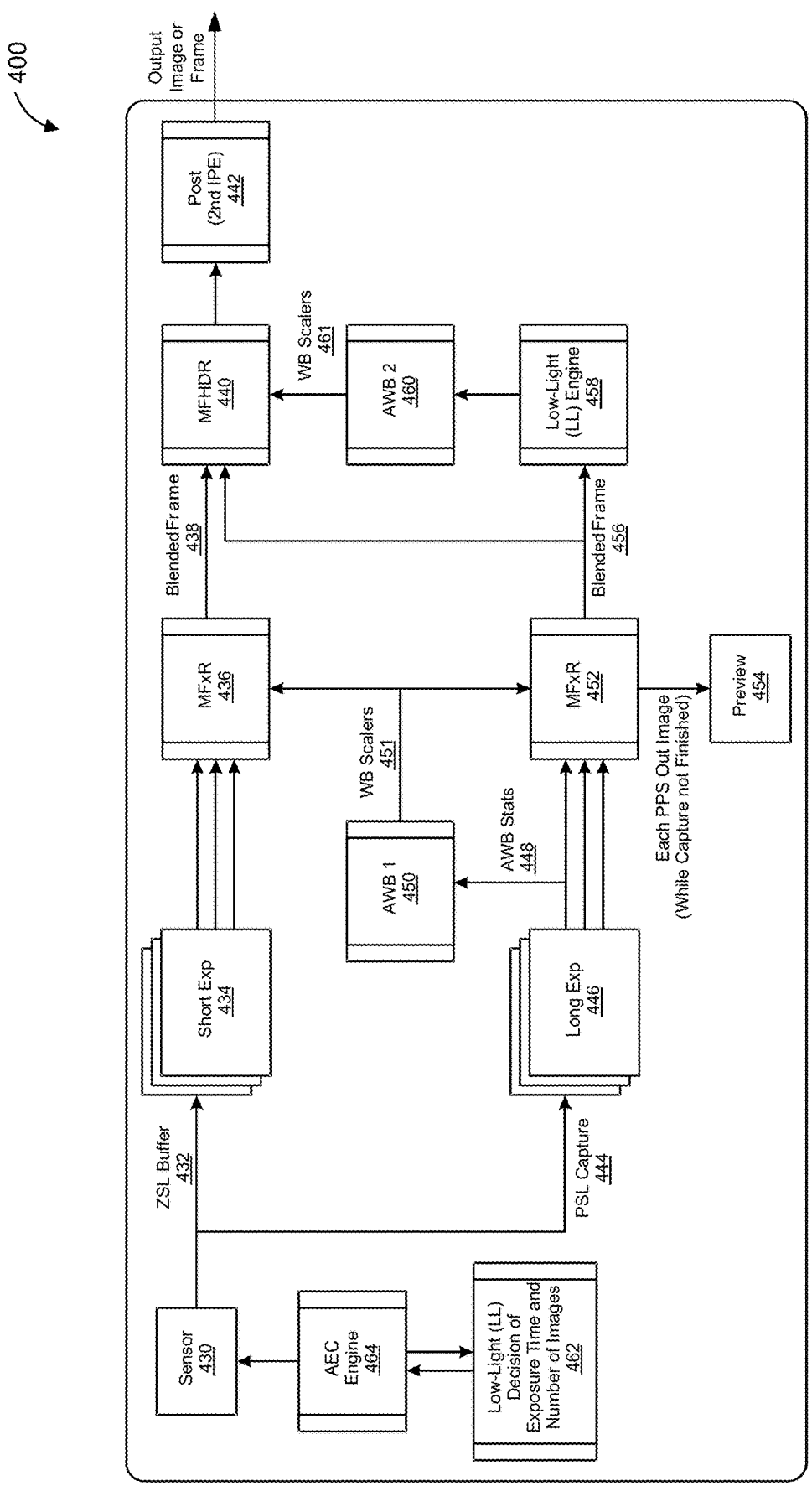
FIG. 4 is a block diagram illustrating an example of a frame processing and/or capture instruction system, in accordance with some examples.

FIG. 4 is a block diagram illustrating an example of a frame processing and/or capture instruction system 400. One or more of the components of the frame processing and/or capture instruction system 400 of FIG. 4 can be similar to and perform similar operations as like components of the frame capture and processing system 100 of FIG. 1. For example, the sensor 430 can be similar to and perform similar operations as the sensor 130 of the frame capture and processing system 100. As shown, a zero shutter lag (ZSL) buffer 432 can be used to store images or frames captured by the sensor 430. In some examples, the ZSL buffer 432 is a circular buffer. In general, the ZSL buffer 432 can be used to store one or more frames recently captured by the sensor, which can compensate for lag time that may occur, until the frame processing and/or capture instruction system 400 finishes encoding and storing a frame in response to a shutter (or capture) command being received (e.g., based on user input or automatically received).

Once the frame processing and/or capture instruction system 400 processes a shutter command, the frame processing and/or capture instruction system 400 can select one of the buffered frames and can further process the selected frame for storage, display, transmission, etc. As shown, the ZSL frames are captured with relatively short exposures and are referred to as short exposure frames 434 (referred to in FIG. 4 as "Short Exp" frames or images). The short exposure frames 434 are output to a first MFxR engine 436 (e.g., an engine that can perform MFNR and/or MFSR). The first MFxR engine 436 generates a blended frame 438 based on the short exposure frames. The blended frame 438 is output to a multi-frame High Dynamic Range (MFHDR) engine 440. The MFHDR engine 440 can receive as input multiple frames or images of the same scene captured with different light sensitivities or exposure parameters (e.g., exposure time and/or gain), such as one or more frames captured using a relatively short exposure (e.g., 33 ms), one or more frames captured using a relatively mid-level exposure (e.g., 100 ms), and one or more frames captured using a relatively long exposure (e.g., 500 ms). The frames captured using the long exposure can be referred to as long exposure frames or images, as noted above. In some examples, in addition to or as an alternative to exposure duration, the sensor gain can be adjusted for short exposure, mid-level exposure, and long exposure frames or images. The MFHDR engine can combine the multiple frames or images into a single, higher dynamic range (HDR) frame. The MFHDR engine 440 can output the HDR frame to the post-IPE 442. In some examples, the MFHDR engine 440 can apply tone mapping to bring the different parts of the frame to a desired brightness level. In some examples, each MFHDR input is a separate MFNR output (e.g., long and short inputs/outputs). The post-IPE 442 can perform additional image processing operations on the HDR frame from the MFHDR engine 440 to generate a final output frame or image. The additional image processing operations performed by the post-IPE 442 can include, for example, Gamma, sharpening, color fine touches, upscale, grain, among others.

The sensor 430 also outputs positive-shutter-lag (PSL) frames or images during a PSL capture 444. The PSL frames are captured with relatively longer exposure times (and/or corresponding gain) as compared to the ZSL frames and are referred to as long exposure frames 446 (referred to in FIG. 4 as "Long Exp" frames or images), as noted above. AWB statistics 448 from the long exposure frames 446 are provided to a first AWB engine 450 (shown as "AWB 1"). The first AWB engine 450 can generate white balance (WB) scalers 451, and can output the WB scalers 451 to the first MFxR engine 436 and/or to a second MFxR engine 452 (e.g., an engine that can perform MFNR and/or MFSR). In some examples, the WB scalers 451 can include three coefficients addressing the red, green, and blue gain scale that can be applied to achieve tintless gray color under a certain observer. In one illustrative example, the WB scalers 451 can include a coefficient value of 1.9 for red (R), a coefficient value of 1.0 for green (G), and a coefficient value of 1.6 for blue (B). The long exposure frames 446 are also output to the second MFxR engine 452. In some cases, the first MFxR engine 436 and the second MFxR engine 452 can be implemented by the same hardware using the same processing techniques, but the hardware can have different tuning settings when implementing the first MFxR engine as compared to the second MFxR engine. As shown in FIG. 4, the second MFxR engine 452 can output the long exposure frames 446 as preview frames 454 (e.g., displayed before the shutter or capture command is received and/or while the capture processing based on the shutter command is still being performed) on a display of the frame processing and/or capture instruction system 400 or a device including the frame processing and/or capture instruction system 400. In some examples, the second MFxR engine 452 can generate a blended frame 456 based on the long exposure frames 446 (e.g., by fusing or blending the long exposure frames). The blended frame 456 is output to the MFHDR engine 440 and is also output to a low-light (LL) engine 458 that can extract AWB statistics. The AWB statistics are output to a second AWB engine 460 (shown as "AWB 2"). In some cases, the first AWB engine 450 and the second AWB engine 460 can be implemented by the same hardware using the same processing techniques, but the hardware can have different tuning settings when implementing the first AWB engine as compared to the second AWB engine. The second AWB engine 460 can generate WB scalers 461, and can output the WB scalers 461 to the MFHDR engine 440. The MFHDR engine 440 outputs a combined frame (e.g., an HDR frame) to the post-IPE 442, as described above.

As shown in FIG. 4, the frame processing and/or capture instruction system can perform a low-light (LL) decision 462 to determine a number of frames (or images) and an exposure time (and/or corresponding gain) for each of the images/frames. Further details regarding determining the number of frames and exposure time (and/or gain) are described below with respect to FIG. 12-FIG. 17B. In some examples, the LL engine 458 can make the LL decision 462. Based on the LL decision 462, an automatic exposure control (AEC) engine 464 can perform AEC to determine exposure parameters (e.g., exposure duration, gain, etc.) for the sensor 430. For instance, the AEC engine 464 can send (to the sensor 430) an indication of the number of frames to capture and the exposure time (and/or the sensor gain) for the number of frames based on the LL decision 462.

Figure 5:
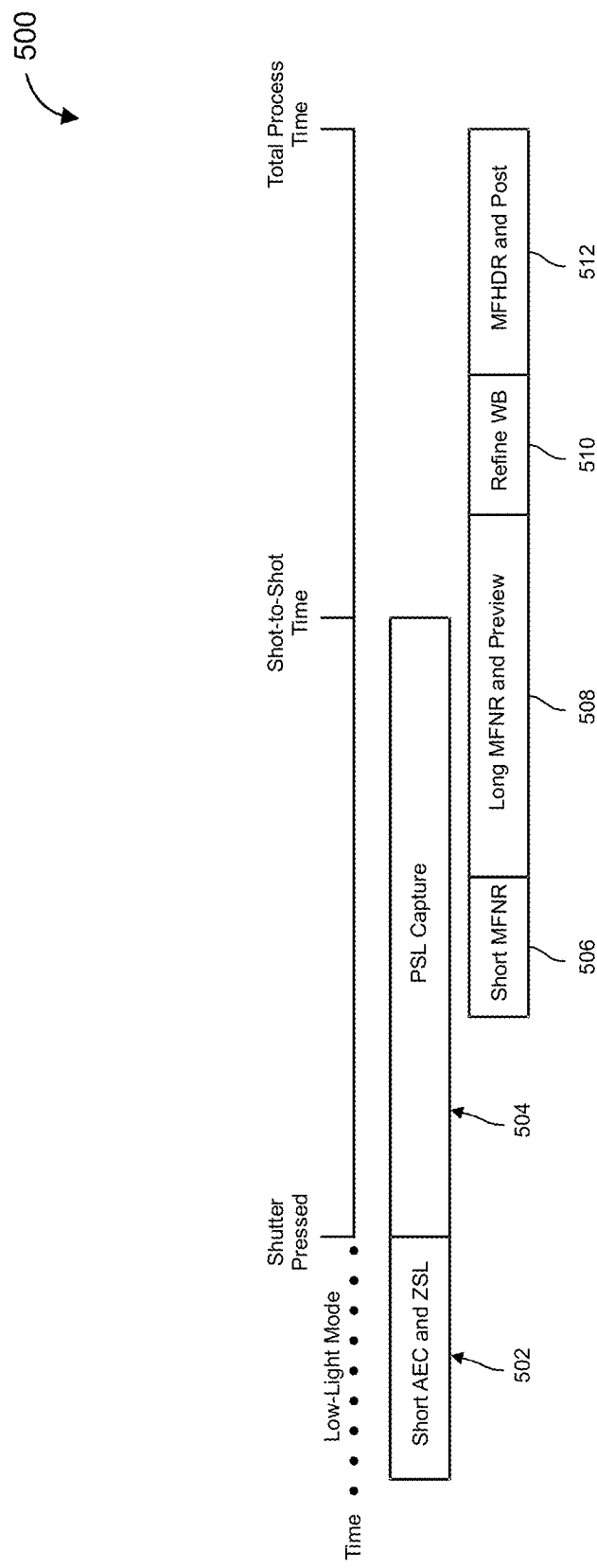
FIG. 5 is timing diagram illustrating an example of timing of different processes performed by the frame processing and/or capture instruction system of FIG. 4, in accordance with some examples.

FIG. 5 is timing diagram 500 illustrating an example of timing of different processes performed by the frame processing and/or capture instruction system 400. For example, the timing diagram illustrates a low-light (LL) mode, when a shutter is activated (e.g., pressed or otherwise selected, corresponding to receipt of a shutter or capture command), a shot-to-shot time, and a total process time. Shot-to-shot time refers to the duration between two consecutive user initiated image captures (e.g., between activation of a shutter or capture option, such as selection of a shutter/capture button). As shown, ZSL frames 502 (e.g., with short AEC) are captured before the shutter is pressed. In some cases, AEC is the parent algorithm that controls exposure, gain, etc. AEC also has a sensor interface. In some examples, AEC has three meterings: short, safe, long. Short results in highlights being preserved, safe results in balanced exposure, and long prioritizes dark regions. The ZSL frames 502 are the preview images, and can be used as short exposure frames (e.g., to preserve highlights) as noted above. Accordingly, the ZSL frames 502 can be captured according to the short AEC metering. Once the shutter is pressed, PSL frames 504 are captured, after which short multi-frame noise reduction (MFNR) 506 and long MFNR and preview 508 are applied. The white balance (WB) is refined by performing WB refinement 510, and MFHDR and post-processing 512 can then be applied.

Figure 6:
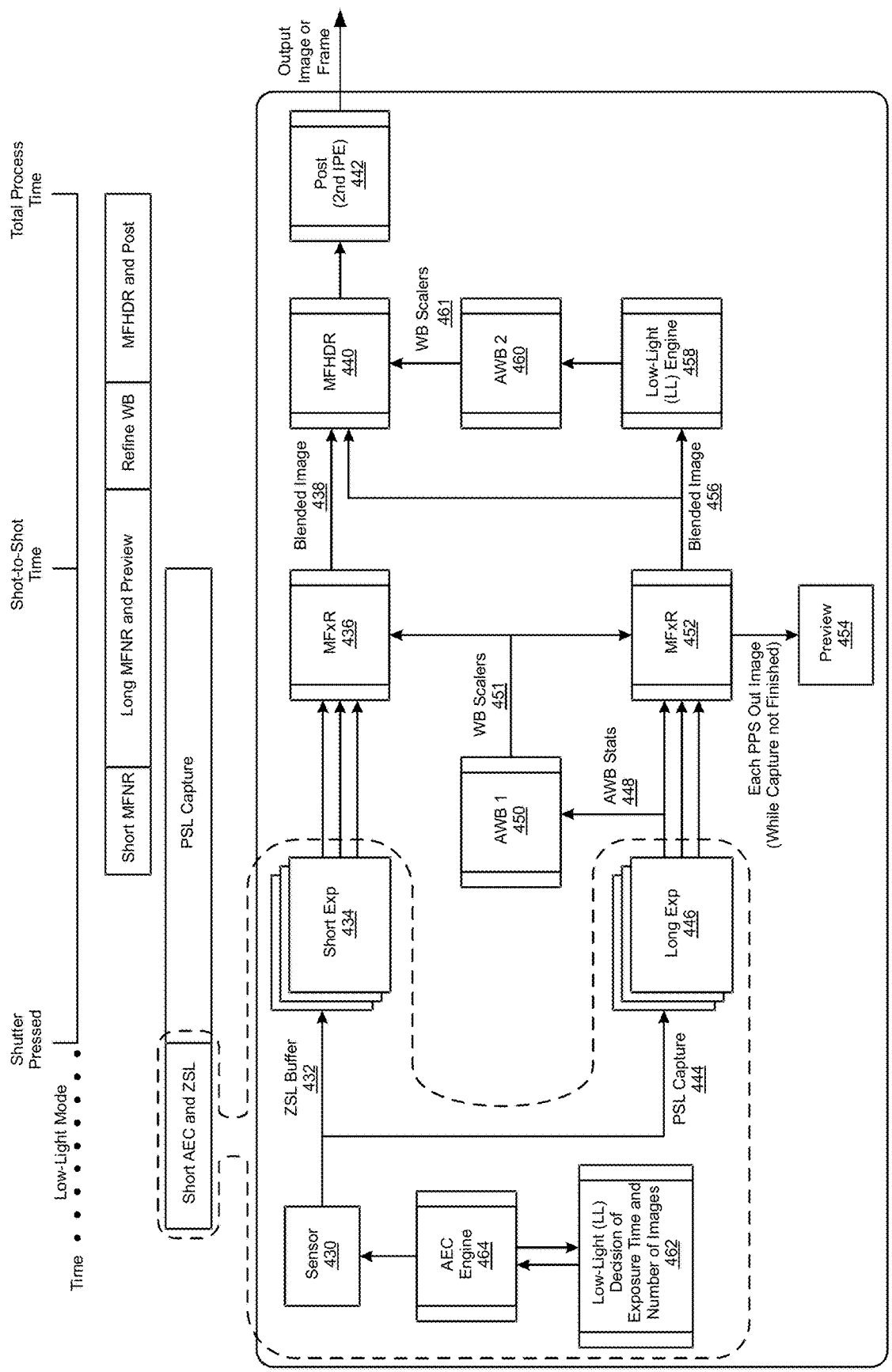
FIG. 6-FIG. 11 are diagrams illustrating an example of an implementation of the frame processing and/or capture instruction system of FIG. 4, in accordance with some examples.

FIG. 6-FIG. 11 are diagrams illustrating an example of an implementation of the frame processing and/or capture instruction system 400 of FIG. 4 according to the timing diagram 500 of FIG. 5. FIG. 6 illustrates use of the frame processing and/or capture instruction system 400 during the LL mode timing of the timing diagram 500 shown in FIG. 5. As noted above, the LL mode includes short AEC and ZSL (before the shutter is activated). In some cases, the LL mode (the short AEC setting and ZSL capture) can be performed as a first step of a frame processing and/or capture instruction process. The AEC engine 464 can set the ZSL based on the LL decision 462 (e.g., by the LL engine 458). For example, the AEC engine 464 can determine a shutter priority (e.g., a setting that allows a specific shutter speed (corresponding to a exposure time) to be used, after which the AEC engine 464 will calculate the gain to complement the shutter speed/exposure time), such as according to user configuration or an automatic setting (e.g., in valid ZSL range, such as between [1/7-1/15] sec), in order to set the exposure (using short AEC) used to capture the short exposure frames 434 (also referred to as ZSL frames or images). In some cases, shutter speed can refer to a sensor exposure time or effective sensor readout time (e.g., for devices that include no physical shutter). The AEC engine 464 can select the gain from an AEC "short" metric with slight over exposure. The AEC engine 464 can determine frame sets based on the determined AEC settings. For example, larger frame intervals can be determined for gain change (e.g., a sequence of [3-8] frames with same gain). In some cases, the frame processing and/or capture instruction system 400 can determine whether MFHDR is to be used (e.g., whether to use an MFHDR mode or a non-MFHDR mode by the MFHDR engine 440) for processing the short exposure frames 434 (e.g., based on the dynamic range calculation). In some examples, the frame processing and/or capture instruction system 400 can further calculate a dynamic range for the short exposure frames 434. For instance, the dynamic range can be determined from an AEC "long" to "short" ratio. In one illustrative example, in order to determine the desired mode (e.g., whether to use MFHDR or non-MFHDR) and some additional configurations, the frame processing and/or capture instruction system 400 can determine the "amount" of the dynamic range in the scene, such as by calculating the ratio from extreme metering of the AEC (e.g., between the short and long meterings). If the frame processing and/or capture instruction system 400 determines that the MFHDR mode is to be used, the short exposure frames 434 can be processed using adaptive dynamic range control (ADRC). The sensor 430 can capture the short exposure frames 434 based on the exposure settings. The short exposure frames 434 can then be stored in the ZSL buffer 432. In some cases, the previous raw frames (or images) with the same gain can be stored in the ZSL buffer 432. In some cases, the previous raw frames (or images) with similar gain or similar sensitivity can be stored in the ZSL buffer 432.

Figure 7:
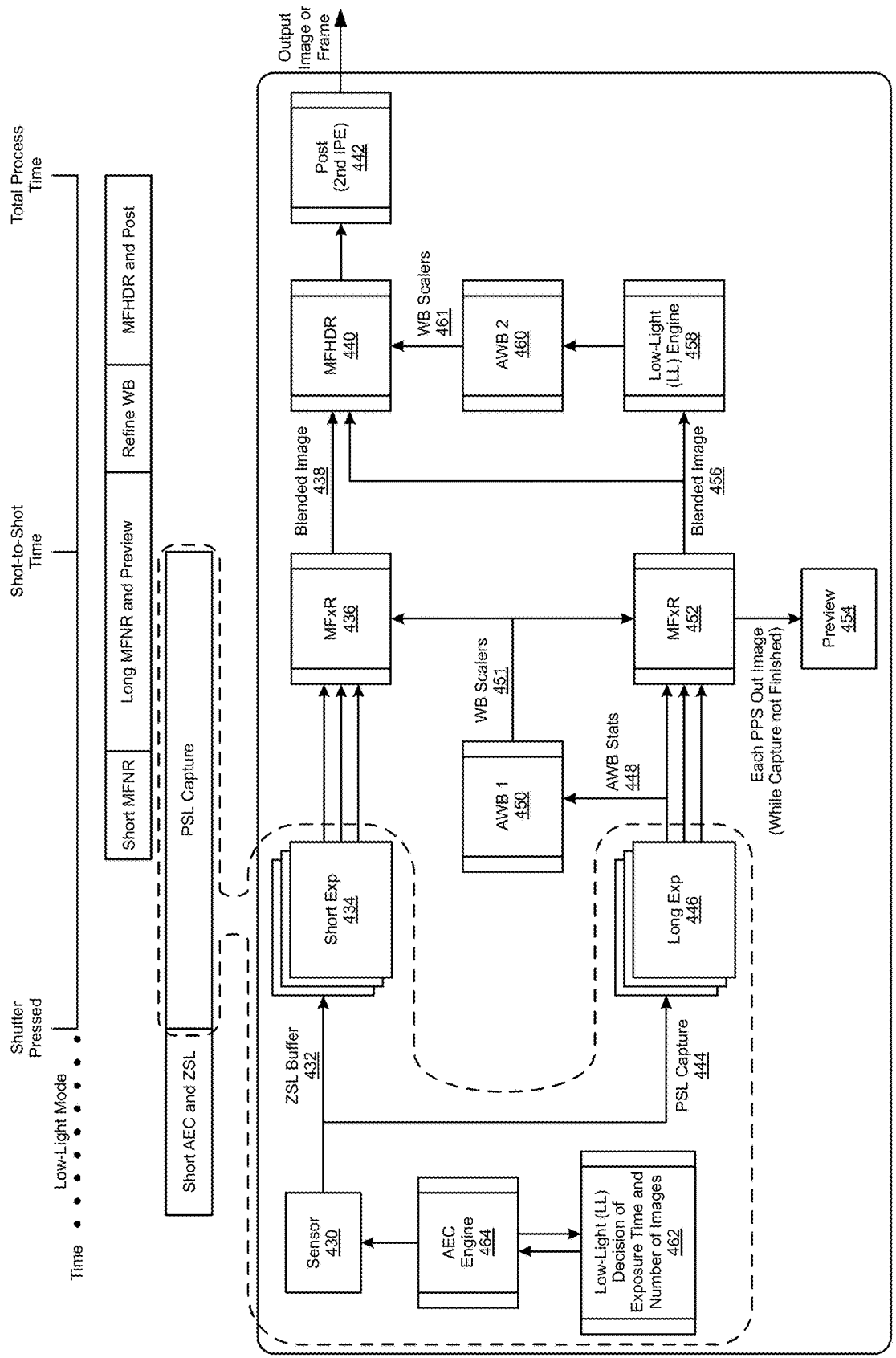

FIG. 7 illustrates use of the frame processing and/or capture instruction system 400 during the PSL capture timing of the timing diagram 500 shown in FIG. 5. As noted above and shown in FIG. 5, the PSL capture can occur in response to the shutter or capture command being received. In some cases, the PSL capture can be performed as a second step of the frame processing and/or capture instruction process. For the PSL capture, the frame processing and/or capture instruction system 400 can measure scene motion or movement (e.g., local motion corresponding to movement of one or more objects in the scene for which frames are being captured). In some examples, the LL engine 458 or other component of the frame processing and/or capture instruction system 400 can use collected sensor measurements (e.g., from one or more inertial measurement units (IMUs), such as a gyrometer or gyroscope, an accelerometer, any combination thereof, and/or other IMUs) and/or preview motion analysis statistics to determine global motion corresponding to movement of the device or camera of the device. For instance, the IMUs provide means to mechanically estimate camera motion, which can be used by the frame processing and/or capture instruction system 400 to determine how much shake is present when frames (e.g., images or pictures) are taken. For example, the frame processing and/or capture instruction system 400 can analyze the IMU samples (e.g., gyrometer or gyroscope samples, accelerometer samples, or the like) with regard to an optical image stabilizer (OIS). In some examples, to determine whether a tripod was used, the frame processing and/or capture instruction system 400 can cross-reference the IMU measurements with a video analytics tripod detection mechanism.

In some examples, the frame processing and/or capture instruction system 400 can determine an amount of local motion associated with one or more preview frames (e.g., the ZSL frames captured during the LL mode timing of the timing diagram 500 shown in FIG. 5 or shortly thereafter during a sensor delay period). To determine the amount of local motion, the frame processing and/or capture instruction system 400 can analyze temporal filter indications (TFI), which can be referred to herein as motion maps. For instance, a TFI (or motion map) can be included as metadata with each frame (e.g., with each of the one or more preview frames), such as first TFI metadata for a first frame, second TFI metadata for a second frame, etc. In some cases, the TFI includes an image (referred to as a TFI image or motion map image). In some examples, the TFI image can have a same resolution (with a same number of pixels in a horizontal direction and a vertical direction) as a frame for which the TFI image is associated (e.g., the frame for which the TFI image is included as metadata). In some examples, the TFI image can have a lower resolution (with less pixels in a horizontal direction and/or a vertical direction) as compared to the frame for which the TFI image is associated. For instance, each pixel of the TFI image can include a value indicating an amount of motion for each corresponding pixel of the frame associated with the TFI image. In some cases, each pixel of the TFI can include a confidence value indicating a confidence associated with the value indicating the amount of motion. In some cases, the TFI can represent the image areas that could not be temporally blended after global motion compensation during preview, and may indicate the local motion component in the scene.

In some examples, a Semi Global Match (SGM) image can be used in addition to or as an alternative to a TFI image. An SGM is a residue motion vector map (indicating local 2D and/or 3D motion) after global compensation is performed. The SGM can be used as a local motion indicator, similar to that described above with respect to the TFI images. For instance, the SGM can be obtained (e.g., as input) after global alignment is corrected (e.g., using OIS).

Using the information from the TFI and/or SGM images, the frame processing and/or capture instruction system 400 can predict the local motion during the capture of a frame. As described in more detail herein, a combination of global motion (e.g., based on sensor measurements, such as gyroscope measurements) and the local motion (e.g., as indicated by the TFI), referred to as a final motion indication (FMI), can be determined.

The AEC engine 464 can set the long AEC used to capture the long exposure frames. For example, the LL engine 458 can provide a new combination of exposure and gain to the AEC engine 464 (e.g., a single exposure can reach 1 second on a tripod). The LL engine 458 can also determine the number of the long frames. In some cases, as described herein, the LL engine 458 can determine the exposure and the number of long frames based on the local motion (e.g., indicated by the TFI), the global motion, or the FMI. The sensor 430 can then capture the PSL images or frames (the long exposure frames 446). In some examples, additional ZSL frames (short exposure frames) may be captured when capturing the PSL frames. The additional ZSL frames can be stored in ZSL buffer 432. In some cases, the first AWB engine 450 can calculate AWB from the first PSL frame that is captured by the sensor 430. The first AWB engine 450 can output the WB scalers 451 to the first MFxR engine 436 and/or to the second MFxR engine 452. After the first PSL frame is captured, the frame processing and/or capture instruction system 400 can begin a next portion of the capture process (e.g., a third step of the frame processing and/or capture instruction process, such as the MFNR described with respect to FIG. 8).

Figure 8:
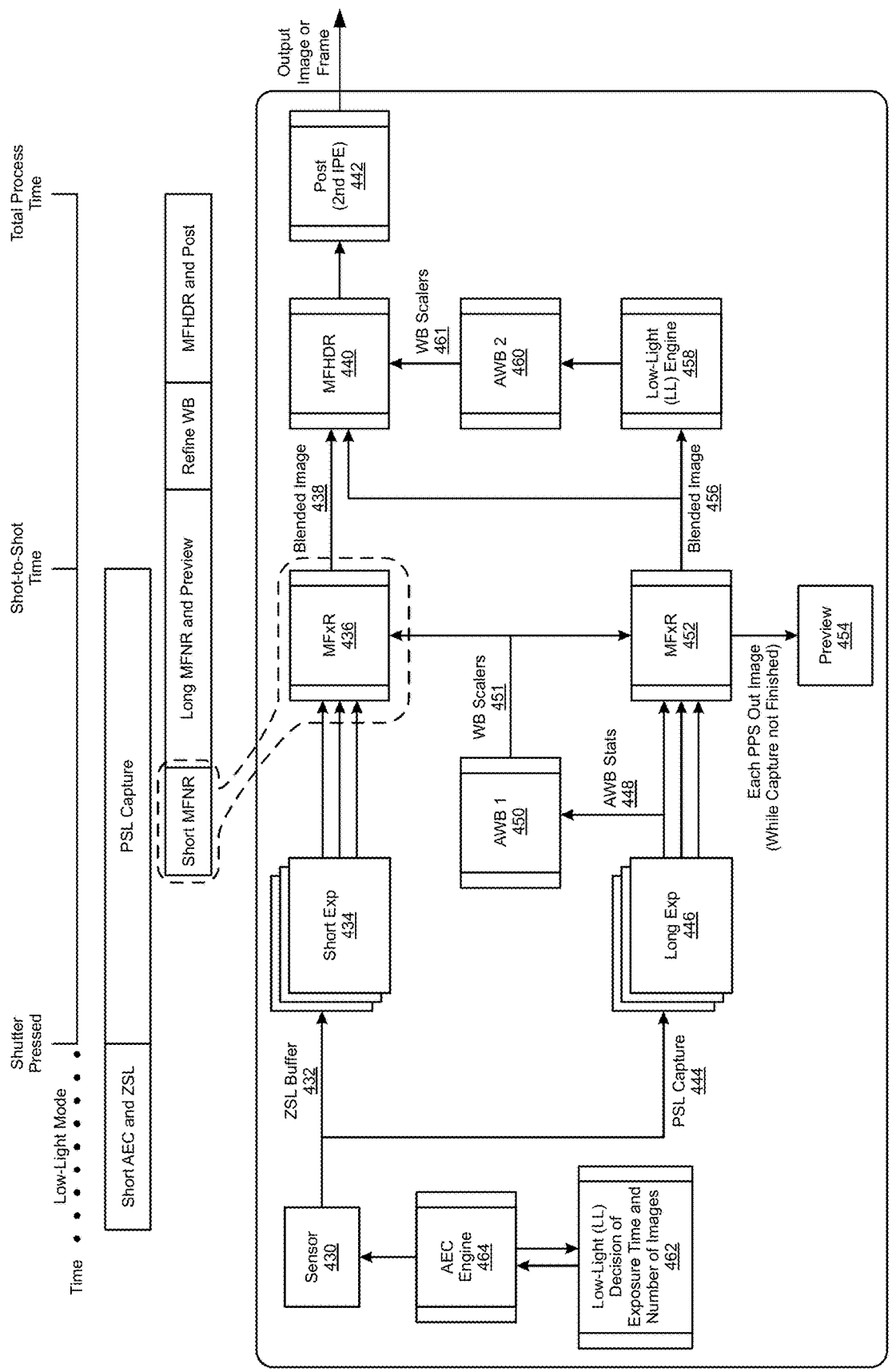

FIG. 8 illustrates use of the frame processing and/or capture instruction system 400 during the short MFNR of the timing diagram 500 shown in FIG. 5. For example, during the PSL capture, the first MFxR engine 436 can perform MFNR on the short exposure frames. In some cases, the short MFNR can be performed as a third step of the frame processing and/or capture instruction process. In some examples, the first MFxR engine 436 can use the calculated WB from the second step of the frame processing and/or capture instruction process (e.g., the AWB from the first PSL frame). As noted above, the frame processing and/or capture instruction system 400 can determine whether MFHDR mode is required for processing the ZSL frames (e.g., the short exposure frames 434). If the frame processing and/or capture instruction system 400 determines that MFHDR mode is to be used, the first MFxR engine 436 can determine not to perform MFNR on the short exposure frames.

Figure 9:
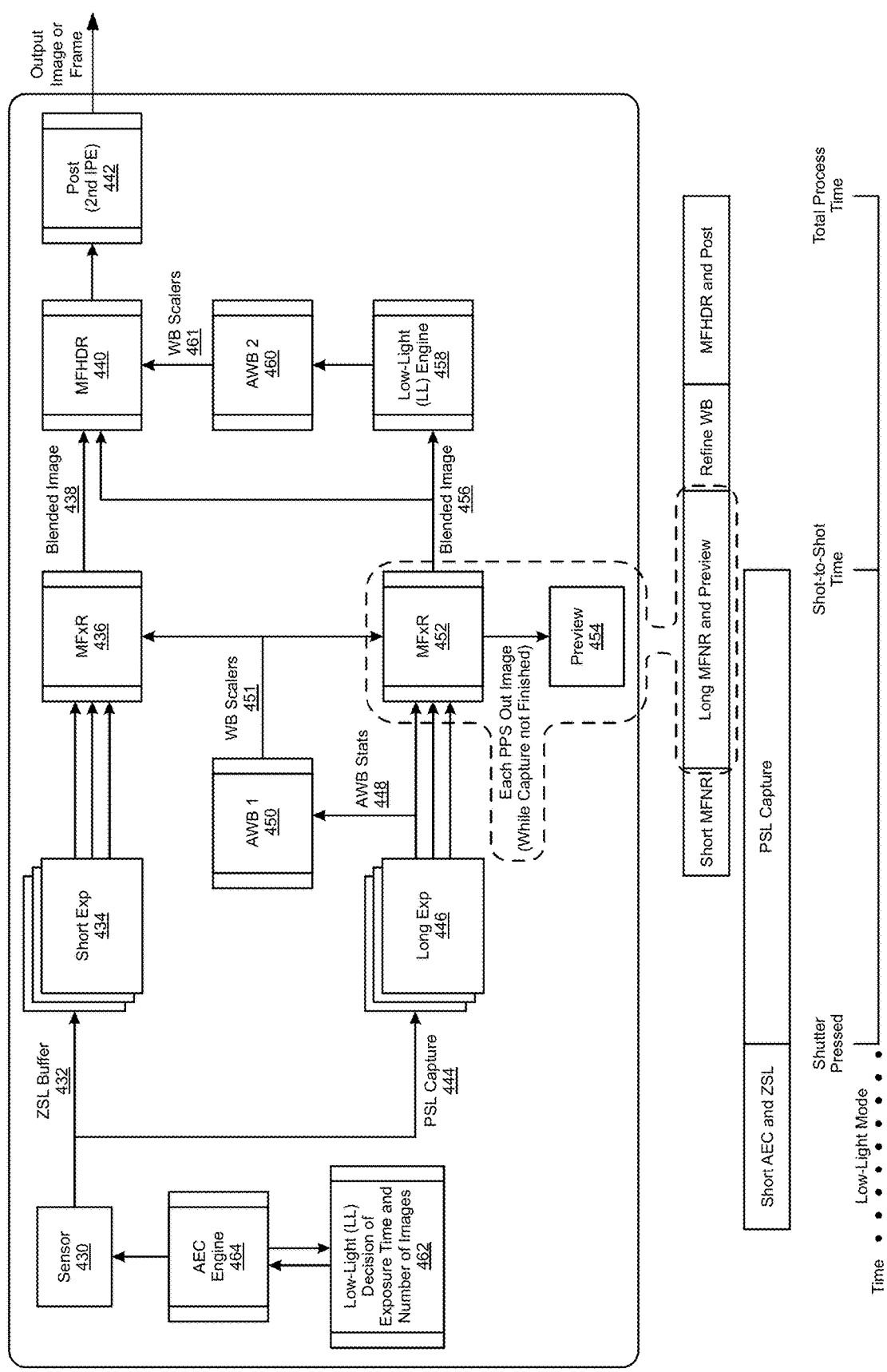

FIG. 9 illustrates use of the frame processing and/or capture instruction system 400 during the long MFNR and preview 508 portion of the timing diagram 500 shown in FIG. 5. For example, the second MFxR engine can perform MFNR on the long exposure frames and can output the frames for preview. In some cases, the long MFNR and preview can be performed as a fourth step of the frame processing and/or capture instruction process. For processing the long frames using MFNR, the second MFxR engine 452 can use the calculated WB from the second step of the frame processing and/or capture instruction process (e.g., the AWB from the first PSL frame). In some examples, if the frame processing and/or capture instruction system 400 determines that non-MFHDR mode is to be used (when MFHDR is not required), the second MFxR engine 452 can use Global Tone Mapping (GTM) in addition to Local Tone Mapping (LTM). In some cases, GTM applies gain for each pixel according to the luma value of the pixel. In some cases, LTM applies a different gain value according to regional brightness. The second MFxR engine 452 can continue to process each aggregated frame or image with Position Processing Segment (PPS) (e.g., the location in the processing pipeline local tone mapping, sharpening, color correction, upscaling, etc. is performed). In some cases, an aggregated frame can be the result of multiple fused frames combined into a single image or frame (e.g., based on application of the MFNR and/or MFHDR process). In some examples, in addition to IPE TF FULL OUT (MFNR NPS out), the second MFxR engine 452 can continue to perform PPS for IPE DISP OUT result. In some cases, each of the long exposure frames 446 may have slightly stronger LTM (e.g., a brightening effect). The second MFxR engine 452 can send each PPS result for display as a preview frame 454, as described above. In some cases, the preview will return to the ZSL buffer 432 after all PSL frames (long exposure frames 446) have finished being capturing by the frame processing and/or capture instruction system 400.

Figure 10:
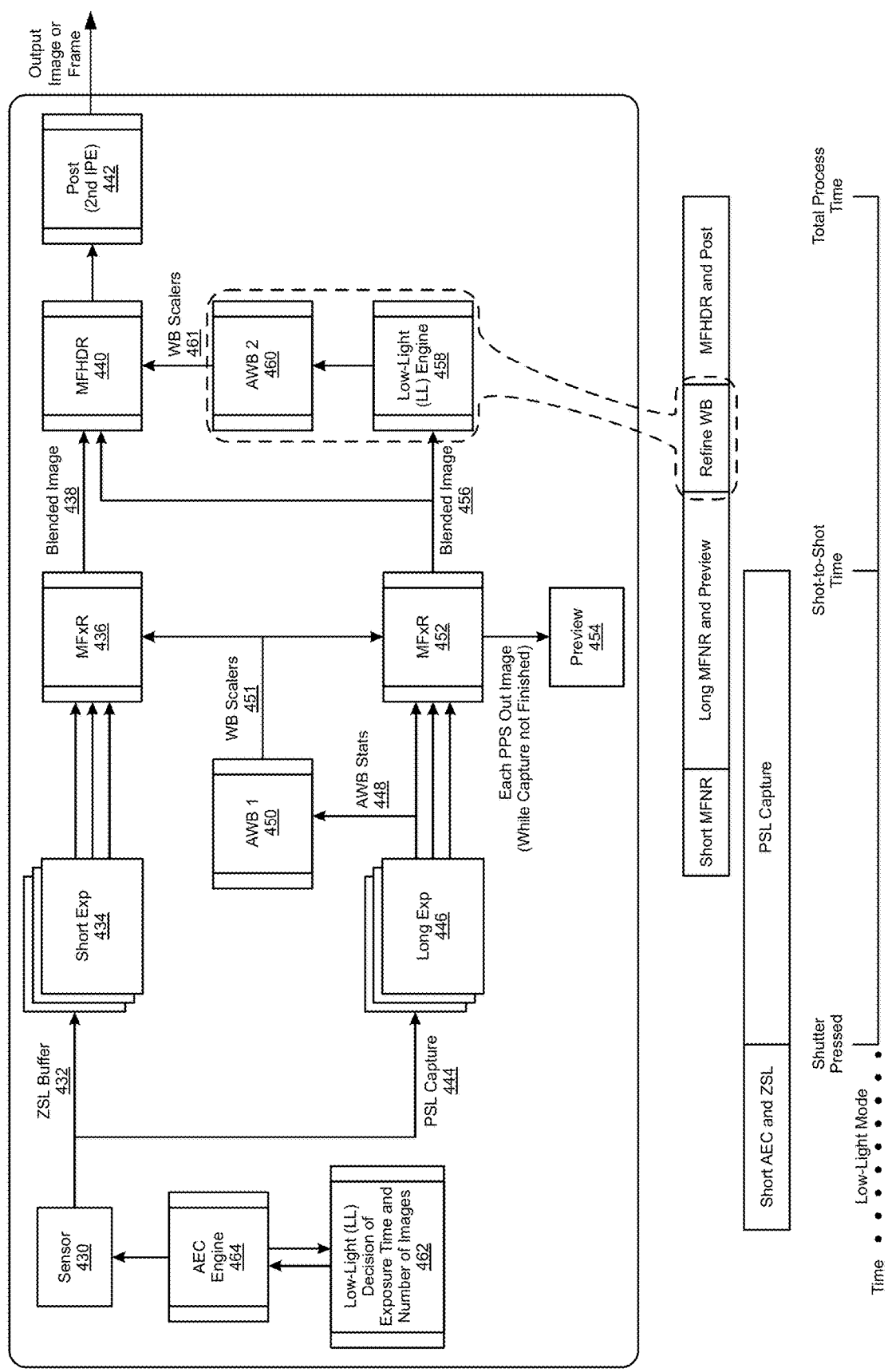

FIG. 10 illustrates use of the frame processing and/or capture instruction system 400 during the Refine WB 510 portion of the timing diagram 500 shown in FIG. 5. The Refine WB 510 can include refinement of WB for the long exposure frames 446 to create better AWB statistics. In some cases, the refinement of the WB can be performed as a fifth step of the frame processing and/or capture instruction process. To create better AWB statistics for the long exposure frames 446, the LL engine 458 can perform an "inverse ISP" on the long MFNR result (e.g., the blended frame 456 from the MFxR engine 452) to generate improved AWB statistics. For instance, in order to recalculate WB coefficients in some cases, the frame must be an AWB compatible image. In some cases, the inverse ISP function can include reversal of the operations performed on the raw frame or image, which results in a linear frame or image (e.g., a linear RGB frame or image). The resulting linear frame can be used to re-generate the statistics on an improved SNR frame. The inverse ISP can result in better statistics for all the adjustments thereafter. Using the refined/improved AWB statistics for the long exposure frames, the second AWB engine 460 can calculate refined WB scalers (e.g., as part of WB scalers 461). In some examples, the LL engine 458 can calculate the refined WB scalers.

Figure 11:
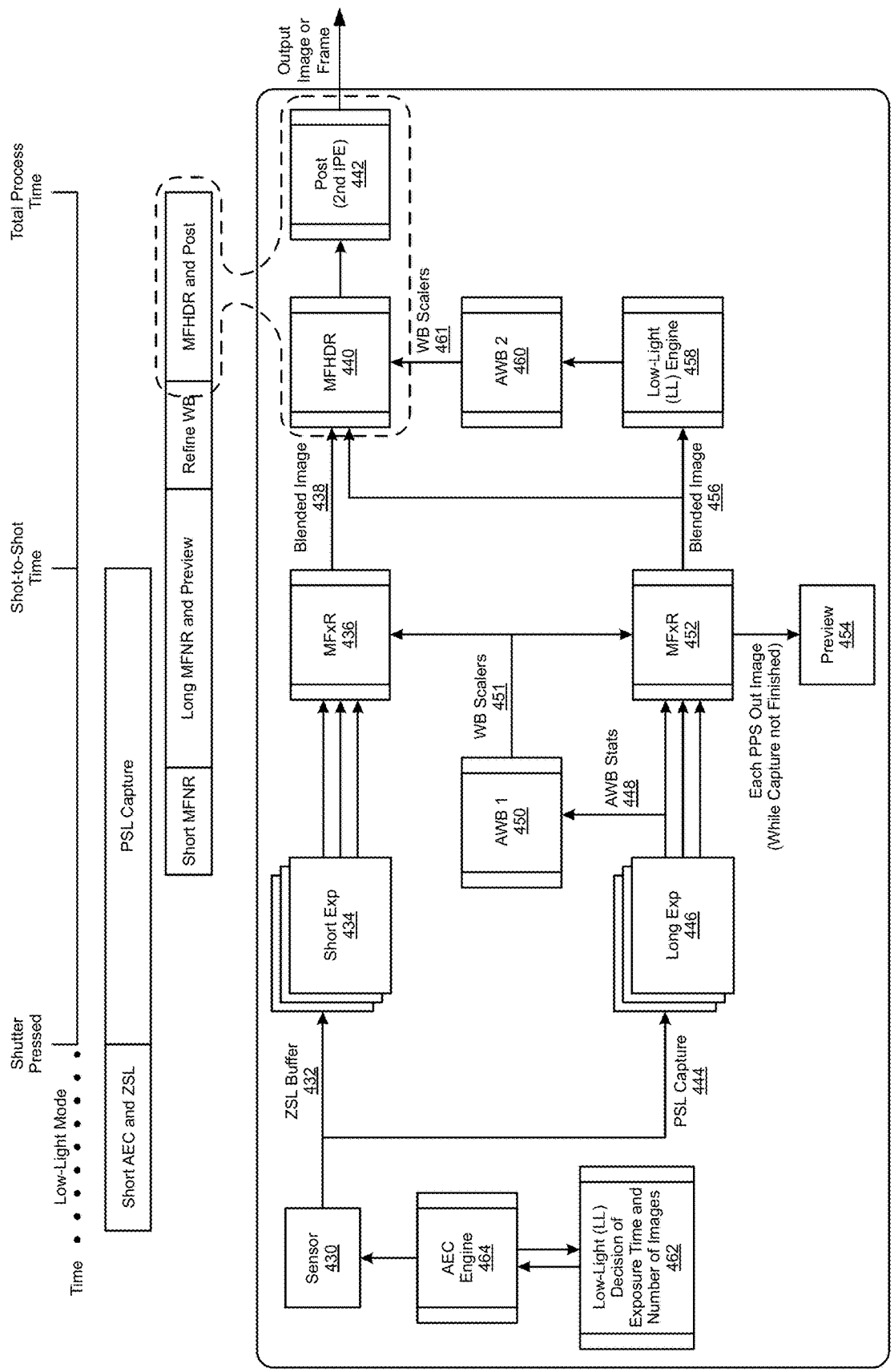

FIG. 11 illustrates use of the frame processing and/or capture instruction system 400 during the MFHDR and post-processing 512 portion of the timing diagram 500 shown in FIG. 5. In some cases, the MFHDR and post-processing 512 can be performed as a sixth step of the frame processing and/or capture instruction process. For example, the MFHDR engine 440 can use the refined WB scalers 461 from the second AWB engine 460 (e.g., determined during the fifth step of the frame processing and/or capture instruction process). In some examples, if the frame processing and/or capture instruction system 400 determines that non-MFHDR mode is to be used (MFHDR is not required), the frame processing and/or capture instruction system 400 can output only the PPS frames to the post-IPE. In some examples, the post-IPE can be used to smooth "chroma stains." In some examples, the post-IPE includes a machine learning system (e.g., one or more neural network systems). For instance, a machine learning based image signal processor can be used as the post-IPE for overall frame or image refinement.

As noted above, in some implementations, a frame processing and/or capture instruction system (e.g., an LL engine) can determine scene motion (also referred to as in-scene motion or local motion), such as based on movement of one or more objects in the scene for which frames or images (e.g., preview or short exposure frames or images) are being captured. In some cases, as noted above, an LL engine or other component of a frame processing and/or capture instruction system can use collected sensor measurements (e.g., from an inertial measurement unit (IMU), such as a gyroscope or gyrometer, an accelerometer, and/or other IMU) and/or preview CVP motion analysis statistics to evaluate the motion. In some cases, a motion-aware algorithm can be used to enhance execution of the frame processing and/or capture instruction systems and processes described herein. The motion-aware algorithm can optimize the noise to motion blur to shot-to-shot time. In some cases, the motion-aware algorithm can perform global motion analysis (e.g., based on movement of the camera) and/or local motion analysis (e.g., based on movement of objects in the scene) to determine an indication of motion. The local motion analysis can be based a temporal filter indication (TFI). In some cases, the TFI can be an image with a pixel value for each pixel indicating an amount of motion for each pixel (e.g., whether and/or how much each pixel has motion or does not have motion). In some cases, as noted above, each pixel of the TFI can include a confidence value indicating a confidence associated with the value indicating the amount of motion. The TFI can also be referred to as a motion map in some cases. In some cases, the TFI can be provided as part of a native camera flow that produces motion vector maps, which can be used the frame processing and/or capture instruction system (e.g., by the LL engine). In some cases, the TFI can include sparse motion vectors (e.g., undistorted, non-stabilized or stabilized) indicating the amount of motion for each pixel (e.g., in a horizontal direction and a vertical direction), a dense motion map (e.g., undistorted, non-stabilized) with motion vectors per pixel, and/or a distortion correction grid. In some examples, the local motion indication (of a given TFI) can be based on ghost detection, such as by averaging the amount of ghost detected during a temporal filtering process. In some examples, the local motion indication (of a given TFI) can be based on residual dense motion map averaging and/or counting of significant motion vectors.

Based on analysis of global motion, the frame processing and/or capture instruction system can compensate for the global motion (e.g., reduced using image stabilization techniques, such as by using an optical image stabilizer (OIS)). In some cases, the frame processing and/or capture instruction system can analyze the local motion indicated by the TFI (in addition to or as an alternative to the global motion), such as to determine whether motion blur needs to be reduced (e.g., if the local motion is above a motion threshold). Based on the local and/or global motion analysis, the motion-aware algorithm can optimize exposure parameters (e.g., exposure duration and/or gain), one or more 3 A settings such as auto-white balance (AWB), automatic exposure control (AEC) and autofocus, and/or other parameters. The motion-aware algorithm can be used for low-light conditions, ultra-low-light conditions, normal light conditions, and/or other lighting conditions. In some cases, an optional machine learning system can be used for texture and noise improvements, as noted above.

Figure 12:
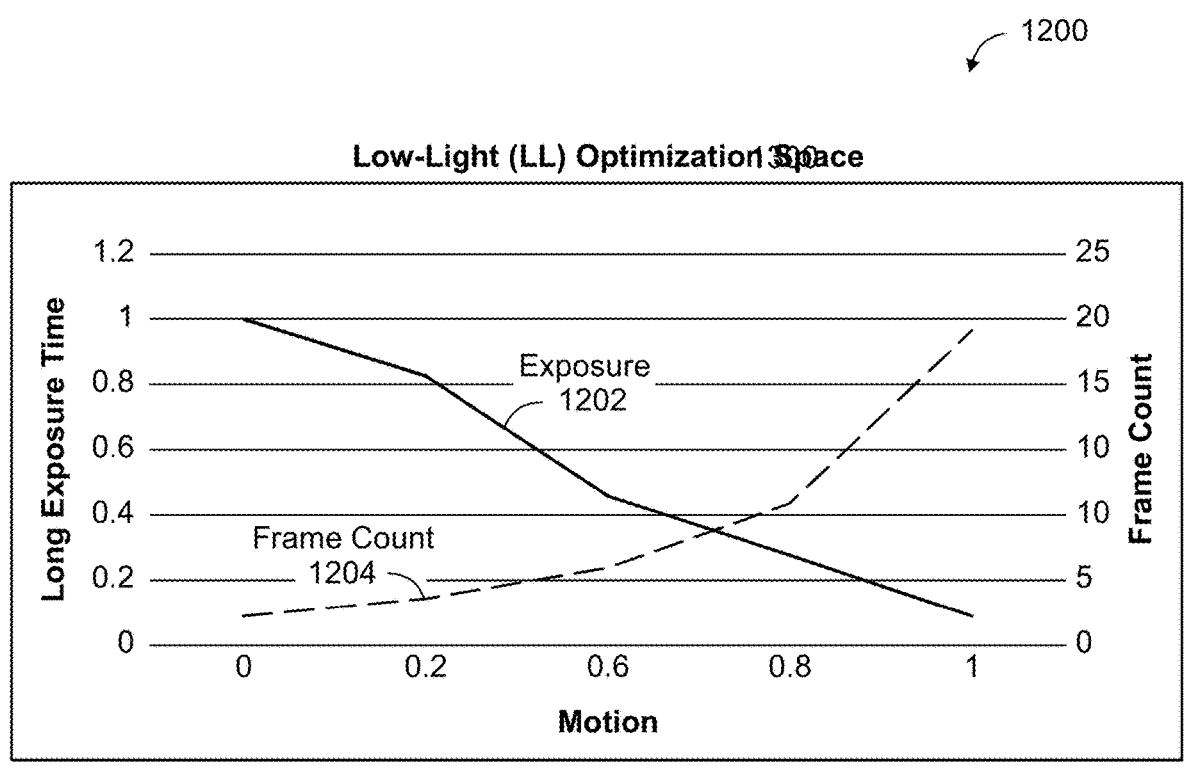
FIG. 12 is a graph plotting motion versus exposure duration (or exposure time) and frame count, in accordance with some examples.

FIG. 12 is an illustration of a graph 1200 plotting motion versus exposure time and frame count. The x-axis of the graph 1200 plots the amount of motion. The line 1202 represents the exposure, and the line 1204 represents the frame count. The values in the graph 1200 (or other values) can be used to determine the long exposure time and the frame count (e.g., for inputting to MFNR, MMF, etc.) based on the motion (local motion) indicated by the TFI, the global motion, or a combined motion determined using the global motion and local motion (based on the TFI). If the motion is determined to be low (e.g., a small amount of motion is detected, such as motion less than a motion threshold), the frame count will be low and the exposure (e.g., exposure time, aperture, etc.) will be increased. As more motion is detected (e.g., an amount of motion greater than a motion threshold), corresponding to moving from left-to-right in the graph 1200, the exposure (e.g., exposure time, aperture, etc.) that can be used to achieve suitable motion blur results is decreased until a minimum exposure limit is reached. In some cases, based on the determined motion, the gain can be adjusted in addition to or as an alternative to the exposure (e.g., exposure time, aperture, etc.). In some cases, the minimum exposure limit can be equal to a long exposure time that is used for preview images/frames (e.g., because the frame processing and/or capture instruction system may not expose a frame or image less than the exposure used for short exposure/preview/displayed frames). Further, as more motion is determined, the frame count (corresponding to the number of captured frames increases) is increased in order to compensate for the brightness of the frame that is due to the decreasing exposure (which causes the gain to increase).

In some cases, the motion depicted on the x-axis of the graph 1200 can correspond to both local and global motion (e.g., a combination of local and global motion). For example, the frame processing and/or capture instruction system can separately calculate global motion and local motion, and can apply weights to the local motion and the global motion (e.g., using a first weight for the local motion value and a second weight for the global motion value) to generate a final motion indication. The frame processing and/or capture instruction system can use the final motion indication to determine how much to reduce or increase the exposure (e.g., exposure time, aperture, etc.) and/or the gain and how much to reduce or increase the frame count (e.g., for outputting to the MFNR, MMF, etc.).

In some examples, the frame processing and/or capture instruction system can determine global motion (referred to as a global motion indication or GMI) in the range of [0,1]. In such examples, the value of 0 can indicate no motion for a pixel, and the value of 1 can indicate maximum motion for a pixel. The frame processing and/or capture instruction system can determine local motion (referred to as a local motion indication or LMI) in the range of [0,1], where the value of 0 indicates no motion and the value of 1 indicates maximum motion. In some cases, LMI can be calculated by cropping the TFI image to some extent (e.g., to reduce the influence from global motion), averaging the cropped map, normalizing the values, and applying exponents to reflect sensitivity. An LMI weight (referred to as LMI weight) in the range of [0,1] represents how sensitive the frame processing and/or capture instruction system is to LMI. One example LMI weight value is a value of 0.4. A final motion indication (FMI) can be determined based on the local motion (in the TFI) and the global motion. In one illustrative example, the FMI can be determined as lin_blend(GMI, GMI*LMI, LMI_weight)^2, where lin_blend is a linear blending operation. In another illustrative example, the FMI can be determined as lin_blend(GMI, GMI*LMI, LMI_weight), similar to the prior example without the non-linear response (^2).

Figure 13:
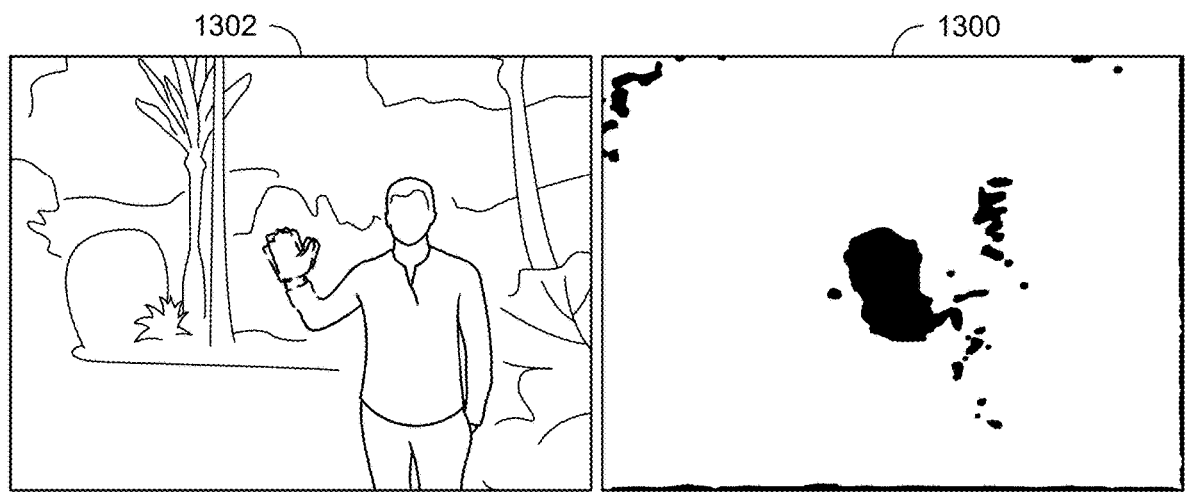
FIG. 13 is a diagram illustrating an image and a temporal filter indication (TFI) image, in accordance with some examples.

FIG. 13 is a diagram illustrating an image 1302 (or frame) and a TFI image 1304. The motion illustrated in FIG. 13 is local motion (also referred to as in-scene motion). In the image 1302, the person is waving a hand. The TFI image 1304 includes white pixels for portions of the image 1302 that do not have motion and black pixels for portions of the image 1302 that have motion. The black pixels correspond to the portion of the user (the right hand) that is moving and part of the clouds in the background. The frame processing and/or capture instruction system can determine whether the motion indicated in the TFI image 1304 (or the motion indicated by an FMI that is based on the local motion of the TFI image 1304 and global motion) is greater than a motion threshold. An example value for the motion threshold is 0.3, indicating a linear sensitivity to motion. For example, if the motion indicated by the TFI (or the FMI) is 0.4, then the motion is greater than the motion threshold of 0.3. If the frame processing and/or capture instruction system determines that the motion is less than the motion threshold, the exposure time and number of frames may not change for capturing the long exposure frames or images. Referring to FIG. 12, the frame processing and/or capture instruction system can determine a motion value of 0 when the motion is determined to be less than the motion threshold. If the frame processing and/or capture instruction system determines that the motion is greater than the motion threshold, the frame processing and/or capture instruction system can decrease the exposure (e.g., exposure time, aperture, etc.) and/or increase the frame count (thus increase number of long exposure frames that are captured). Referring to FIG. 12, the frame processing and/or capture instruction system can determine a motion value of 0.4 based on the particular amount of motion when the motion is determined to be greater than the motion threshold.

Figure 14A:
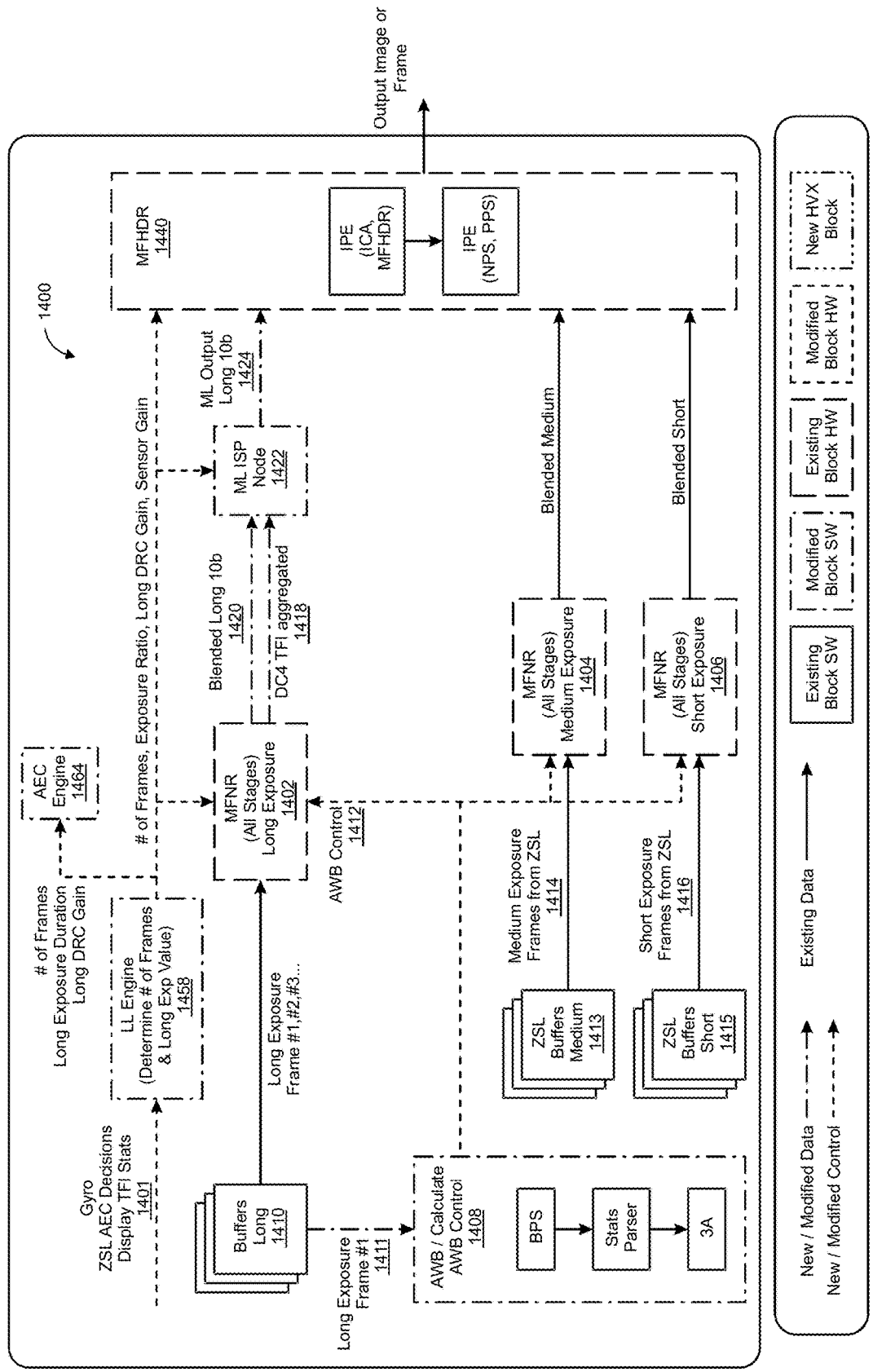
FIG. 14A is a diagram illustrating another example of a frame processing and/or capture instruction system, in accordance with some examples.

FIG. 14A is a diagram illustrating an example of a frame processing and/or capture instruction system 1400. One or more of the components of the frame processing and/or capture instruction system 1400 of FIG. 14 can be similar to and perform similar operations as like components of the frame capture and processing system 100 of FIG. 1 and/or the frame processing and/or capture instruction system 400 of FIG. 4. As shown in FIG. 14A, an input 1401 to a low-light (LL) engine 1458 can include motion sensor data (e.g., from a gyrometer or gyroscope, an accelerometer, an IMU, and/or other sensor), zero shutter lag (ZSL) frames (preview/display frames which are displayed and that can go to the LL engine 1458 in real time), AEC decisions (e.g., including exposure settings) based on the ZSL frames, and display TFI statistics. In some cases, a histogram for each frame can also be provided to the LL engine 1458. It is not known how the user will hold the device and a position of the user when a frame is captured. However, it can be assumed that, if the user holds the device a certain way at a first point in time just before (e.g., 0.5 seconds, 1 second before, etc.) selecting the shutter or capture option (e.g., pressing a shutter button or other option), then the user will likely be holding the device in a similar way when they do select the capture option. Based on such an assumption, the LL engine 1458 can generate new commands and can output the new commands to the AEC engine 1464. The new commands can include a number of frames, a long exposure value (corresponding to the exposure duration used to capture the long exposure frames), and a long DRC gain. The number of frames, the long exposure value, and the long DRC gain can be determined based on the values shown in FIG. 12 or other similar values based on motion. The AEC engine 1464 can perform AEC and can output the AEC information to an image sensor (e.g., sensor 430) for capturing the long exposure frames.

The long exposure frames can be stored in a long frame buffer 1410 (referred to as "Buffers Long" in FIG. 14A). The long frame buffer 1410 can include a single buffer or multiple long frame buffers. The long frame buffer 1410 can be considered an offline buffer, as the long exposure frames (PSL frames) are not captured during the preview "realtime" pipeline. As noted above with respect to FIG. 7, the long exposure images or frames that are stored in the long frame buffer 1410 are captured after a capture command is received. For example, assuming that the LL engine 1458 instructs the AEC engine 1464 to apply a particular exposure duration, a particular gain, and a particular number of frames (e.g., 10 frames), once the capture command is received (e.g., based on a user selecting a capture option), the image sensor will capture the particular number of long exposure frames with the particular exposure and gain.

Similar to that described above and as shown in FIG. 14A, the first frame 1411 (or image) out of the long frame buffer 1410 can be output to an auto white balance (AWB) engine 1408 for AWB calculation. In traditional systems, the frames that are used for the AWB calculation are the frames from the preview (the ZSL frames). However, the preview frames are inferior to the long exposure frames in the long frame buffer 1410. For example, a preview frame is captured using a shorter exposure time as compared to the long exposure frames, and the long exposure frames compensate for brightness introduced by the increased exposure by lowering the gain. As a result, by using the long exposure frames for the AWB calculation, the SNR, the statistics for AWB, and the colors in the output frame or image are better than when preview frames are used by the AWB engine 1408 for AWB. In some cases, the improvements can be increased (e.g., based on higher SNR) when a long exposure frame is used for AWB in low-light environments. Using the first long exposure frame 1411, the AWB engine 1408 performs the AWB calculation and generates a new AWB control parameter 1412. The AWB control parameter 1412 can then be used to apply auto white balance. As shown in FIG. 14A, the AWB control parameter 1412 is output to a first multi-frame noise reduction (MFNR) engine 1402.

The long exposure frames from the long frame buffer 1410 and the AWB control parameter 1412 are output to the first MFNR engine 1402. The first MFNR engine 1402 can be used to temporally blend or filter the long exposure frames (to filter temporal noise from the long exposure frames in the temporal domain), but may not perform spatial blending of the long exposure frames to filter spatial noise from the long exposure frames in the spatial domain. The first MFNR engine 1402 can perform the temporal blending by spatially aligning a series of frames (or images) and averaging the values of each pixel in the frames. The algorithm used by the first MFNR engine 1402 evaluates the relative motion between the frames (since the frames were taken at different times) and aligns the frames such that pixels can be combined in order to improve SNR. A second MFNR engine 1404 performs spatial blending (or filtering) and temporal blending (or filtering) of medium exposure frames 1414 from one or more ZSL buffers 1413 used to store the medium exposure frames 1414. A third MFNR engine 1406 performs spatial and temporal filtering of short exposure frames 1416 from one or more ZSL buffers 1415 used to store the medium exposure frames 1414. The second MFNR engine 1404 and the third MFNR engine 1406 perform the spatial blending by processing the pixels of each frame, for example by determining a measure of each pixel (e.g., a statistical measure, pixel component value, an average, or other measure), in some cases with respect to neighboring pixels to improve the frame. In some examples, the spatial blending can be used to perform edge preserving noise reduction, and can be addressed using various algorithms, such as convolution kernels in the image or frame domain, processing in the frequency (or frequency-like) domain, wavelets, among others. In some cases, the first MFNR engine 1402, the second MFNR engine 1404, and the third MFNR engine 1406 can be implemented by the same hardware using the same processing techniques, but the hardware can have different tuning settings when implementing the first MFNR engine, the second MFNR engine, and the third MFNR engine. In some examples, the buffers used to store the medium exposure frames 1414 and the short exposure frames 1416 can be the same buffers or can be different buffers. In some cases, storage mechanisms other than buffers can be used to store the short, medium, and long exposure frames (e.g., cache memory, RAM, etc.)

The first MFNR engine 1402 can also obtain or receive TFI images (also referred to as TFI maps) for the long exposure frames stored in the long frame buffer 1410. In some cases, as described above, the TFI images can indicate which pixels had motion and which pixels did not have motion (or a degree of motion for the pixels). A TFI image can also indicate whether a pixel had temporal blending applied. For example, if a pixel is indicated by the TFI image as having motion, temporal blending may not be applied because, if temporal blending is applied, then a ghosting effect may occur in the image. Thus, a pixel in the TFI image indicating that a pixel in a captured frame has motion may also indicate that the pixel in the captured frame does not having temporal blending applied to it. Based on the motion indication, the first MFNR engine 1402 can aggregate the TFI images and can output an aggregated TFI image 1418 (shown in FIG. 14A as DC4 TFI aggregated). For example, a goal is to reflect how many frames were temporally blended for each pixel. A first stage can be to assume that each frame has same noise variance and that there is not covariance between them. Variance processing and/or arithmetic can be applied according to the TFI image. For each image or frame, the result can be stored in the aggregated TFI image 1418 (or TFI map). After all the frames are processed, a result of the processing is the variance for each pixel. For instance, a variance map can be output (e.g., by the first MFNR engine 1402). The variance map can then be translated to a map that indicates how many frames are blended for each pixel. The term "DC4" in FIG. 14A for the aggregated TFI image 1418 indicates a downscaled image by a factor of 4 in each axis. For example, for an image having a full image size of 8000×4000, then the DC4 size of the image is 2000×1000. The first MFNR engine 1402 can also output a single blended long exposure frame 1420 (shown in FIG. 14A as blended long 10*b*), as described above.

In some cases, the ML ISP 1422 can use as input a final ALGM map instead of the aggregated TFI image 1418 for each frame. For example, an ALGM is the same as the TFI aggregated map before converting it to a "frame blend count" map, as described herein. The ALGM can be generated by the hardware on full resolution frames or images instead of downscaled (e.g., DC4) frames or images.

Figure 15:
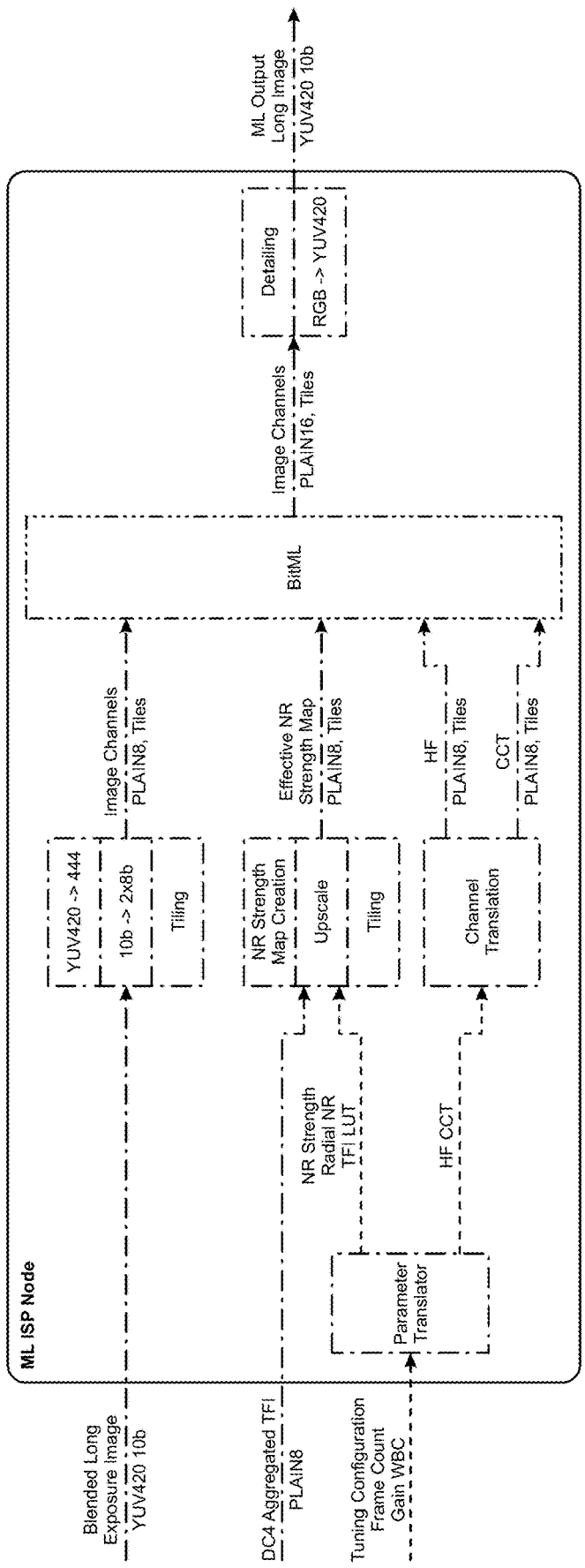
FIG. 15 is a diagram illustrating an example of a machine learning image signal processor (ML ISP) of the frame processing and/or capture instruction system of FIG. 15A, in accordance with some examples.
Figure 16:
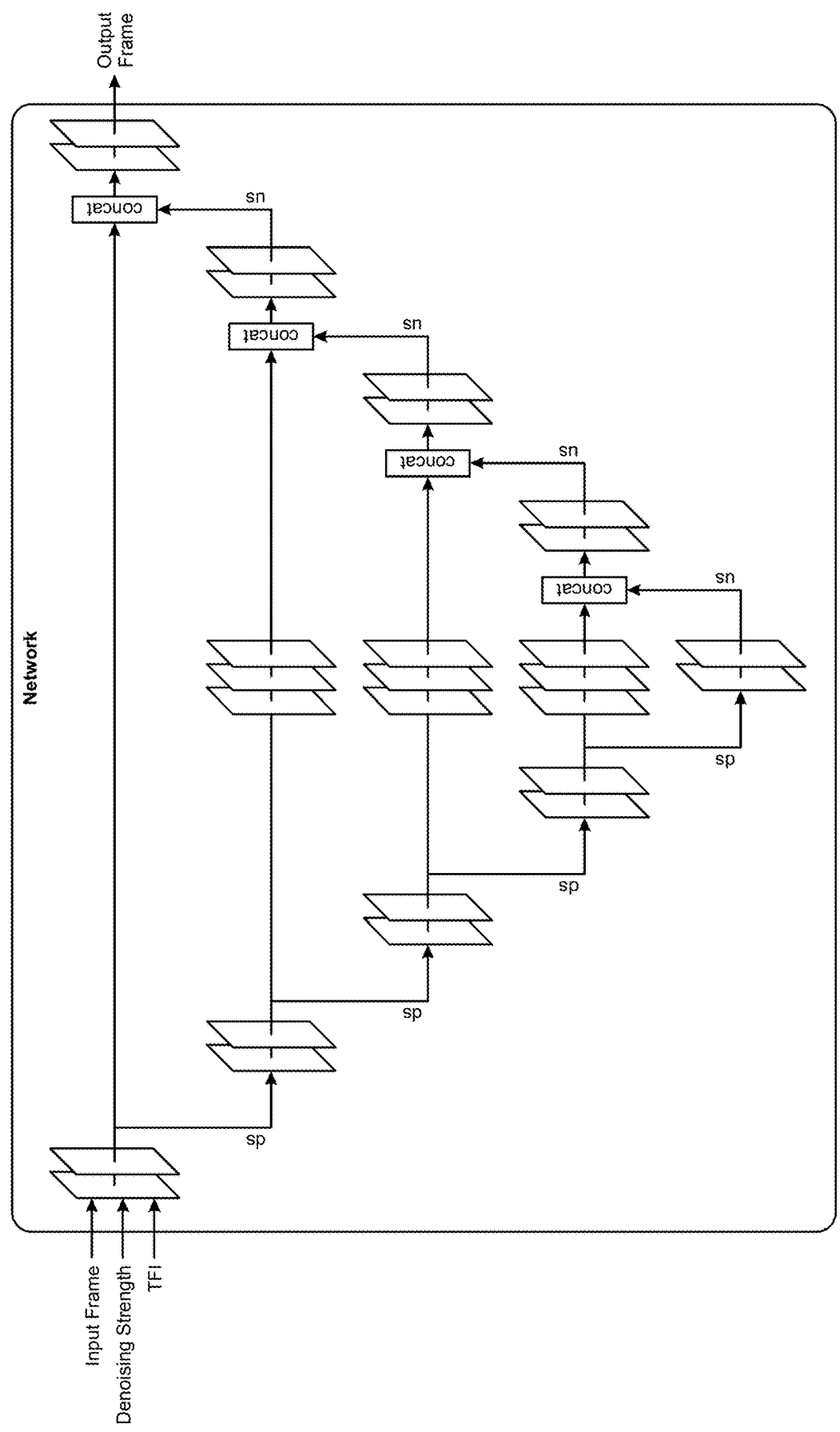
FIG. 16 is a diagram illustrating an example of a neural network of the ML ISP of FIG. 15A and FIG. 15B, in accordance with some examples.

The blended long exposure frame 1420 and the aggregated TFI image 1418 are output to a machine learning based image signal processor (ISP) 1422 (shown in FIG. 14A as ML ISP node). An example of the ML ISP 1422 is shown in FIG. 15. In some examples, the ML ISP includes one or more neural network architectures, such as a convolutional neural network (CNN) as one illustrative example. FIG. 16 is a diagram illustrating an example of a neural network of the ML ISP 1422. In one illustrative example, the neural network includes a UNet-like network, with 3×3 Convolutional layers, Parametric Rectified Linear Unit (PReLU) activations, average pooling (AvgPool) for downsampling, and Bilinear upsampling for upsampling. In some examples, training of the neural network can be performed based on selected sensor calibration data. Other training data can also be used in some cases.

The ML ISP 1422 performs the spatial filtering for the long exposure frames. For example, the ML ISP 1422 can perform spatial domain edge preserving noise filtration. The ML ISP 1422 can use the input blended long exposure frame 1420 and the aggregated TFI image 1418 to compensate the noise reduction amount, which can equalize the noise in the frame. In one illustrative example, for a given frame, if part of the frame has local motion above the motion threshold (as indicated by the aggregated TFI image), the part of the frame will not have temporal blending applied to it (otherwise it will have ghosting), as described above. As a result, the part of the frame with local motion will have more noise than other portions of the frame because temporal blending was not applied. Based on the increased noise in the part of the frame with motion, the ML ISP 1422 can apply more spatial filtering to that part of the frame. For another part of the frame that does not have any motion (or the motion is below the motion threshold), the first MFNR engine 1402 can apply temporal blending, resulting in less noise for that part of the frame. The ML ISP 1422 can perform less spatial filtering for the part of the frame with little to no motion. The ML ISP 1422 can also process the frame to smooth out the transition between the different parts of the frame for which different levels of spatial filtering is applied.

Figure 24:
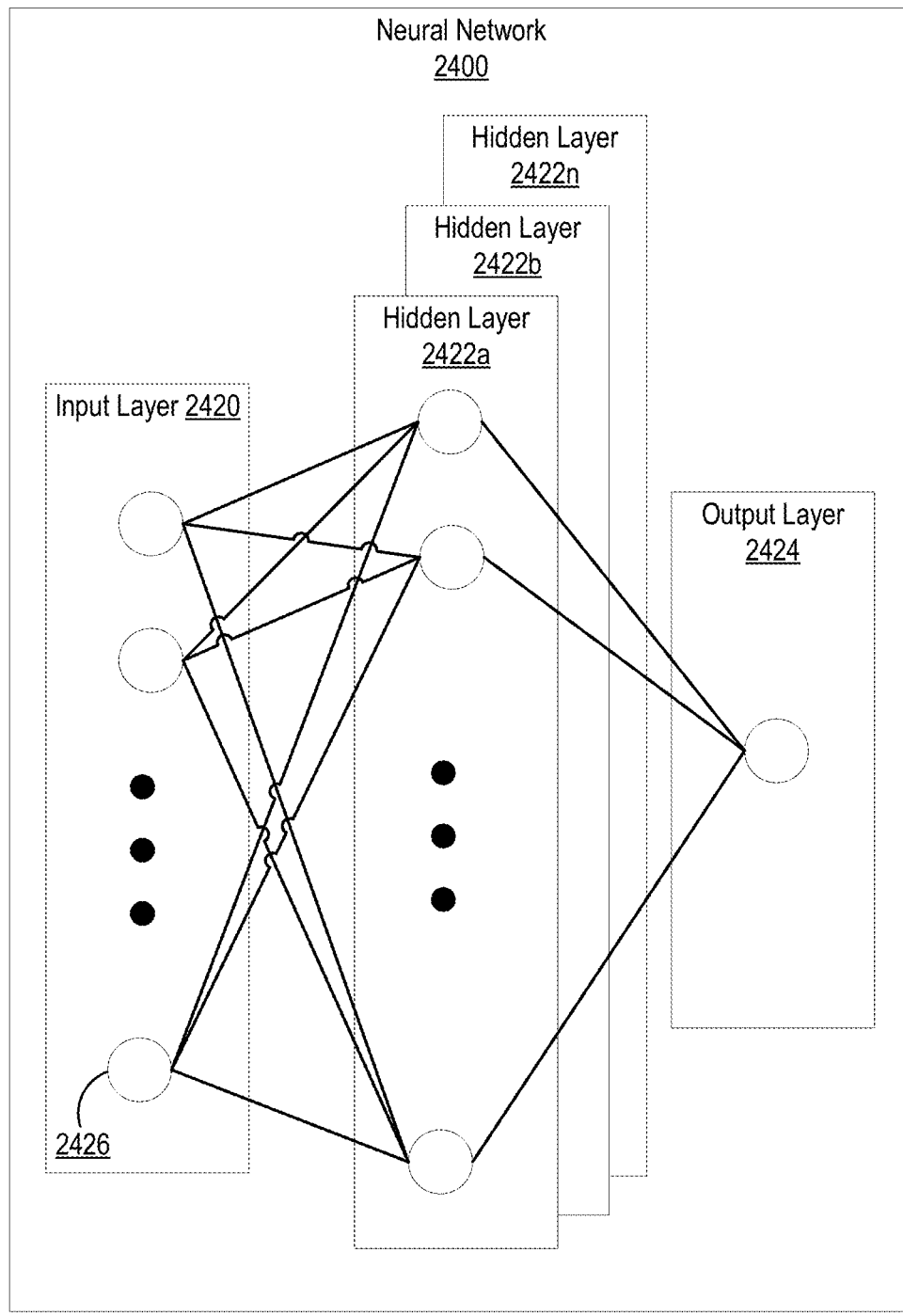
FIG. 24 is a block diagram illustrating an example of a neural network, in accordance with some examples.
Figure 25:
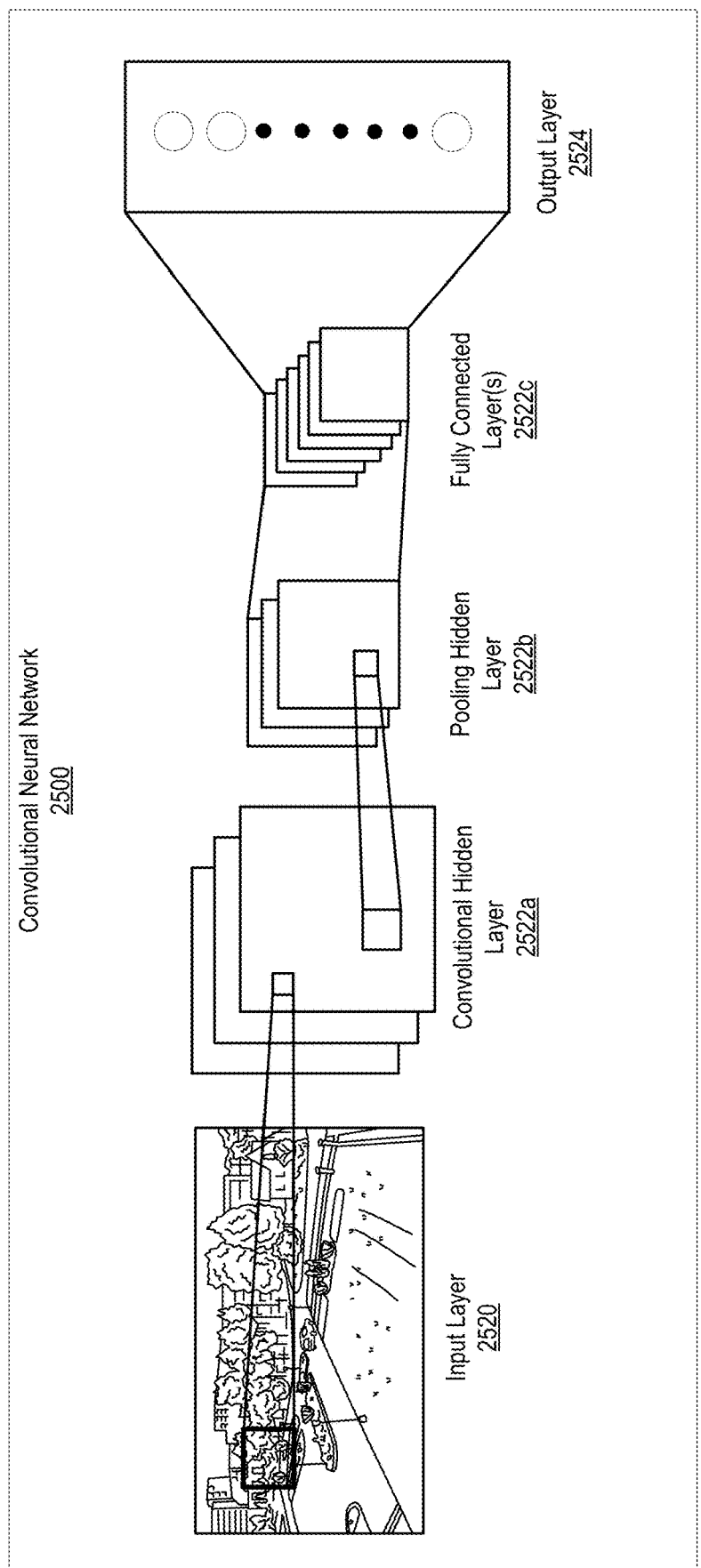
FIG. 25 is a block diagram illustrating an example of a convolutional neural network (CNN), in accordance with some examples.

The ML ISP 1422 can provide better results than a traditional ISP with multiple filters or processing blocks (e.g., for denoising, edge enhancement, color balancing, contrast, intensity adjustment, tone adjustment, sharpening, among others). Further, it can be challenging and time consuming to tune traditional ISPs. Training of the ML ISP 1422 can be less time consuming based on the use of supervised or unsupervised learning techniques. An illustrative example of a deep neural network that can be used for the ML ISP 1422 is shown in FIG. 24. An illustrative example of a convolutional neural network (CNN) that can be used for the ML ISP 1422 is shown in FIG. 25. Examples of performing machine learning training are described below with respect to FIG. 24 and FIG. 25.

The ML ISP 1422 outputs a filtered long exposure frame 1424 to a multi-frame high dynamic range (MFHDR) engine 1440. The MFHDR engine 1440 applies MFHDR processing, as described previously. As described above, the LL engine 1458 can determine whether MFHDR will be used (the MFHDR mode) or that MFHDR will not be used (the non-MFHDR mode). In non-MFHDR mode, HDR functionality can be performed using a single frame. In the event the LL engine 1458 determines MFHDR mode is to be used, then the input for the MFHDR engine 1440 will use more than one frame. Traditional systems perform MFHDR using alternating frames MFHDR. The alternating frames MFHDR use an alternating sequence of frames, such as short, medium, long, short, medium, long, short, medium, long, and so on. The sensor is configured to capture the frames at the different exposure durations (short, medium, long). However, latency is critical in capturing frames (in low-light conditions or other conditions), and using additional short, medium, and long frames (e.g., 4 frames, 10 frames, 20 frames, or other number of frames) increases the latency. To address such an issue, the LL engine 1458 uses preview frames (from the ZSL buffer) instead of using the frames with alternating exposures. The preview frames are stored in a ZSL buffer before the shutter command is received, in which case the preview frames do not need to be captured after the shutter command is received and thus do not add to the latency of the frame or image capture process. By using the preview frames, the only frames that are captured during offline processing (after the shutter command is received) are the long exposure frames. The preview frames stored in the ZSL buffer have the same sensor configuration as the long exposure frames in the long frame buffers. The frame settings for the preview and long exposure frames are thus the same except for the exposure (the exposure of the preview frames is shorter than the long exposure frames).

As noted above, the short and medium exposure frames (from the ZSL buffer) are processed by the second MFNR engine 1404 and the third MFNR engine 1406, respectively, which can be traditional ISP processing blocks (they do not include a ML ISP). In the event the MFHDR mode is used, the medium and short exposure frames are processed by the second MFNR engine 1404 and the third MFNR engine 1406, respectively, and the processed medium and short exposure frames are fused or combined inside of the MFHDR engine 1440.

Figure 14B:
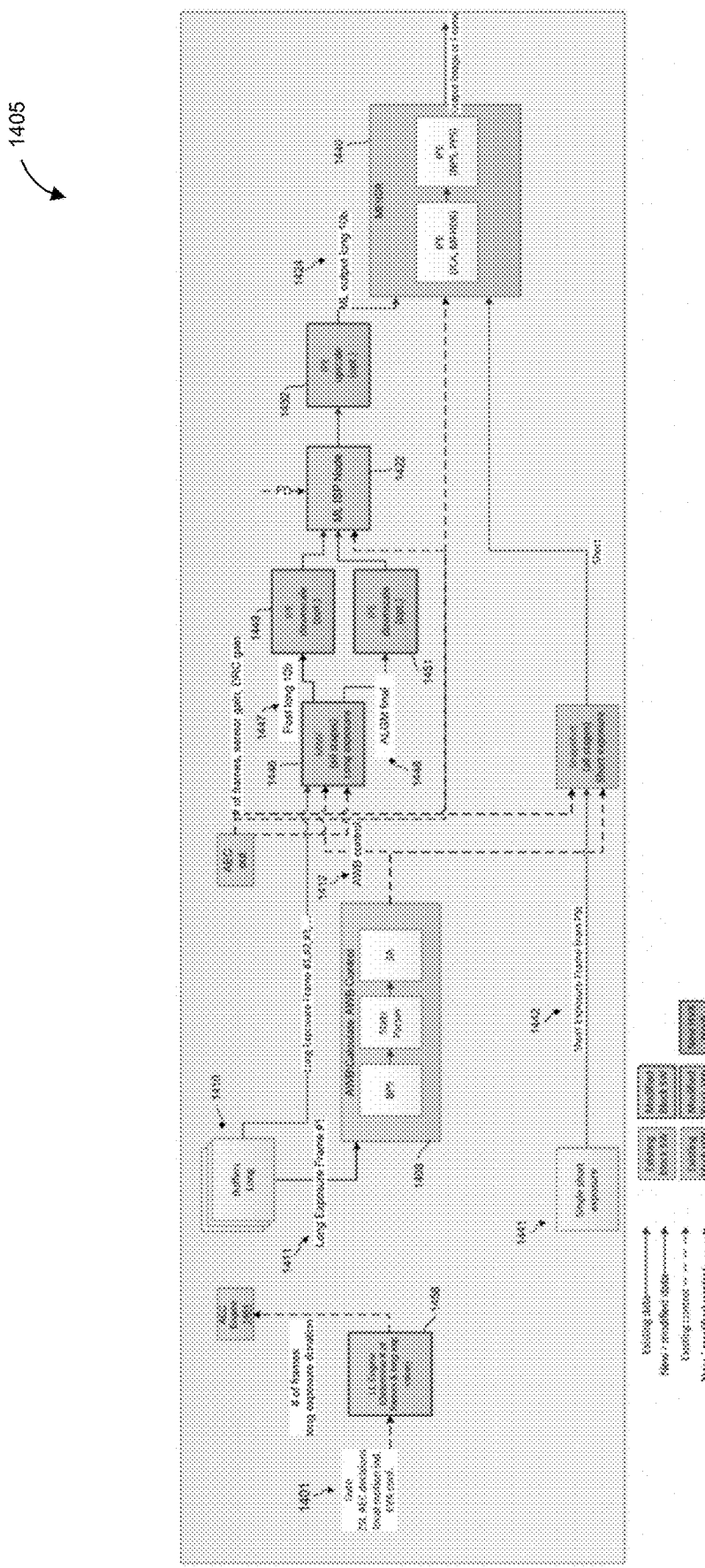
FIG. 14B is a diagram illustrating another example of a frame processing and/or capture instruction system, in accordance with some examples.

FIG. 14B is a diagram illustrating another example of a frame processing and/or capture instruction system 1405. The frame processing and/or capture instruction system 1405 is similar to the frame processing and/or capture instruction system 1400 of FIG. 14A, and includes like numerals indicating common components between the frame processing and/or capture instruction system 1400 and the frame processing and/or capture instruction system 1405. One difference between the frame processing and/or capture instruction system 1400 and the frame processing and/or capture instruction system 1405 is that the blended long exposure image 1447 is downscaled (to a smaller size) by a first downscaling engine 1449 before being processed by the ML ISP 1422. An ALGM map 1448 is also downscaled (to a smaller size) by a second downscaling engine 1451 before being processed by the ML ISP 1422. While an ALGM map 1448 is shown in FIG. 14B, an aggregated TFI image (e.g., the aggregated TFI image 1418 of FIG. 14A) can be used instead. The ML ISP 1422 can process (e.g., using spatial filtering) the downscaled blended long exposure image 1447 and ALGM map 1448, and can output a filtered long exposure frame to an upscaling engine 1452, which can output an upscaled filtered long exposure frame 1424. Another difference is that, instead of using medium exposure and short exposure frames, the frame processing and/or capture instruction system 1405 of FIG. 14B uses short exposure frames 1442 (e.g., from the PSL) using a single short exposure 1441.

As noted above, FIG. 15 illustrates an example of the ML ISP from FIG. 14A and/or FIG. 14B. Unique inputs are provided to the ML ISP based on the techniques described above. For example, the ML ISP can perform processing (e.g., spatial filtering or blending) based the motion indication from the TFI image and based on the amount of temporal processing that happened in the previous stage (as indicated by the TFI image). As shown in FIG. 15, the inputs to the ML ISP include the blended long exposure frame, the aggregated TFI image, user settings (shown as tuning configuration), the frame count, the gain, and the white balance. Further details regarding example neural networks (e.g., which can be used for the ML ISP) are described below with respect to FIG. 24 and FIG. 25.

Figure 17A:
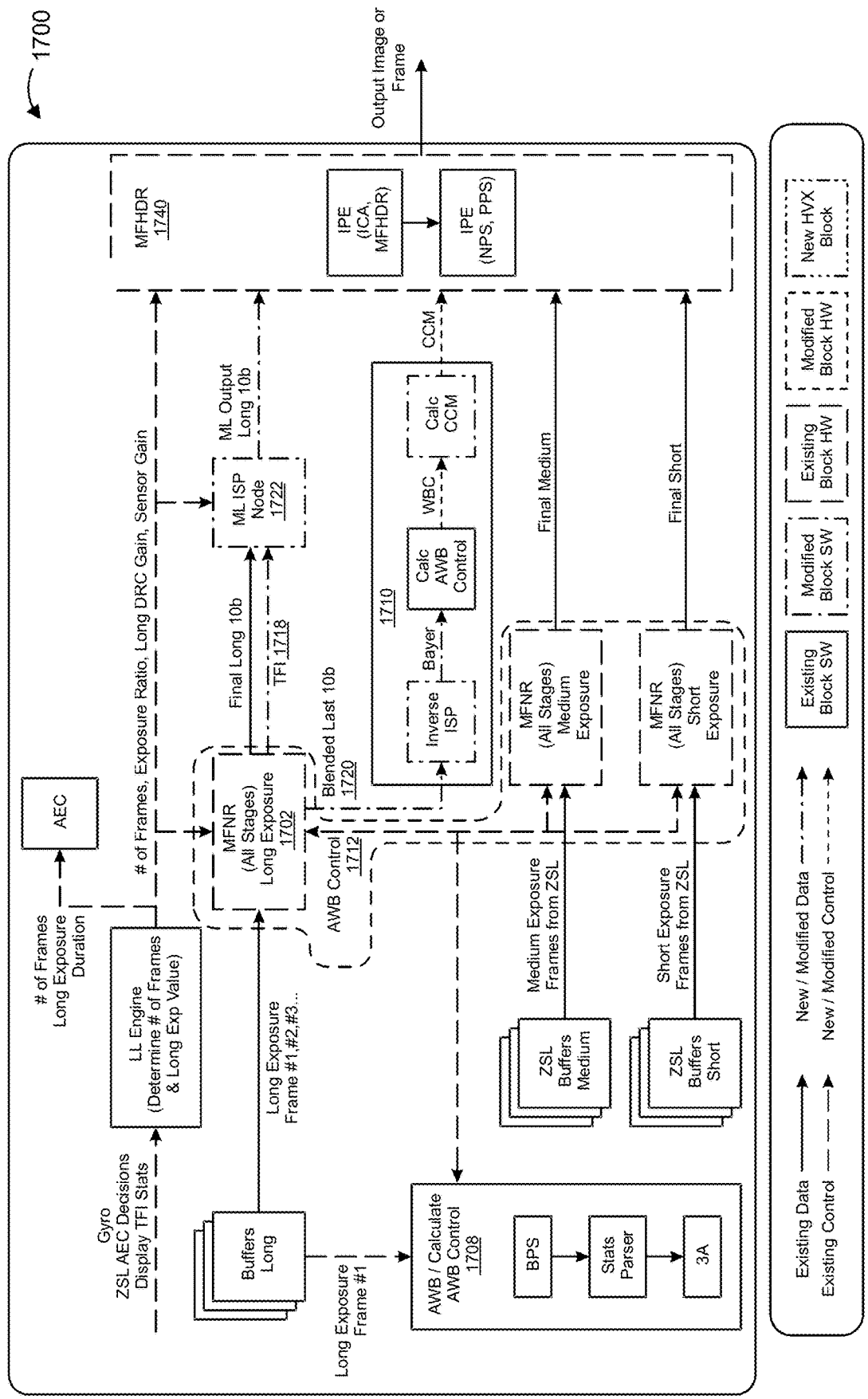
FIG. 17A and FIG. 17B are diagrams illustrating the frame processing and/or capture instruction system of FIG. 15A with additional processing used for refining of white balance, in accordance with some examples.
Figure 17B:
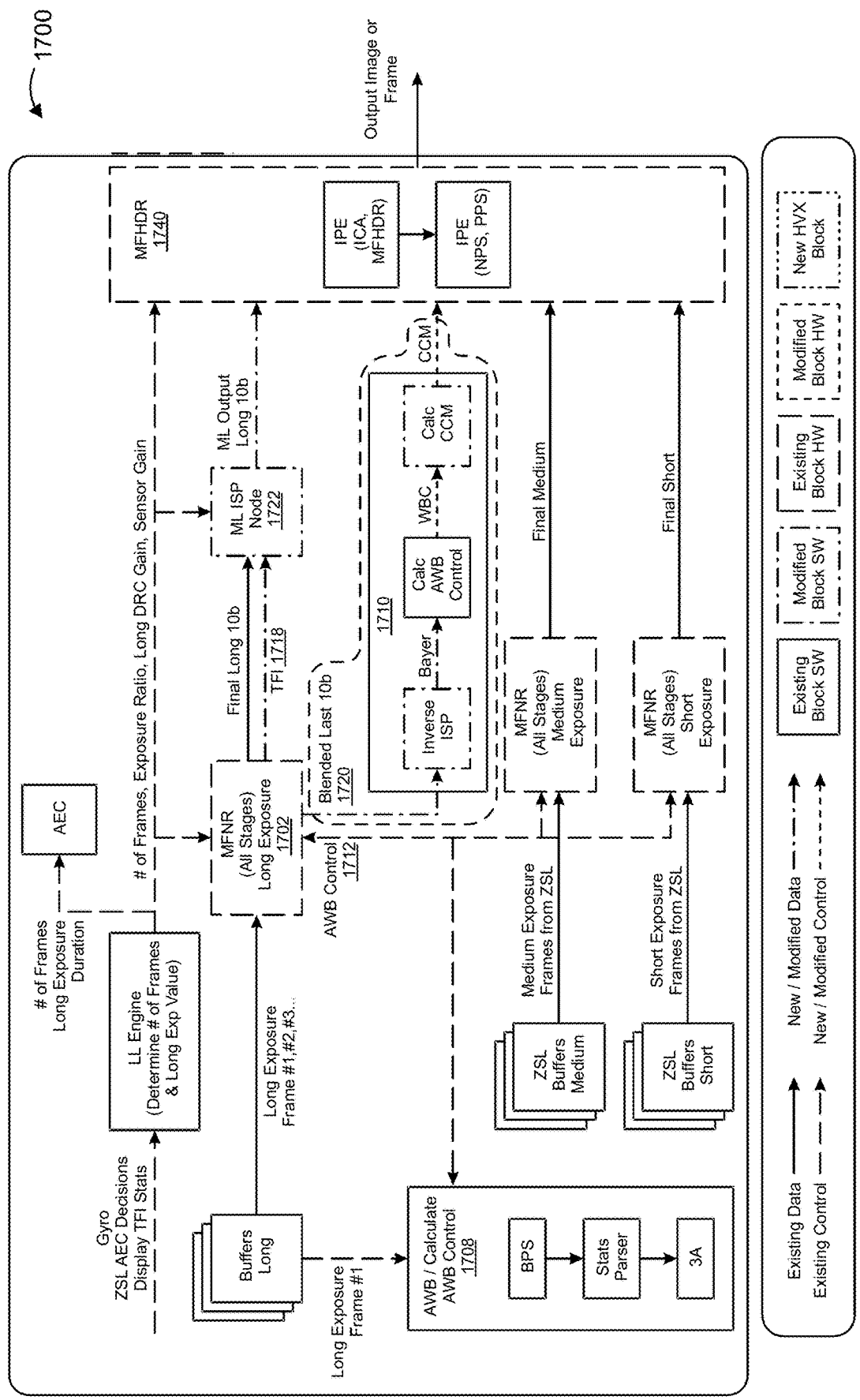

FIG. 17A and FIG. 17B are diagrams illustrating the frame processing and/or capture instruction system 1700 with additional processing components 1710 used for refining the white balance processing of frames. In some cases, the additional processing components 1710 can be part of and/or implemented by the AWB engine 1708. As noted above, the AWB engine 1708 can generate AWB control parameters 1712 for captured frames. The additional processing components 1710 can be used to further refine the AWB determined by the AWB engine 1708. For example, the frame processing and/or capture instruction system 1700 can capture 20 frames. 20 frames in the temporal domain can have linear effects with respect to improvement in noise variance. For example, 20 frames may decrease the noise variance by 10-20 times due to certain noise profiles. The AWB engine 1708 can obtain values in 2D distribution and can determine linear correlations between the values. Reducing the noise variance effectively reduces the scatter, providing more reliable statistics, resulting in better AWB decisions. The frame processing and/or capture instruction system 1700 can output the frame resulting from the temporal blending performed by the first MFNR engine 1702 (resulting in improved SNR due to the noise reduction) back to the AWB engine 1708. The AWB engine 1708 can recalculate the AWB control parameters 1712 to obtain a more accurate AWB parameter.

The additional processing components 710 include an inverse ISP to create a frame or image of a particular format (a raw Bayer frame or image) that can be sent to an AWB hardware engine (shown in FIG. 17A as "Calc AWB control"). For example, the AWB hardware engine may be configured to process a frame or image having the particular format. The inverse ISP is described in more detail above. Using the frame having the particular format (e.g., the Bayer frame), the AWB hardware engine generates an improved AWB control parameter (shown as WBC). The improved AWB control parameter is processed using a color correction matrix (CCM) engine (shown in FIG. 17A as "Calc CCM"). For example, the CCM engine can determine a difference or delta between the initial AWB control parameter and the improved AWB control parameter. The CCM engine can use the difference to generate a color correction matrix (CCM). The MFHDR engine 1740 can use the CCM to generate the final output frame or image.

The ML ISP 1722 of the frame processing and/or capture instruction system 1700 can use an aggregated TFI image 1718 similar to the ML ISP 1422 of FIG. 14A and/or FIG. 14B, as shown in FIG. 17A and FIG. 17B. In some cases, the ML ISP 1722 can use as input a final ALGM map instead of a TFI image for each frame. For example, as described above, an ALGM is the same as the TFI aggregated map before converting it to a "frame blend count" map, as described above. The ALGM can be generated by the hardware on full resolution frames or images instead of downscaled (e.g., DC4) frames or images. The first MFNR engine 1702 can allow a higher number of frames with shorter exposure time, leading to reduced motion blur and better texture and noise. The first MFNR engine 1702 can also use modified tuning including disabling noise equalization. In some examples, the first MFNR engine 1702 can fuse large numbers of frames, such as 256 frames, to improve SNR in the final blended frame 1720. Such an MFNR engine can be referred to in some cases as a Massive Multi-Frame (MMF) engine. In some cases, the first MFNR engine 1702 can be followed by a stage that performs noise equalization. With reference to FIG. 17B, the MFNR blended frame 1720 undergoes pseudo inverse ISP, resulting in a linear raw Bayer frame (with RGB color components), as described above. The raw Bayer frame is output for AWB statistics regeneration and AWB algorithm, resulting in improved WB coefficients (WBC). The remainder WB is calculated, translated to CCM, and sent to the MFHDR engine (including the post-IPE), similar to that described above with respect to FIG. 17A.

Figure 18:
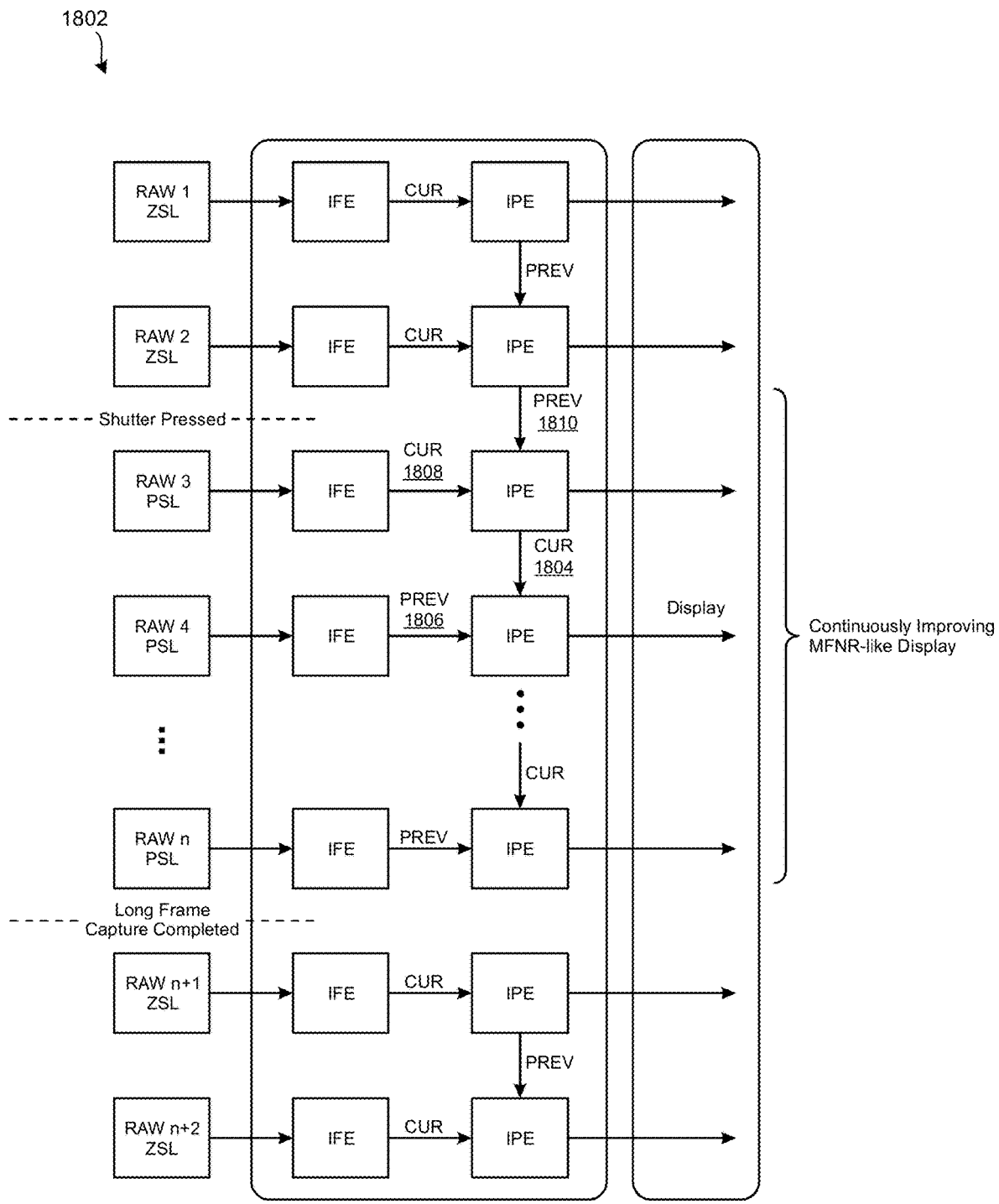
FIG. 18 is a diagram illustrating an example of a process for progressively displaying images, in accordance with some examples.

FIG. 18 is a diagram illustrating an example of a process for progressively displaying frames or images (providing an interactive preview). For example, it would be beneficial to progressively display enhanced frames as the as new frames are being buffered and/or processed, which can allow the user to see how each frame contributes to the quality improvement. The frame processing and/or capture instruction system (e.g., the system 400, 1400, 1405, 1700, or other system) can use the preview frames from the ZSL buffer (e.g., ZSL frames 1802) and provide different inputs to a video motion compensated temporal filter (MCTF). For example, when the image capture option is selected and a capture or shutter command is received, starting from a given PSL frame (e.g., the second PSL frame), the frame processing and/or capture instruction system can change the temporal filtering (TF) blend mode so previous and current are switched (e.g., similar to MFNR). For instance, as shown in FIG. 18, the current frame 1804 and the previous frame 1806 are switched as compared to the current frame 1808 and the previous frame 1810. For example, the current frame 1808 is output from the IFE and the previous frame 1810 is output from the IPE. Once the capture or shutter command is received, the current frame 1804 is output from the IPE and the previous frame 1806 is output from the IFE. The switch between previous and current frames can be performed until the long frame capture is complete. "Previous" and "current" refer to an input to the temporal filtering. Previous is denoted as "PREV" in FIG. 18 and current is denoted as "CUR" in FIG. 18. For instance, TF has 3 frame or image inputs: current, current_anr, and previous. Current is the current frame or image which the previous image should be blended on top of and aligned to. After all PSL frames are collected, the frame processing and/or capture instruction system can switch back to MCTF blending. As a result, the preview display shows the target frame or image dynamically improving as new frames are acquired. As the image capturing process progresses, the display becomes more visible and details are revived.

One reason to switch to PSL frames (e.g., once the capture or shutter command is received) is due to improved light sensitivity of the PSL frames. As noted above, light sensitivity (or exposure, image exposure, or image sensitivity) can be defined as a function of gain and exposure time or duration (e.g., Light sensitivity=gain*exposure_time). For instance, each incoming frame can be processed using the MCTF which can improve the signal-to-noise ratio (SNR), resulting in an interactive effect of the preview frame improving while collecting frames. The preview result also provides an accurate key performance indicator (KPI) of "what you see is what you get". Using such a technique, the preview display shows the target frame dynamically improving as new frames are acquired, without interruption to the preview pipeline (e.g., there is no need to switch to a different mode).

Figure 19:
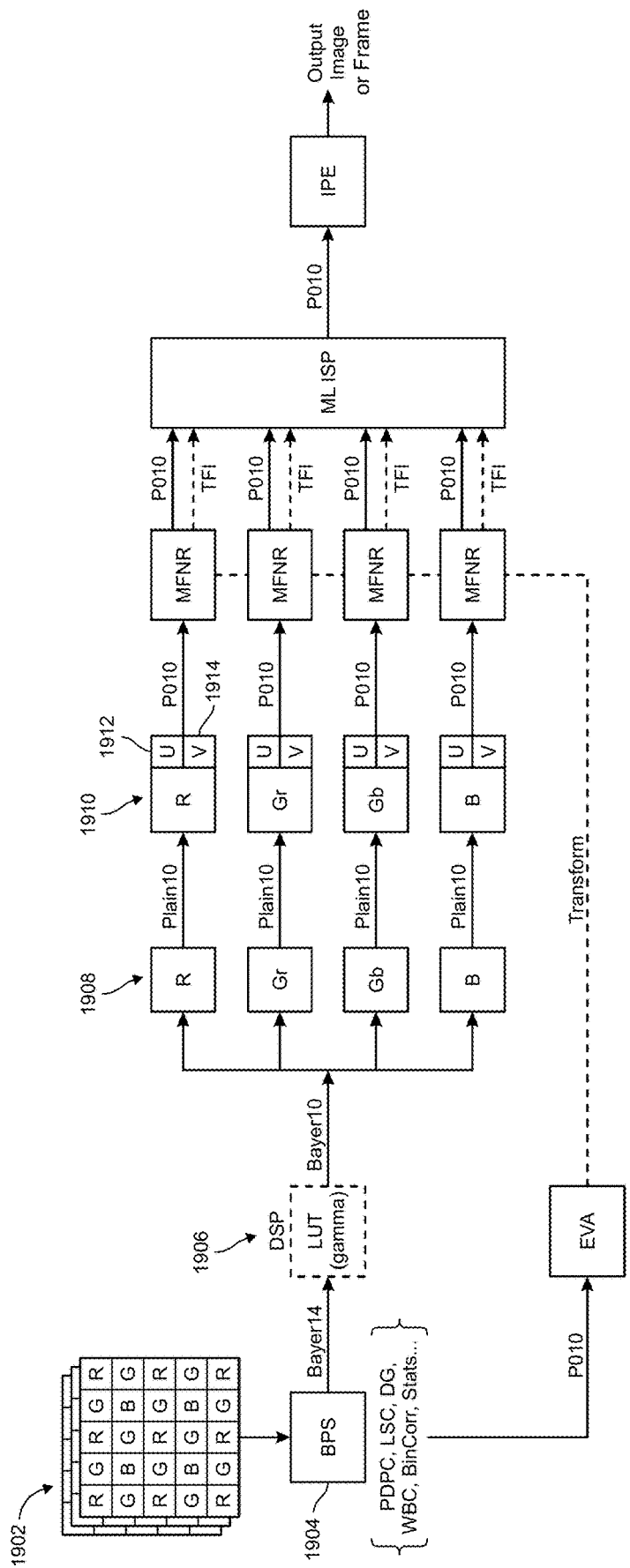
FIG. 19 and FIG. 20 are diagrams illustrating examples of raw temporal blending based on chrominance (U and V) channels, in accordance with some examples.
Figure 20:
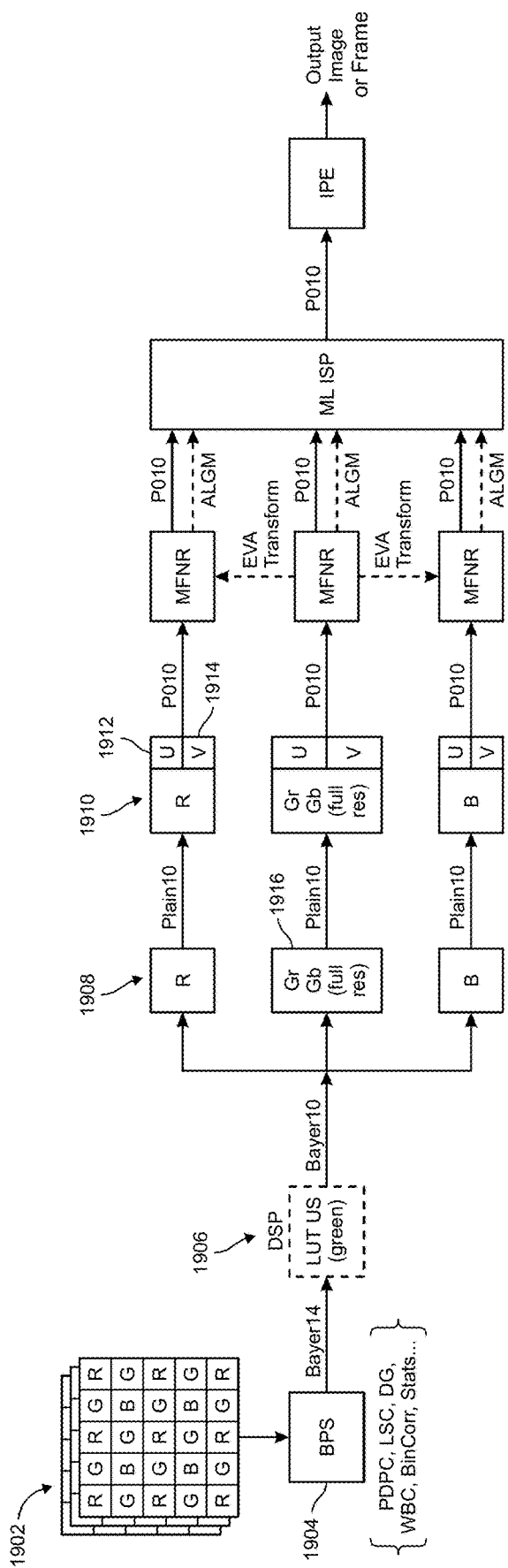

FIG. 19 and FIG. 20 are diagrams illustrating examples of raw temporal blending based on addition of U and V channels to raw frame or image components. As noted above, a temporal filtering algorithm (e.g., applied by an IPE, such as the post-IPE, or other component of a frame processing and/or capture instruction system) can be used to improve the quality of an output frame or image using sequential frames and blending the frames in the temporal domain, thus improving the SNR of the frame. Existing algorithms for temporal filtering use frames in the YUV domain, which include pixels with a luminance (Y) component and chrominance components (e.g., Chroma blue (Cb) and Chroma red (Cr) components). Existing algorithms are also typically implemented in HW. Performing temporal filtering in software may result in higher latency and may also be inferior in quality as compared to hardware, due to hardware allowing several passes and having higher processing power. Raw temporal filtering or blending systems and techniques are described herein that use existing YUV temporal blending hardware pipelines. The raw temporal filtering or blending systems and techniques operate by dividing raw images or frames (having a color filter array (CFA) pattern) into individual color components (e.g., red (R), green (G), and blue (B) components), and treating each color component as a separate YUV frame or image by adding U and V channels to each color component. The U and V values can include redundant values that are used to fill a buffer from which the MFNR engine obtains the frames for processing. Using raw frames allows the blending to be performed at an earlier stage, avoiding various offsets, clipping, and incorrect destructive decision issues. Using raw frames also allows the ML ISP to handle more operations. Instead of just noise reduction, more operations can be delegated with nearly the same cost (e.g., demosaicing, WB, tone mapping, among others).

As shown in FIG. 19, raw frames 1902 are provided as input. An image sensor (e.g., image sensor 130 or 430) can be used the capture the raw frames 1902. The raw frames 1902 have a color filter array (CFA) pattern, such as a Bayer CFA pattern, including red, green, and blue color components. The same CFA pattern is repeated for the entire frame. A Bayer Processing Segment (BPS) 1904 receives the raw frames 1902. The BPS 1904 is a hardware block that performs various image processing operations, such as Phase Detection Pixel Correction (PDPC), Lens Shading Correction (LSC), DG, White Balance Correction (WBC), Bin Correction (BinCorr), among others. In some cases, each of the operations (e.g., PDPC, LSC, WBC, etc.) can correspond to a filter in the BPS 1904 hardware. The output of the BPS 1904 is a Bayer14 image or frame (represented with 14 bits). A digital signal processor (DSP) 1906 converts the frame from a 14 bit frame to a 10 bit frame (a Bayer10 frame). The DSP 1906 can use a Gamma look-up table (LUT) to perform the conversion. In some cases, a processor other than a DSP can be used to convert the frame from 14 bits to 10 bits.

The frame processing and/or capture instruction system can divide or separate each color component of the frame into separate color components. Each color component is the frame of all pixels of that color component. For example, the red (R) component 1908 of the frame includes all of the red pixels from the raw frame, and a resolution or dimensions that is half of the width and half of the height of the frame (due to the red components making up half of the raw frame). The green (G) and blue (B) components have a resolution that is a quarter of the width and a quarter of the height of the raw frame. Plain10 is a 10-bit single channel frame or image (e.g., a grayscale frame). The plain10 frame can be used due to the system being unable to distinguish between the different channels based on the separation of the color channels.

The frame processing and/or capture instruction system appends a U channel and a V channel to the R, G, and B color components to create separate standard YUV frame or images. For example, the frame processing and/or capture instruction system can generate the YUV frame 1910 based on the R color channel by adding the U channel 1912 and the V channel 1914. The U and V values added to the different color components can include the same values (e.g., a value of 0 or 512 for U and a value of 0 or 512 for V, where 512 is the center of the UV plane). The frame processing and/or capture instruction system adds the U and V channels so that the images are in the proper format for the MFNR algorithm.

In some cases, once the U and V channels are added, the frame processing and/or capture instruction system converts the format of the frame to P010. The MFNR engine can perform the temporal blending process on the resulting YUV frames.

Figure 21:
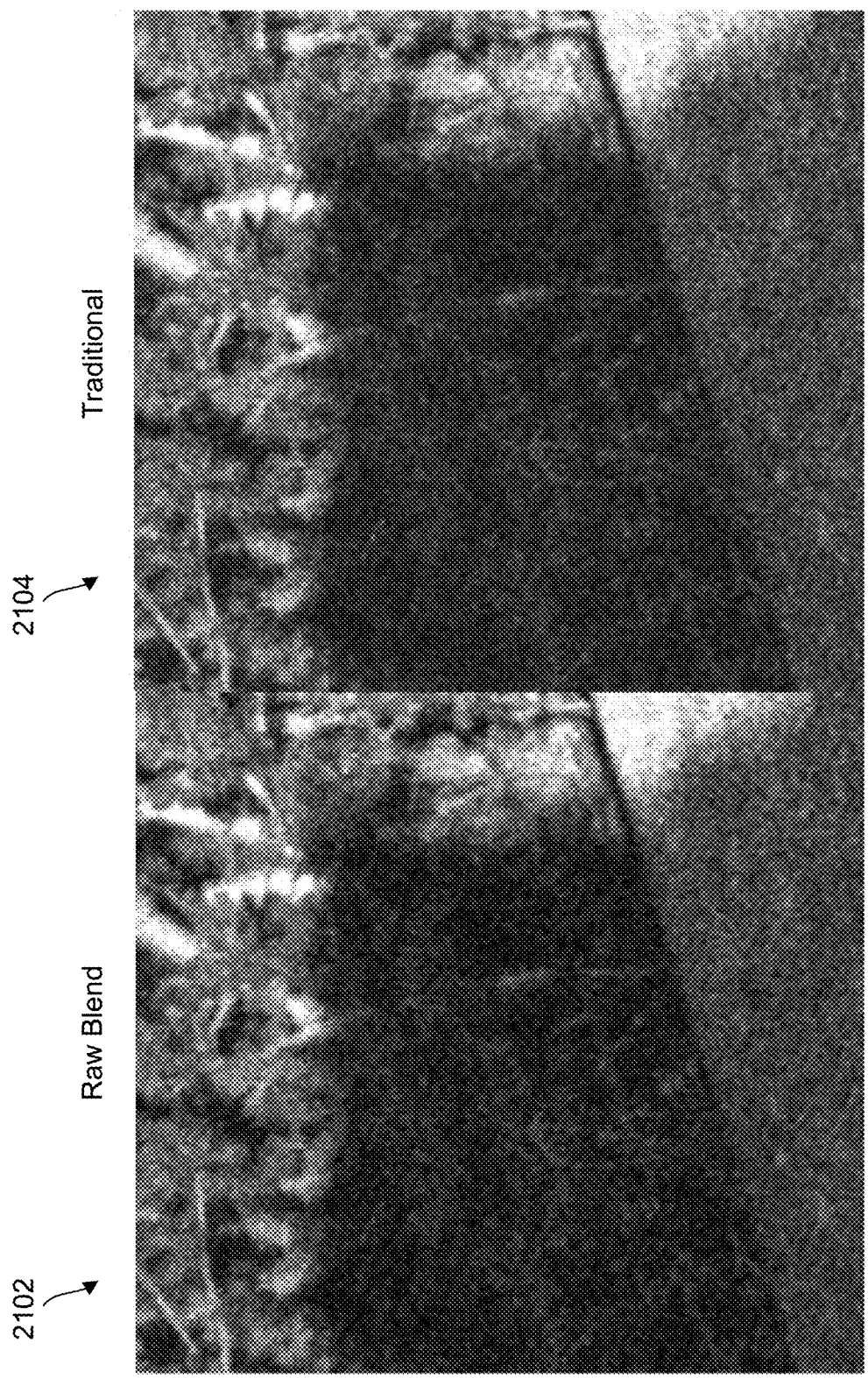
FIG. 21 includes an image resulting from raw temporal blending and an image resulting from use of standard YUV images, in accordance with some examples.

The example configurations shown in FIG. 19 and FIG. 20 are similar, except for how the green channel is taken into account. In the example of FIG. 19, each green channel Gr and Gb is processed as a separate YUV frame. In the example of FIG. 20, a unified green channel 1914 is processed as a YUV frame. The unified green channel based YUV frame can be upscaled (to a super resolution frame) to accommodate more temporal blending. FIG. 21 includes a frame 2102 resulting from the raw temporal blending and a frame 2104 resulting from use of standard YUV frames. As shown by the comparison between the frame 2102 and the frame 2104, the raw temporal filtering blend does not degrade the frame.

A benefit of using the color component based YUV frames (e.g., YUV frame 1910) is that the YUV frames will be smaller than typical YUV frames and thus the processing will be more efficient. Another benefit is that, if raw temporal blending is performed, then the blended raw frame can be sent directly for AWB enhancement by the AWB engine 1708 and/or the additional processing components 1710 of the frame processing and/or capture instruction system 1700, in which case no inverse ISP is needed.

As noted above, the terms short, medium (or "mid"), safe, and long, as used herein, refer to relative characterizations between a first setting and a second setting. These terms do not necessarily correspond to defined ranges for a particular setting. For example, a long exposure (e.g., a long exposure duration or long exposure image or frame) refers simply to an exposure time that is longer than a second exposure (e.g., a short or mid exposure). In another example, a short exposure (e.g., a short exposure duration or short exposure image or frame) refers to an exposure time that is shorter than a second exposure (e.g., a long or mid exposure). In yet another example, a mid-exposure or medium-exposure (e.g., a medium exposure duration or medium exposure image or frame) refers to an exposure time that is greater than a first exposure (e.g., a short exposure) and that is less than a second exposure (e.g., a long or mid exposure).

Figure 22:
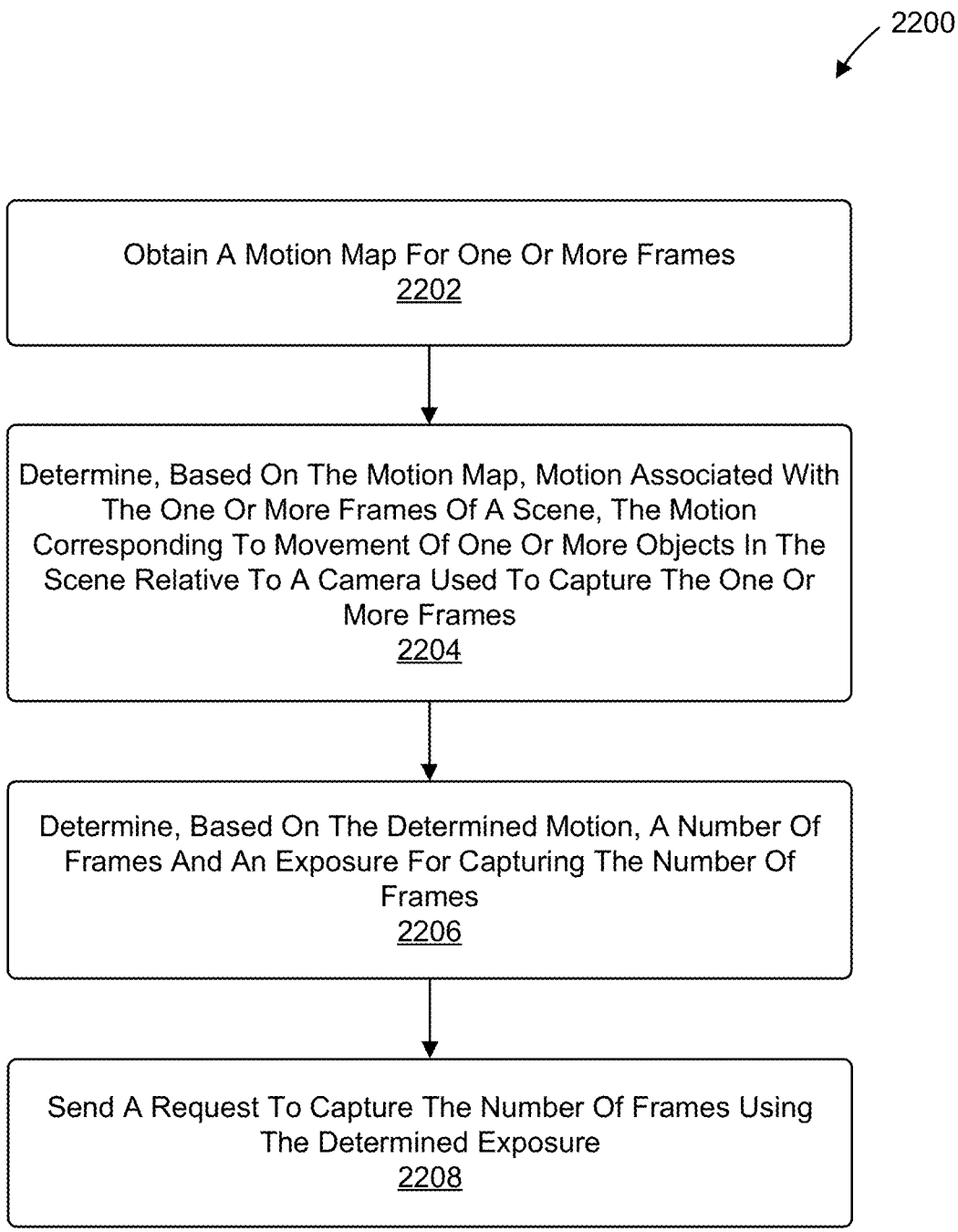
FIG. 22 is a flow diagram illustrating an example of a process for determining an exposure duration for a number of frames, in accordance with some examples.

FIG. 22 is a flow diagram illustrating an example of a process 2200 of determining an exposure duration for a number of frames using the techniques described herein. At block 2202, the process 2200 includes obtaining a motion map for one or more frames. The one or more frames can be frames obtained before a capture command for capturing the number of frames is received (referred to as preview frames), such as shown in FIG. 14. In some examples, the preview frames can be from a ZSL buffer, as noted above. In some cases, the preview frames can be short exposure frames, as noted above.

In some examples, a motion map can be obtained for each frame of the one or more frames (e.g., a first motion map for a first frame, a second motion map for a second frame, etc.). For example, in some aspects, a motion map can be included as metadata with each frame. As described above, the motion map can also be referred to as a temporal filter indication (TFI). In some cases, the motion map includes an image (e.g., a TFI image, as described above). In some examples, the TFI image can have a same resolution (thus having a same number of pixels in horizontal and vertical directions) as the one or more frames. In some examples, the TFI image can have a lower resolution (with less pixels in a horizontal direction and/or a vertical direction) than the one or more frames. For instance, each pixel of the motion map image can include a value indicating an amount of motion for each corresponding pixel of a frame from the one or more frames associated with the motion map (e.g., the frame for which the motion map is included as metadata). In one illustrative example, the value for each pixel of the motion map (or TFI) image can be in the range of [0,1], where the value of 0 indicates no motion for a pixel and the value of 1 indicates maximum motion for a pixel. Any other suitable range or value designation can be used for the motion map (or TFI) image.

At block 2204, the process 2200 includes determining, based on the motion map, motion associated with the one or more frames of a scene. The motion corresponds to movement of one or more objects in the scene relative to a camera used to capture the one or more frames. The motion can be referred to as local motion, as described herein. In some cases, the motion can be determined for each pixel of a frame of the one or more frames by referencing values of the pixels within a motion map (e.g., a motion map image, as noted above) that is obtained (e.g., as metadata) for the frame.

In some cases, the process 2200 can include determining global motion associated with the camera. For example, the process 2200 can determine the global motion based on one or more sensor measurements, such as measurements from a gyroscope or other inertial measurement unit (IMU) (e.g., accelerometer, etc.) of a device used to perform the process 2200. In some cases, the global motion can be determined for each frame of the one or more frames based on sensor measurements received during the time associated with each frame. For example, the measurements from a gyroscope can include a vector of gyroscope samples with time stamps collected during a particular frame. In such an example, the process 2200 can determine the global motion for the particular frame based on the vector.

In some examples, the process 2200 can include determining a final motion indication based on the determined motion and the global motion. For instance, the process 2200 can determine the final motion indication based on a weighted combination of the determined motion and the global motion using a first weight for the determined motion and a second weight for the global motion. In one illustrative example, the final motion indication can be determined as lin_blend(GMI, GMI*LMI, LMI_weight)^2, where lin_blend is a linear blending operation. In another illustrative example, the FMI can be determined as lin_blend(GMI, GMI*LMI, LMI_weight).

At block 2206, the process 2200 includes determining, based on the determined motion, a number of frames and an exposure (e.g., exposure time or duration) for capturing the number of frames. In some examples, the determined exposure duration is based on an exposure duration (or exposure time) and a gain. As noted above, the process 2200 can include determining global motion associated with the camera (e.g., based on one or more sensor measurements, such as gyroscope measurements). In such cases, at block 2206, the process 2200 can include determining the number of frames and the exposure duration for capturing the number of frames based on the determined motion and the global motion. As further noted above, the process 2200 can include determining a final motion indication based on the determined motion and the global motion. In such cases, at block 2206, the process 2200 can include determining the number of frames and the exposure duration for capturing the number of frames based on the final motion indication.

In some cases, the number of frames can include long exposure frames, as described above. In some examples, as described above, the values in the graph 1200 (or other values) of FIG. 12 can be used to determine the long exposure time (or duration) and a frame count based on the motion indicated by the motion map (or TFI image), based on the global motion, and/or based on the final motion indication. For instance, in some examples, the process 2200 can include determining, based on the determined motion and/or the global motion, an amount of motion in the one or more frames is less than a motion threshold. For instance, the process 2200 can include determining that the amount of motion in the one or more frames is less than the motion threshold based on the final motion indication. Based on the amount of motion in the one or more frames being less than the motion threshold, the process 2200 can include decreasing a frame count for the number of frames and increasing an exposure duration amount for the determined exposure duration. In some examples, the process 2200 can include determining, based on the determined motion and/or the global motion, an amount of motion in the one or more frames is greater than a motion threshold. For instance, the process 2200 can include determining that the amount of motion in the one or more frames is greater than the motion threshold based on the final motion indication. Based on the amount of motion in the one or more frames being greater than the motion threshold, the process 2200 can include increasing a frame count for the number of frames and decreasing an exposure duration amount for the determined exposure duration.

At block 2208, the process 2200 includes sending a request to capture the number of frames using the determined exposure duration. For example, a component of a frame processing and/or capture instruction system (e.g., the low-light engine 1458 or other component) can send a request to an MFNR, and MMF, an MFHDR, an image sensor, an image signal processor, any combination thereof, and/or other component to capture the number of frames using the determined exposure duration.

In some aspects, process 2200 includes performing temporal blending on the number of frames captured using the determined exposure duration to generate a temporally blended frame. In some cases, process 2200 includes performing, using a machine learning based image signal processor (e.g., such as that shown in FIG. 14A, FIG. 14B, FIG. 15, FIG. 16, FIG. 17A, FIG. 17B, FIG. 19, and/or FIG. 20), spatial processing on the temporally blended frame. In some aspects, as described above, the machine learning based image signal processor uses the motion map (e.g., a TFI) as input for performing the spatial blending on the temporally blended frame. For example, as shown in FIG. 14A, the ML ISP node 1422 uses the DC4 TFI aggregated image 1418 as input to determine where motion is present in the blended long exposure image 1420. The example of FIG. 14B uses an ALGM map as input.

Figure 23:
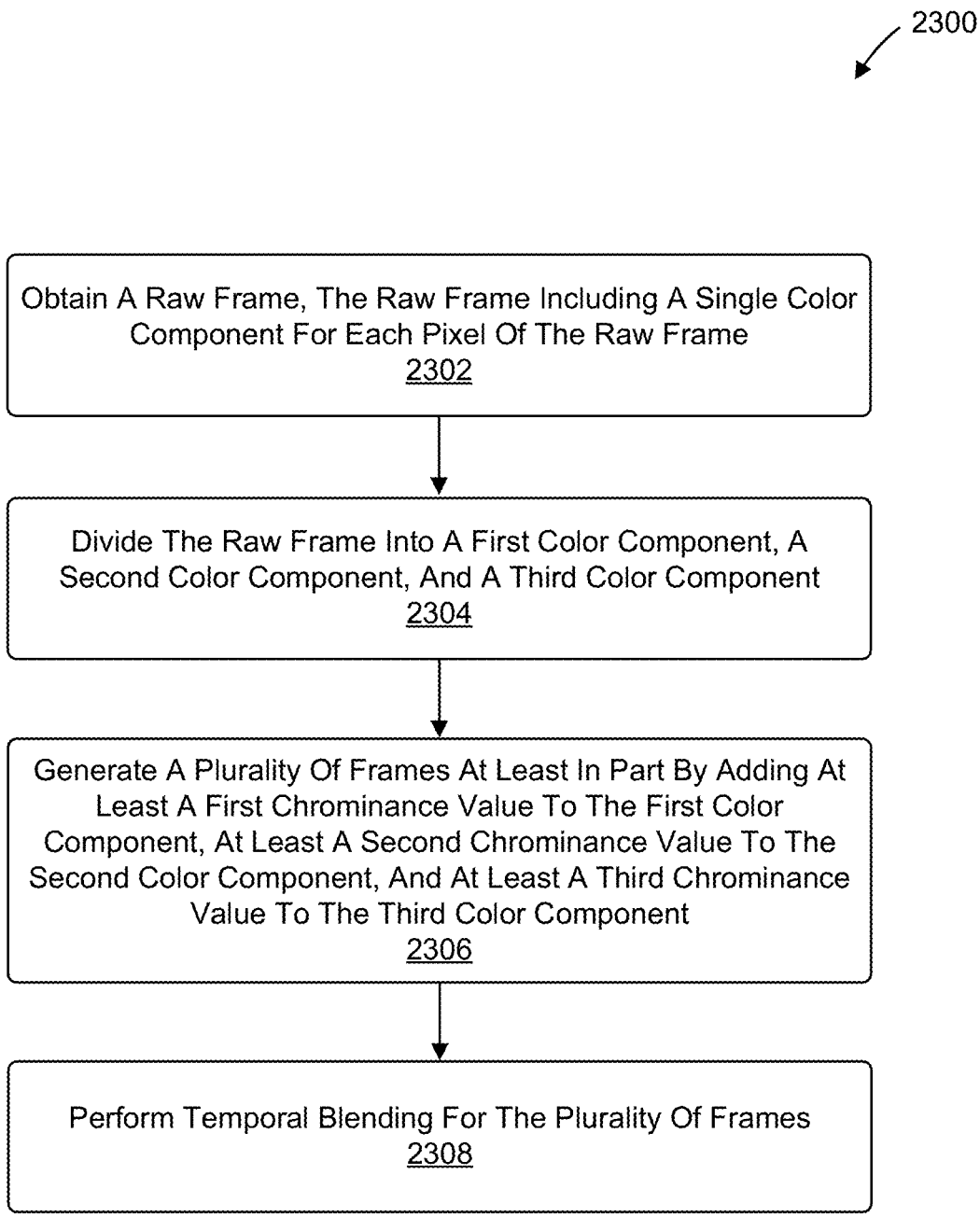
FIG. 23 is a flow diagram illustrating another example of a process for performing temporal blending, in accordance with some examples.

FIG. 23 is a flow diagram illustrating an example of a process 2300 of performing temporal blending for one or more frames using the techniques described herein. At block 2302, the process 2300 includes obtaining a raw frame. The raw frame including a single color component for each pixel of the raw frame. In some aspects, the raw frame includes a color filter array (CFA) pattern, such as that shown in FIG. 19 and FIG. 20.

At block 2304, the process 2300 includes dividing the raw frame into a first color component, a second color component, and a third color component. In some cases, the first color component includes a red color component, the second color component includes a green color component, and the third color component includes a blue color component. In some aspects, the first color component includes all red pixels of the raw frame, the second color component includes all green pixels of the raw frame, and the third color component includes all blue pixels of the raw frame. For instance, as shown in FIG. 19, a raw image (from multiple raw images 1902) is divided into a red (R) component 1908, a green (G) component, and a blue (B) component. The R component 1908 of the raw image includes all of the red pixels from the raw image, in which case the R component 1908 has a resolution that is half of the width and half of the height of the raw image. The G components (including Gr and Gb) and the B component shown in FIG. 19 each have a resolution that is a quarter of the width and a quarter of the height of the raw image. In the example shown in FIG. 20, the G component (which combines the Gr and the Gb components) has a resolution that is half of the width and half of the height of the raw image.

At block 2306, the process 2300 includes generating a plurality of frames at least in part by adding at least a first chrominance value to the first color component, at least a second chrominance value to the second color component, and at least a third chrominance value to the third color component. For example, the process 2300 can include generating a first frame at least in part by adding at least the first chrominance value to the first color component, generating a second frame at least in part by adding at least the second chrominance value to the second color component, and generating a third frame at least in part by adding at least the third chrominance value to the third color component. In some examples, the process 2300 can include generating the first frame at least in part by adding a first chrominance value and a second chrominance value to the first color component, generating the second frame at least in part by adding the first chrominance value and the second chrominance value to the second color component, and generating the third frame at least in part by adding the first chrominance value and the second chrominance value to the third color component. In one illustrative example, referring to FIG. 19, a U chrominance channel and 1912 a V chrominance channel 1914 are added to the R component 1908 by adding a value for the U chrominance channel and a value for the V chrominance channel to the R component 1908, resulting in an output frame that will be processed by an MFNR engine for temporal filtering. In some aspects, the first chrominance value and the second chrominance value are a same value.

At block 2308, the process 2300 includes performing temporal blending for the plurality of frames. For instance, the MFNR engine shown in FIG. 19 and/or FIG. 20 can perform the temporal blending. In some aspects, to perform the temporal blending for the plurality of frames, the process 2300 can include temporally blending a first frame of the plurality of frames with one or more additional frames having the first color component, temporally blending a second frame of the plurality of frames with one or more additional frames having the second color component, and temporally blending a third frame of the plurality of frames with one or more additional frames having the third color component. For instance, as shown in FIG. 19, multiple raw images 1902 are processed. A YUV image can be generated for each color component of each raw image (from the multiple raw images 1902), resulting in multiple YUV images for each color component (e.g., multiple YUV images including the R color components from the raw images, multiple YUV images including the Gr color components from the raw images, multiple YUV images including the Gb color components from the raw images, and multiple YUV images including the B color components from the raw images). The multiple YUV images for each color component generated by the system of FIG. 19 can then be processed for temporal blending (e.g., by the MFNR). For example, the multiple YUV images including the R color components from the raw images can be temporally blended by the MFNR, the multiple YUV images including the Gr color components from the raw images can be temporally blended by the MFNR, the multiple YUV images including the Gb color components from the raw images can be temporally blended by the MFNR, and the multiple YUV images including the B color components from the raw images can be temporally blended by the MFNR.

In some examples, the processes described herein (e.g., process 2200, process 2300, and/or other process described herein) may be performed by a computing device or apparatus. In some examples, the process 2200 and/or the process 2300 can be performed by the frame capture and processing system 100 of FIG. 1, the frame processing and/or capture instruction system 400 of FIG. 4, the frame processing and/or capture instruction system 1400 of FIG. 14A, the frame processing and/or capture instruction system 1405 of FIG. 14B, the frame processing and/or capture instruction system 1700 of FIG. 17A, the system of FIG. 19, and/or the system of FIG. 20. In another example, the process 2200 and/or the process 2300 can be performed by the image processing device 105B of FIG. 1. In another example, the process 2200 and/or the process 2300 can be performed by a computing device or system with the architecture of the computing system 2600 shown in FIG. 26. For instance, a computing device with the architecture of the computing system 2600 shown in FIG. 26 can include the components of the frame capture and processing system 100 of FIG. 1, the frame processing and/or capture instruction system 400 of FIG. 4, the frame processing and/or capture instruction system 1400 of FIG. 14A, the frame processing and/or capture instruction system 1405 of FIG. 14B, the frame processing and/or capture instruction system 1700 of FIG. 17A, the system of FIG. 19, and/or the system of FIG. 20, and can implement the operations of FIG. 22 and/or the operations of FIG. 23.

The computing device can include any suitable device, such as a mobile device (e.g., a mobile phone), a desktop computing device, a tablet computing device, a wearable device (e.g., a VR headset, an AR headset, AR glasses, a network-connected watch or smartwatch, or other wearable device), a server computer, a vehicle or computing device of a vehicle, a robotic device, a television, and/or any other computing device with the resource capabilities to perform the processes described herein, including the process 2200. In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, a network interface configured to communicate and/or receive the data, any combination thereof, and/or other component(s). The network interface may be configured to communicate and/or receive Internet Protocol (IP) based data or other type of data.

The components of the computing device can be implemented in circuitry. For example, the components can include and/or can be implemented using electronic circuits or other electronic hardware, which can include one or more programmable electronic circuits (e.g., microprocessors, graphics processing units (GPUs), digital signal processors (DSPs), central processing units (CPUs), and/or other suitable electronic circuits), and/or can include and/or be implemented using computer software, firmware, or any combination thereof, to perform the various operations described herein.

The process 2200 and the process 2300 are illustrated as logical flow diagrams, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 2200, the process 2300, and/or other process described herein may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

As described above, a machine learning based image signal processor (e.g., the ML ISP of FIG. 14A, FIG. 14B, FIG. 15, FIG. 16, and/or FIG. 17A) can be used in some cases. The ML ISP can include one or more neural networks. FIG. 24 is a block diagram illustrating an example of a neural network 2400, in accordance with some examples. The neural network 2400 of FIG. 24 can be used to implement such ML ISPs. The neural network 2400 of FIG. 24 can be used to implement any operations described herein as performed by any of the above-described systems and techniques.

An input layer 2420 includes input data. In one illustrative example, the input layer 2420 can include data representing the pixels of an input image captured by one or more cameras. The image may be a video frame. The neural network 2400 includes multiple hidden layers 2422a, 2422b, through 2422n. The hidden layers 2422a, 2422b, through 2422n include "n" number of hidden layers, where "n" is an integer greater than or equal to one. The number of hidden layers can be made to include as many layers as needed for the given application. The neural network 2400 further includes an output layer 2424 that provides an output resulting from the processing performed by the hidden layers 2422a, 2422b, through 2422n. In one illustrative example, the output layer 2424 can provide an optical flow and/or weight map for an object in an input video frame. In one illustrative example, the output layer 2424 can provide an encoded version of an input video frame.

The neural network 2400 is a multi-layer neural network of interconnected nodes. Each node can represent a piece of information. Information associated with the nodes is shared among the different layers and each layer retains information as information is processed. In some cases, the neural network 2400 can include a feed-forward network, in which case there are no feedback connections where outputs of the network are fed back into itself. In some cases, the neural network 2400 can include a recurrent neural network, which can have loops that allow information to be carried across nodes while reading in input.

Information can be exchanged between nodes through node-to-node interconnections between the various layers. Nodes of the input layer 2420 can activate a set of nodes in the first hidden layer 2422*a*. For example, as shown, each of the input nodes of the input layer 2420 is connected to each of the nodes of the first hidden layer 2422*a*. The nodes of the first hidden layer 2422*a* can transform the information of each input node by applying activation functions to the input node information. The information derived from the transformation can then be passed to and can activate the nodes of the next hidden layer 2422*b*, which can perform their own designated functions. Example functions include convolutional, up-sampling, data transformation, and/or any other suitable functions. The output of the hidden layer 2422*b* can then activate nodes of the next hidden layer, and so on. The output of the last hidden layer 2422*n* can activate one or more nodes of the output layer 2424, at which an output is provided. In some cases, while nodes (e.g., node 2426) in the neural network 2400 are shown as having multiple output lines, a node has a single output and all lines shown as being output from a node represent the same output value.

In some cases, each node or interconnection between nodes can have a weight that is a set of parameters derived from the training of the neural network 2400. Once the neural network 2400 is trained, it can be referred to as a trained neural network, which can be used to generate a 2D optical flow, generate a MS optical flow, generate a weight map, 2D warp a frame based on a 2D optical flow, MS warp a frame based on a MS optical flow, encode data, decode data, generate a prediction frame, or a combination thereof. For example, an interconnection between nodes can represent a piece of information learned about the interconnected nodes. The interconnection can have a tunable numeric weight that can be tuned (e.g., based on a training dataset), allowing the neural network 2400 to be adaptive to inputs and able to learn as more and more data is processed.

The neural network 2400 is pre-trained to process the features from the data in the input layer 2420 using the different hidden layers 2422*a*, 2422*b*, through 2422*n* in order to provide the output through the output layer 2424. In an example in which the neural network 2400 is used to identify objects in images, the neural network 2400 can be trained using training data that includes both images and labels. For instance, training images can be input into the network, with each training image having a label indicating the classes of the one or more objects in each image (basically, indicating to the network what the objects are and what features they have). In one illustrative example, a training image can include an image of a number 2, in which case the label for the image can be [0 0 1 0 0 0 0 0 0 0].

In some cases, the neural network 2400 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the neural network 2400 is trained well enough so that the weights of the layers are accurately tuned.

For the example of identifying objects in images, the forward pass can include passing a training image through the neural network 2400. The weights are initially randomized before the neural network 2400 is trained. The image can include, for example, an array of numbers representing the pixels of the image. Each number in the array can include a value from 0 to 255 describing the pixel intensity at that position in the array. In one example, the array can include a 28×28×3 array of numbers with 28 rows and 28 columns of pixels and 3 color components (such as red, green, and blue, or luma and two chroma components, or the like).

For a first training iteration for the neural network 2400, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the neural network 2400 is unable to determine low level features and thus cannot make an accurate determination (e.g., of optical flow or weight mapping for a particular area of a frame) might be. A loss function can be used to analyze error in the output. Any suitable loss function definition can be used. One example of a loss function includes a mean squared error (MSE). The MSE is defined as $$E_{total} = \sum \frac{1}{2}(\text{target} - \text{output})^2,$$

which calculates the sum of one-half times the actual answer minus the predicted (output) answer squared. The loss can be set to be equal to the value of $E_{total}$.

The loss (or error) will be high for the first training images since the actual values will be much different than the predicted output. The goal of training is to minimize the amount of loss so that the predicted output is the same as the training label. The neural network 2400 can perform a backward pass by determining which inputs (weights) most contributed to the loss of the network, and can adjust the weights so that the loss decreases and is eventually minimized.

A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $$w = w_i - \eta \frac{dL}{dW},$$

where w denotes a weight, $w_i$ denotes the initial weight, and η denotes a learning rate. The learning rate can be set to any suitable value, with a high learning rate including larger weight updates and a lower value indicating smaller weight updates.

The neural network 2400 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 2400 can include any other deep network other than a CNN, such as an autoencoder, a deep belief nets (DBNs), a Recurrent Neural Networks (RNNs), among others.

FIG. 25 is a block diagram illustrating an example of a convolutional neural network (CNN) 2500, in accordance with some examples. The input layer 2520 of the CNN 2500 includes data representing an image, such as an image captured by one of the one or more cameras 210. For example, the data can include an array of numbers representing the pixels of the image, with each number in the array including a value from 0 to 255 describing the pixel intensity at that position in the array. Using the previous example from above, the array can include a 28×28×3 array of numbers with 28 rows and 28 columns of pixels and 3 color components (e.g., red, green, and blue, or luma and two chroma components, or the like). The image can be passed through a convolutional hidden layer 2522$a$, an optional non-linear activation layer, a pooling hidden layer 2522$b$, and fully connected hidden layers 2522$c$ to get an output at the output layer 2524. While only one of each hidden layer is shown in FIG. 25, one of ordinary skill will appreciate that multiple convolutional hidden layers, non-linear layers, pooling hidden layers, and/or fully connected layers can be included in the CNN 2500. As previously described, the output can generate a 2D optical flow, generate a MS optical flow, generate a weight map, 2D warp a frame based on a 2D optical flow, MS warp a frame based on a MS optical flow, encode data, decode data, generate a prediction frame, or a combination thereof.

The first layer of the CNN 2500 is the convolutional hidden layer 2522$a$. The convolutional hidden layer 2522$a$ analyzes the image data of the input layer 2520. Each node of the convolutional hidden layer 2522$a$ is connected to a region of nodes (pixels) of the input image called a receptive field. The convolutional hidden layer 2522$a$ can be considered as one or more filters (each filter corresponding to a different activation or feature map), with each convolutional iteration of a filter being a node or neuron of the convolutional hidden layer 2522$a$. For example, the region of the input image that a filter covers at each convolutional iteration would be the receptive field for the filter. In one illustrative example, if the input image includes a 28×28 array, and each filter (and corresponding receptive field) is a 5×5 array, then there will be 24×24 nodes in the convolutional hidden layer 2522$a$. Each connection between a node and a receptive field for that node learns a weight and, in some cases, an overall bias such that each node learns to analyze its particular local receptive field in the input image. Each node of the hidden layer 2522$a$ will have the same weights and bias (called a shared weight and a shared bias). For example, the filter has an array of weights (numbers) and the same depth as the input. A filter will have a depth of 3 for the video frame example (according to three color components of the input image). An illustrative example size of the filter array is 5×5×3, corresponding to a size of the receptive field of a node.

The convolutional nature of the convolutional hidden layer 2522$a$ is due to each node of the convolutional layer being applied to its corresponding receptive field. For example, a filter of the convolutional hidden layer 2522$a$ can begin in the top-left corner of the input image array and convolve around the input image. As noted above, each convolutional iteration of the filter can be considered a node or neuron of the convolutional hidden layer 2522$a$. At each convolutional iteration, the values of the filter are multiplied with a corresponding number of the original pixel values of the image (e.g., the 5×5 filter array is multiplied by a 5×5 array of input pixel values at the top-left corner of the input image array). The multiplications from each convolutional iteration can be summed together to obtain a total sum for that iteration or node. The process is next continued at a next location in the input image according to the receptive field of a next node in the convolutional hidden layer 2522$a$. For example, a filter can be moved by a step amount (referred to as a stride) to the next receptive field. The stride can be set to 1 or other suitable amount. For example, if the stride is set to 1, the filter will be moved to the right by 1 pixel at each convolutional iteration. Processing the filter at each unique location of the input volume produces a number representing the filter results for that location, resulting in a total sum value being determined for each node of the convolutional hidden layer 2522$a$.

The mapping from the input layer to the convolutional hidden layer 2522$a$ is referred to as an activation map (or feature map). The activation map includes a value for each node representing the filter results at each locations of the input volume. The activation map can include an array that includes the various total sum values resulting from each iteration of the filter on the input volume. For example, the activation map will include a 24×24 array if a 5×5 filter is applied to each pixel (a stride of 1) of a 28×28 input image. The convolutional hidden layer 2522$a$ can include several activation maps in order to identify multiple features in an image. The example shown in FIG. 25 includes three activation maps. Using three activation maps, the convolutional hidden layer 2522$a$ can detect three different kinds of features, with each feature being detectable across the entire image.

In some examples, a non-linear hidden layer can be applied after the convolutional hidden layer 2522$a$. The non-linear layer can be used to introduce non-linearity to a system that has been computing linear operations. One illustrative example of a non-linear layer is a rectified linear unit (ReLU) layer. A ReLU layer can apply the function f(x)=max(0, x) to all of the values in the input volume, which changes all the negative activations to 0. The ReLU can thus increase the non-linear properties of the CNN 2500 without affecting the receptive fields of the convolutional hidden layer 2522$a$.

The pooling hidden layer 2522$b$ can be applied after the convolutional hidden layer 2522$a$ (and after the non-linear hidden layer when used). The pooling hidden layer 2522$b$ is used to simplify the information in the output from the convolutional hidden layer 2522$a$. For example, the pooling hidden layer 2522$b$ can take each activation map output from the convolutional hidden layer 2522$a$ and generates a condensed activation map (or feature map) using a pooling function. Max-pooling is one example of a function performed by a pooling hidden layer. Other forms of pooling functions be used by the pooling hidden layer 2522$a$, such as average pooling, L2-norm pooling, or other suitable pooling functions. A pooling function (e.g., a max-pooling filter, an L2-norm filter, or other suitable pooling filter) is applied to each activation map included in the convolutional hidden layer 2522a. In the example shown in FIG. 25, three pooling filters are used for the three activation maps in the convolutional hidden layer 2522a.

In some examples, max-pooling can be used by applying a max-pooling filter (e.g., having a size of 2×2) with a stride (e.g., equal to a dimension of the filter, such as a stride of 2) to an activation map output from the convolutional hidden layer 2522a. The output from a max-pooling filter includes the maximum number in every sub-region that the filter convolves around. Using a 2×2 filter as an example, each unit in the pooling layer can summarize a region of 2×2 nodes in the previous layer (with each node being a value in the activation map). For example, four values (nodes) in an activation map will be analyzed by a 2×2 max-pooling filter at each iteration of the filter, with the maximum value from the four values being output as the "max" value. If such a max-pooling filter is applied to an activation filter from the convolutional hidden layer 2522a having a dimension of 24×24 nodes, the output from the pooling hidden layer 2522b will be an array of 12×12 nodes.

In some examples, an L2-norm pooling filter could also be used. The L2-norm pooling filter includes computing the square root of the sum of the squares of the values in the 2×2 region (or other suitable region) of an activation map (instead of computing the maximum values as is done in max-pooling), and using the computed values as an output.

Intuitively, the pooling function (e.g., max-pooling, L2-norm pooling, or other pooling function) determines whether a given feature is found anywhere in a region of the image, and discards the exact positional information. This can be done without affecting results of the feature detection because, once a feature has been found, the exact location of the feature is not as important as its approximate location relative to other features. Max-pooling (as well as other pooling methods) offer the benefit that there are many fewer pooled features, thus reducing the number of parameters needed in later layers of the CNN 2500.

The final layer of connections in the network is a fully-connected layer that connects every node from the pooling hidden layer 2522b to every one of the output nodes in the output layer 2524. Using the example above, the input layer includes 28×28 nodes encoding the pixel intensities of the input image, the convolutional hidden layer 2522a includes 3×24×24 hidden feature nodes based on application of a 5×5 local receptive field (for the filters) to three activation maps, and the pooling hidden layer 2522b includes a layer of 3×12×12 hidden feature nodes based on application of max-pooling filter to 2×2 regions across each of the three feature maps. Extending this example, the output layer 2524 can include ten output nodes. In such an example, every node of the 3×12×12 pooling hidden layer 2522b is connected to every node of the output layer 2524.

The fully connected layer 2522c can obtain the output of the previous pooling hidden layer 2522b (which should represent the activation maps of high-level features) and determines the features that most correlate to a particular class. For example, the fully connected layer 2522c layer can determine the high-level features that most strongly correlate to a particular class, and can include weights (nodes) for the high-level features. A product can be computed between the weights of the fully connected layer 2522c and the pooling hidden layer 2522b to obtain probabilities for the different classes. For example, if the CNN 2500 is being used to generate an optical flow high values will be present in the activation maps that represent high-level features of motion of a visual element from one frame to another.

In some examples, the output from the output layer 2524 can include an M-dimensional vector (in the prior example, M=10), where M can include data corresponding to possible motion vector directions in an optical flow, possible motion vector amplitudes in an optical flow, possible weight values in a weight map, and the like. In one illustrative example, if a 9-dimensional output vector represents ten different possible values is [0 0 0.05 0.8 0 0.15 0 0 0], the vector indicates that there is a 5% probability of the third value, an 80% probability of the fourth value, and a 15% probability of the sixth value. The probability for a possible value can be considered a confidence level or certainty level for that value (e.g., for that motion vector direction, for that motion vector amplitude, for that weight value, etc.).

Figure 26:
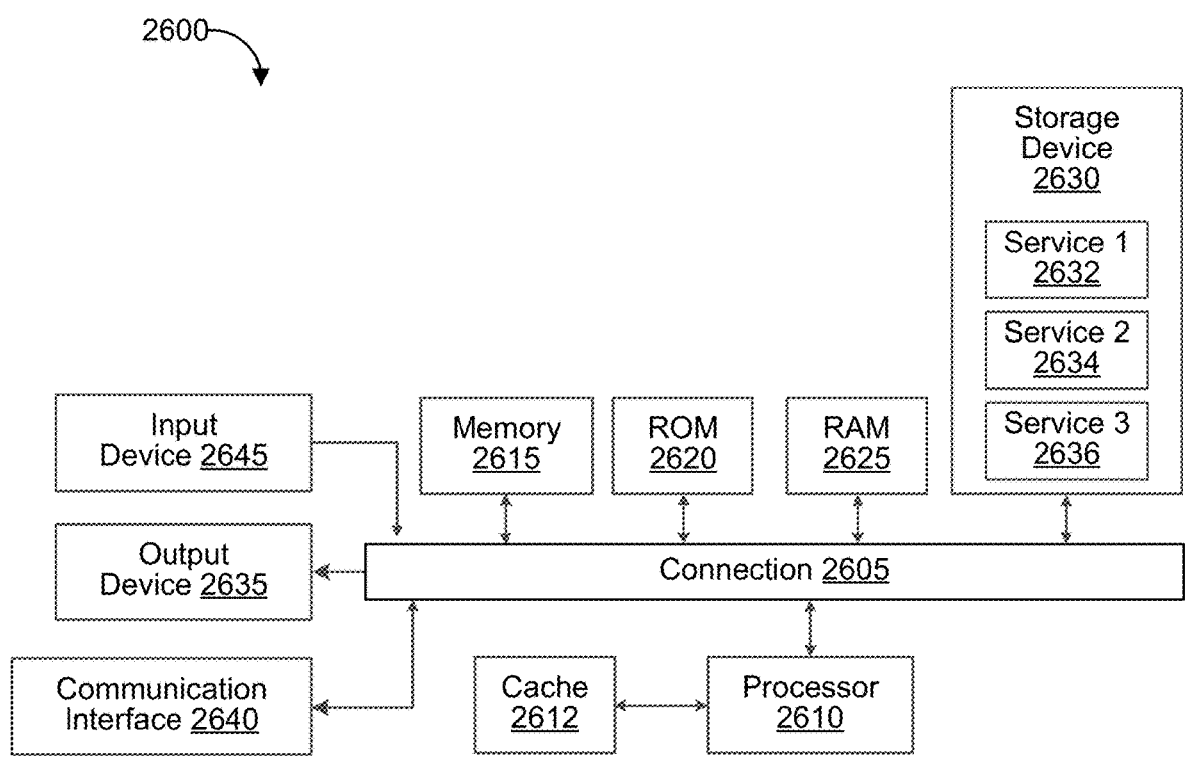
FIG. 26 is a diagram illustrating an example of a system for implementing certain aspects described herein.

FIG. 26 is a diagram illustrating an example of a system for implementing certain aspects of the present technology. In particular, FIG. 26 illustrates an example of computing system 2600, which can be for example any computing device making up internal computing system, a remote computing system, a camera, or any component thereof in which the components of the system are in communication with each other using connection 2605. Connection 2605 can be a physical connection using a bus, or a direct connection into processor 2610, such as in a chipset architecture. Connection 2605 can also be a virtual connection, networked connection, or logical connection.

In some embodiments, computing system 2600 is a distributed system in which the functions described in this disclosure can be distributed within a datacenter, multiple data centers, a peer network, etc. In some embodiments, one or more of the described system components represents many such components each performing some or all of the function for which the component is described. In some embodiments, the components can be physical or virtual devices.

Example system 2600 includes at least one processing unit (CPU or processor) 2610 and connection 2605 that couples various system components including system memory 2615, such as read-only memory (ROM) 2620 and random access memory (RAM) 2625 to processor 2610. Computing system 2600 can include a cache 2612 of high-speed memory connected directly with, in close proximity to, or integrated as part of processor 2610.

Processor 2610 can include any general purpose processor and a hardware service or software service, such as services 2632, 2634, and 2636 stored in storage device 2630, configured to control processor 2610 as well as a special-purpose processor where software instructions are incorporated into the actual processor design. Processor 2610 may essentially be a completely self-contained computing system, containing multiple cores or processors, a bus, memory controller, cache, etc. A multi-core processor may be symmetric or asymmetric.

To enable user interaction, computing system 2600 includes an input device 2645, which can represent any number of input mechanisms, such as a microphone for speech, a touch-sensitive screen for gesture or graphical input, keyboard, mouse, motion input, speech, etc. Computing system 2600 can also include output device 2635, which can be one or more of a number of output mechanisms. In some instances, multimodal systems can enable a user to provide multiple types of input/output to communicate with computing system 2600. Computing system 2600 can include communications interface 2640, which can generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 2640 may also include one or more Global Navigation Satellite System (GNSS) receivers or transceivers that are used to determine a location of the computing system 2600 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 2630 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L#), resistive random-access memory (RRAM/Re-RAM), phase change memory (PCM), spin transfer torque RAM (STT-RAM), another memory chip or cartridge, and/or a combination thereof.

The storage device 2630 can include software services, servers, services, etc., that when the code that defines such software is executed by the processor 2610, it causes the system to perform a function. In some embodiments, a hardware service that performs a particular function can include the software component stored in a computer-readable medium in connection with the necessary hardware components, such as processor 2610, connection 2605, output device 2635, etc., to carry out the function.

As used herein, the term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, or the like.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Specific details are provided in the description above to provide a thorough understanding of the embodiments and examples provided herein. However, it will be understood by one of ordinary skill in the art that the embodiments may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Individual embodiments may be described above as a process or method which is depicted as a flow diagram, a flowchart, a data flow diagram, a structure diagram, or a block diagram. Although a flow diagram may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc. Examples of computer-readable media that may be used to store instructions, information used, and/or information created during methods according to described examples include magnetic or optical disks, flash memory, USB devices provided with non-volatile memory, networked storage devices, and so on.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

One of ordinary skill will appreciate that the less than ("<") and greater than (">") symbols or terminology used herein can be replaced with less than or equal to ("≤") and greater than or equal to ("≥") symbols, respectively, without departing from the scope of this description.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" means A, B, or A and B. In another example, claim language reciting "at least one of A, B, and C" means A, B, C, or A and B, or A and C, or B and C, or A and B and C. The language "at least one of" a set and/or "one or more" of a set does not limit the set to the items listed in the set. For example, claim language reciting "at least one of A and B" can mean A, B, or A and B, and can additionally include items not listed in the set of A and B.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

Illustrative aspects of the disclosure include:

Aspect 1. An apparatus for determining an exposure duration for a number of frames. The apparatus includes a memory (e.g., implemented in circuitry) and one or more processors (e.g., one processor or multiple processors) coupled to the memory. The one or more processors are configured to: obtain a motion map for one or more frames; determine, based on the motion map, motion associated with the one or more frames of a scene, the motion corresponding to movement of one or more objects in the scene relative to a camera used to capture the one or more frames; determine, based on the determined motion, a number of frames and an exposure for capturing the number of frames; and send a request to capture the number of frames using the determined exposure duration.

Aspect 2. The apparatus of Aspect 1, wherein the one or more frames are obtained before a capture command for capturing the number of frames is received.

Aspect 3. The apparatus of any one of Aspects 1 or 2, wherein the one or more processors are configured to: perform temporal blending on the number of frames captured using the determined exposure duration to generate a temporally blended frame.

Aspect 4. The apparatus of Aspect 3, wherein the one or more processors are configured to: perform, using a machine learning based image signal processor, spatial processing on the temporally blended frame.

Aspect 5. The apparatus of Aspect 4, wherein the machine learning based image signal processor uses the motion map as input for performing the spatial processing on the temporally blended frame.

Aspect 6. The apparatus of any one of Aspects 1 to 5, wherein the determined exposure duration is based on a gain.

Aspect 7. The apparatus of any one of Aspects 1 to 6, wherein the motion map includes an image, each pixel of the image including a value indicating at least one of an amount of motion for each pixel and a confidence value associated with the amount of motion.

Aspect 8. The apparatus of any one of Aspects 1 to 7, wherein the one or more processors are configured to: determine, based on one or more sensor measurements, global motion associated with the camera; wherein the number of frames and the exposure duration for capturing the number of frames is determined based on the determined motion and the global motion.

Aspect 9. The apparatus of any one of Aspects 1 to 8, wherein, to determine the number of frames and the exposure duration for capturing the number of frames based on the determined motion and the global motion, the one or more processors are configured to: determine a final motion indication based on the determined motion and the global motion; and determine the number of frames and the exposure duration for capturing the number of frames based on the final motion indication.

Aspect 10. The apparatus of Aspect 9, wherein, to determine the final motion indication based on the determined motion and the global motion, the one or more processors are configured to: determined a weighted combination of the determined motion and the global motion using a first weight for the determined motion and a second weight for the global motion.

Aspect 11. The apparatus of any one of Aspects 9 or 10, wherein the one or more processors are configured to: determine, based on the final motion indication, an amount of motion in the one or more frames is less than a motion threshold; and based on the amount of motion in the one or more frames being less than the motion threshold, decrease a frame count for the number of frames and increase an exposure amount for the determined exposure duration.

Aspect 12. The apparatus of any one of Aspects 9 or 10, wherein the one or more processors are configured to: determine, based on the final motion indication, an amount of motion in the one or more frames is greater than a motion threshold; and based on the amount of motion in the one or more frames being greater than the motion threshold, increase a frame count for the number of frames and decrease an exposure amount for the determined exposure duration.

Aspect 13. The apparatus of any one of Aspects 1 to 12, further comprising at least one of a camera configured to capture at least one frame and a display configured to display the at least one frame.

Aspect 14. An apparatus for performing temporal blending for one or more frames. The apparatus includes a memory (e.g., implemented in circuitry) configured to store one or more frames and one or more processors (e.g., one processor or multiple processors) coupled to the memory. The one or more processors are configured to: obtain a raw frame, the raw frame including a single color component for each pixel of the raw frame; divide the raw frame into a first color component, a second color component, and a third color component; generate a plurality of frames at least in part by adding at least a first chrominance value to the first color component, at least a second chrominance value to the second color component, and at least a third chrominance value to the third color component; and perform temporal blending for the plurality of frames.

Aspect 15. The apparatus of Aspect 14, wherein the raw frame includes a color filter array (CFA) pattern.

Aspect 16. The apparatus of any one of Aspects 14 or 15, wherein the first color component includes a red color component, wherein the second color component includes a green color component, and wherein the third color component includes a blue color component.

Aspect 17. The apparatus of any one of Aspects 14 to 16, wherein the first color component includes all red pixels of the raw frame, wherein the second color component includes all green pixels of the raw frame, and wherein the third color component includes all blue pixels of the raw frame.

Aspect 18. The apparatus of any one of Aspects 14 to 17, wherein, to generate the plurality of frames, the one or more processors are configured to: generate a first frame at least in part by adding at least the first chrominance value to the first color component; generate a second frame at least in part by adding at least the second chrominance value to the second color component; and generate a third frame at least in part by adding at least the third chrominance value to the third color component.

Aspect 19. The apparatus of any one of Aspect 18, wherein: to generate the first frame, the one or more processors are configured to add a first chrominance value and a second chrominance value to the first color component; to generate the second frame, the one or more processors are configured to add the first chrominance value and the second chrominance value to the second color component; and to generate the third frame, the one or more processors are configured to add the first chrominance value and the second chrominance value to the third color component.

Aspect 20. The apparatus of Aspect 19, wherein the first chrominance value and the second chrominance value are a same value.

Aspect 21. The apparatus of any one of Aspects 14 to 20, wherein, to perform the temporal blending for the plurality of frames, the one or more processors are configured to: temporally blend a first frame of the plurality of frames with one or more additional frames having the first color component; temporally blend a second frame of the plurality of frames with one or more additional frames having the second color component; and temporally blend a third frame of the plurality of frames with one or more additional frames having the third color component.

Aspect 22. The apparatus of any one of Aspects 14 to 21, wherein the apparatus is a mobile device.

Aspect 23. The apparatus of any one of Aspects 14 to 22, further comprising a camera configured to capture one or more frames.

Aspect 24. The apparatus of any one of Aspects 14 to 23, further comprising a display configured to display one or more frames.

Aspect 25. An apparatus comprising the apparatus of any one of Aspects 1-13 and the apparatus of any one of Aspects 14-24.

Aspect 26. A method of determining an exposure duration for a number of frames. The method comprises: obtaining a motion map for one or more frames; determining, based on the motion map, motion associated with the one or more frames of a scene, the motion corresponding to movement of one or more objects in the scene relative to a camera used to capture the one or more frames; determining, based on the determined motion, a number of frames and an exposure for capturing the number of frames; and sending a request to capture the number of frames using the determined exposure duration.

Aspect 27. The method of Aspect 26, wherein the one or more frames are obtained before a capture command for capturing the number of frames is received.

Aspect 28. The method of any one of Aspects 26 or 27, further comprising: performing temporal blending on the number of frames captured using the determined exposure duration to generate a temporally blended frame.

Aspect 29. The method of Aspect 28, further comprising: performing, using a machine learning based image signal processor, spatial processing on the temporally blended frame.

Aspect 30. The method of Aspect 29, wherein the machine learning based image signal processor uses the motion map as input for performing the spatial processing on the temporally blended frame.

Aspect 31. The method of any one of Aspects 26 to 30, wherein the determined exposure duration is based on a gain.

Aspect 32. The method of any one of Aspects 26 to 31, wherein the motion map includes an image, each pixel of the image including a value indicating at least one of an amount of motion for each pixel and a confidence value associated with the amount of motion.

Aspect 33. The method of any one of Aspects 26 to 32, further comprising: determining, based on one or more sensor measurements, global motion associated with the camera; wherein the number of frames and the exposure duration for capturing the number of frames are determined based on the determined motion and the global motion.

Aspect 34. The method of any one of Aspects 26 to 33, further comprising: determining a final motion indication based on the determined motion and the global motion; wherein the number of frames and the exposure duration for capturing the number of frames are determined based on the final motion indication.

Aspect 35. The method of Aspect 34, wherein the final motion indication is based on a weighted combination of the determined motion and the global motion using a first weight for the determined motion and a second weight for the global motion.

Aspect 36. The method of any one of Aspects 34 or 35, further comprising: determining, based on the final motion indication, an amount of motion in the one or more frames is less than a motion threshold; and based on the amount of motion in the one or more frames being less than the motion threshold, decreasing a frame count for the number of frames and increasing an exposure duration amount for the determined exposure duration.

Aspect 37. The method of any one of Aspects 34 or 35, further comprising: determining, based on the final motion indication, an amount of motion in the one or more frames is greater than a motion threshold; and based on the amount of motion in the one or more frames being greater than the motion threshold, increasing a frame count for the number of frames and decreasing an exposure duration amount for the determined exposure duration.

Aspect 38. A method of performing temporal blending for one or more frames. The method comprises: obtaining a raw frame, the raw frame including a single color component for each pixel of the raw frame; dividing the raw frame into a first color component, a second color component, and a third color component; generating a plurality of frames at least in part by adding at least a first chrominance value to the first color component, at least a second chrominance value to the second color component, and at least a third chrominance value to the third color component; and performing temporal blending for the plurality of frames.

Aspect 39. The method of Aspect 38, wherein the raw frame includes a color filter array (CFA) pattern.

Aspect 40. The method of any one of Aspects 38 or 39, wherein the first color component includes a red color component, wherein the second color component includes a green color component, and wherein the third color component includes a blue color component.

Aspect 41. The method of any one of Aspects 38 to 40, wherein the first color component includes all red pixels of the raw frame, wherein the second color component includes all green pixels of the raw frame, and wherein the third color component includes all blue pixels of the raw frame.

Aspect 42. The method of any one of Aspects 38 to 41, wherein generating the plurality of frames includes: generating a first frame at least in part by adding at least the first chrominance value to the first color component; generating a second frame at least in part by adding at least the second chrominance value to the second color component; and generating a third frame at least in part by adding at least the third chrominance value to the third color component.

Aspect 43. The method of any one of Aspect 42, wherein: generating the first frame includes adding a first chrominance value and a second chrominance value to the first color component; generating the second frame includes adding the first chrominance value and the second chrominance value to the second color component; and generating the third frame includes adding the first chrominance value and the second chrominance value to the third color component.

Aspect 44. The method of Aspect 43, wherein the first chrominance value and the second chrominance value are a same value.

Aspect 45. The method of any one of Aspects 38 to 44, wherein performing the temporal blending for the plurality of frames includes: temporally blending a first frame of the plurality of frames with one or more additional frames having the first color component; temporally blending a second frame of the plurality of frames with one or more additional frames having the second color component; and temporally blending a third frame of the plurality of frames with one or more additional frames having the third color component.

Aspect 46. A computer-readable storage medium storing instructions that, when executed by one or more processors, cause the one or more processors to perform operations according to any of Aspects 26 to 37.

Aspect 47. An apparatus comprising means for performing operations according to any of Aspects 26 to 37.

Aspect 48. A computer-readable storage medium storing instructions that, when executed by one or more processors, cause the one or more processors to perform operations according to any of Aspects 38 to 45.

Aspect 49. An apparatus comprising means for performing operations according to any of Aspects 38 to 45.

Aspect 50. A computer-readable storage medium storing instructions that, when executed by one or more processors, cause the one or more processors to perform operations according to any of Aspects 26 to 35 and any of the operations of Aspects 36 to 43.

Aspect 51. A method comprising the operations of any one of Aspects 26-37 and the operations of any one of Aspects 38-45.

Aspect 52. An apparatus comprising means for performing operations according to any of Aspects 26 to 37 and any of the operations of Aspects 38 to 45.

What is claimed is:

1. An apparatus for processing one or more frames, comprising:
   a memory; and
   one or more processors coupled to the memory and configured to:
      obtain a motion map for the one or more frames, wherein the motion map includes a plurality of pixels and, for each pixel, a value indicating a respective amount of motion for the respective pixel and a respective confidence value associated with the respective amount of motion for the respective pixel;
      determine, based on the motion map, motion associated with the one or more frames of a scene, the motion corresponding to movement of one or more objects in the scene;
      determine, based on one or more sensor measurements, global motion associated with a camera used to capture the one or more frames;
      determine a weighted combination of the determined motion and the global motion using a first weight for the determined motion and a second weight for the global motion, the first weight representing a sensitivity of frame processing to movement of the one or more objects in the scene;
      determine, based on the weighted combination of the determined motion and the global motion, an amount of motion in the one or more frames is less than a motion threshold;
      determine a number of frames and an exposure duration for capturing the number of frames, wherein the determined number of frames is less than a previously-captured number of frames used to generate a first frame for display and the determined exposure duration is greater than an exposure duration used to capture the previously-captured number of frames based on the amount of motion in the one or more frames being less than the motion threshold;
      send a request to capture the number of frames using the determined exposure duration; and
      output a second frame for display based on the number of frames captured using the determined exposure duration.

2. The apparatus of claim 1, wherein the one or more frames are obtained before a capture command for capturing the number of frames is received.

3. The apparatus of claim 1, wherein the one or more processors are configured to:
   perform temporal blending on the number of frames captured using the determined exposure duration to generate a temporally blended frame.

4. The apparatus of claim 3, wherein the one or more processors are configured to:
   perform, using a machine learning based image signal processor, spatial processing on the temporally blended frame.

5. The apparatus of claim 4, wherein the machine learning based image signal processor uses the motion map as input for performing the spatial processing on the temporally blended frame.

6. The apparatus of claim 1, wherein the determined exposure duration is based on a gain.

7. The apparatus of claim 1, wherein the number of frames and the exposure duration for capturing the number of frames are determined based on the determined motion and the global motion.

8. The apparatus of claim 7, wherein the one or more processors are configured to:
determine a final motion indication based on the determined motion and the global motion; and
wherein the amount of motion is based on the final motion indication.

9. The apparatus of claim 8, wherein the final motion indication is based on the weighted combination of the determined motion and the global motion.

10. The apparatus of claim 8, wherein the one or more processors are configured to:
determine, based on a final motion indication associated with at least one additional frame, an amount of motion in the at least one additional frame is greater than the motion threshold; and
based on the amount of motion in the at least one additional frame being greater than the motion threshold, increase a frame count for the number of frames and decrease an exposure amount for the determined exposure duration.

11. The apparatus of claim 1, further comprising at least one of a camera configured to capture at least one frame and a display configured to display the first frame and the second frame.

12. A method of processing one or more frames, the method comprising:
obtaining a motion map for the one or more frames, wherein the motion map includes-a plurality of pixels and, for each pixel, a value indicating a respective amount of motion for the respective pixel and a respective confidence value associated with the respective amount of motion for the respective pixel;
determining, based on the motion map, motion associated with the one or more frames of a scene, the motion corresponding to movement of one or more objects in the scene;
determining, based on one or more sensor measurements, global motion associated with a camera used to capture the one or more frames;
determining a weighted combination of the determined motion and the global motion using a first weight for the determined motion and a second weight for the global motion, the first weight representing a sensitivity of frame processing to movement of the one or more objects in the scene;
determining, based on the weighted combination of the determined motion and the global motion, an amount of motion in the one or more frames is less than a motion threshold;
determining a number of frames and an exposure duration for capturing the number of frames, wherein the determined number of frames is less than a previously-captured number of frames used to generate a first frame for display and the determined exposure duration is greater than an exposure duration used to capture the previously-captured number of frames based on the amount of motion in the one or more frames being less than the motion threshold;
sending a request to capture the number of frames using the determined exposure duration; and
displaying a second frame based on the number of frames captured using the determined exposure duration.

13. The method of claim 12, wherein the one or more frames are obtained before a capture command for capturing the number of frames is received.

14. The method of claim 12, further comprising:
performing temporal blending on the number of frames captured using the determined exposure duration to generate a temporally blended frame.

15. The method of claim 14, further comprising:
performing, using a machine learning based image signal processor, spatial processing on the temporally blended frame.

16. The method of claim 15, wherein the machine learning based image signal processor uses the motion map as input for performing the spatial processing on the temporally blended frame.

17. The method of claim 12, wherein the determined exposure duration is based on a gain.

18. The method of claim 12, wherein the number of frames and the exposure duration for capturing the number of frames are determined based on the determined motion and the global motion.

19. The method of claim 18, further comprising:
determining a final motion indication based on the determined motion and the global motion;
wherein the amount of motion is based on the final motion indication.

20. The method of claim 19, wherein the final motion indication is based on the weighted combination of the determined motion and the global motion.

21. The method of claim 19, further comprising:
determining, based on a final motion indication associated with at least one additional frame, an amount of motion in the at least one additional frame is greater than the motion threshold; and
based on the amount of motion in the at least one additional frame being greater than the motion threshold, increasing a frame count for the number of frames and decreasing an exposure duration amount for the determined exposure duration.

22. A non-transitory computer-readable storage medium storing instructions that, when executed by one or more processors, cause the one or more processors to:
obtain a motion map for one or more frames, wherein the motion map includes-a plurality of pixels and, for each pixel, a value indicating a respective amount of motion for the respective pixel and a respective confidence value associated with the respective amount of motion for the respective pixel;
determine, based on the motion map, motion associated with the one or more frames of a scene, the motion corresponding to movement of one or more objects in the scene;
determine, based on one or more sensor measurements, global motion associated with a camera used to capture the one or more frames;
determine a weighted combination of the determined motion and the global motion using a first weight for the determined motion and a second weight for the global motion, the first weight representing a sensitivity of frame processing to movement of the one or more objects in the scene;
determine, based on the weighted combination of the determined motion and the global motion, an amount of motion in the one or more frames is less than a motion threshold;
determine a number of frames and an exposure duration for capturing the number of frames, wherein the determined number of frames is less than a previously-captured number of frames used to generate a first frame for display and the determined exposure duration is greater than an exposure duration used to capture the previously-captured number of frames based on the amount of motion in the one or more frames being less than the motion threshold;

send a request to capture the number of frames using the determined exposure duration; and output a second frame for display based on the number of frames captured using the determined exposure duration.

23. The non-transitory computer-readable storage medium of claim 22, wherein the one or more frames are obtained before a capture command for capturing the number of frames is received.

24. The non-transitory computer-readable storage medium of claim 22, further comprising instructions that, when executed by the one or more processors, cause the one or more processors to:

perform temporal blending on the number of frames captured using the determined exposure duration to generate a temporally blended frame.

25. The non-transitory computer-readable storage medium of claim 22, further comprising instructions that, when executed by the one or more processors, cause the one or more processors to:

determine a final motion indication based on the determined motion and the global motion;

wherein the amount of motion is based on the final motion indication.

26. The non-transitory computer-readable storage medium of claim 25, further comprising instructions that, when executed by the one or more processors, cause the one or more processors to:

determine, based on a final motion indication associated with at least one additional frame, whether an amount of motion in the at least one additional frame is greater than the motion threshold; and increase a frame count for the number of frames and decrease an exposure amount for the determined exposure duration based on the amount of motion in the at least one additional frame is greater than the motion threshold.

* * * * *